(12) United States Patent
Shoemaker

(10) Patent No.: US 7,380,873 B2
(45) Date of Patent: Jun. 3, 2008

(54) COVERED UTILITY TRAILER AND KIT FOR ASSEMBLING SAME

(75) Inventor: Craig Shoemaker, Fergus (CA)

(73) Assignee: Snowbear Limited, Guelph, Ontario (CA)

( * ) Notice: Subject to any disclaimer, the term of this patent is extended or adjusted under 35 U.S.C. 154(b) by 0 days.

(21) Appl. No.: 11/433,558

(22) Filed: May 15, 2006

(65) Prior Publication Data
US 2007/0262601 A1 Nov. 15, 2007

(51) Int. Cl.
B62D 33/03 (2006.01)
E05D 15/52 (2006.01)

(52) U.S. Cl. .............. 296/182.1; 296/51; 296/57.1; 296/61; 296/146.11; 49/192

(58) Field of Classification Search .......... 296/50, 296/51, 57.1, 62, 146.1, 146.8, 146.11, 146.12, 296/181.7, 182.1, 186.4, 61; 16/362; 49/192, 49/193
See application file for complete search history.

(56) References Cited

U.S. PATENT DOCUMENTS 674,320 A * 5/1901 Sebring .................. 296/51

(Continued)

FOREIGN PATENT DOCUMENTS

DE 3324465 A1 * 1/1985 ............ 49/192

OTHER PUBLICATIONS

Point-of-purchase poster for StrongBox (TM) Covered Trailer manufactured by Snowbear Limited, Guelph, London, 2004.

(Continued)

Primary Examiner—D. Glenn Dayoan
Assistant Examiner—Paul A Chenevert
(74) Attorney, Agent, or Firm—Fasken Martineau Dumoulin LLP

(57) ABSTRACT

The present invention relates to the field of utility trailers and more specifically, to a covered utility trailer and a kit for assembling same. The covered utility trailer includes a trailer bed for supporting cargo. The trailer bed has a leading edge, an opposed trailing edge spaced apart from the leading edge and a pair of first and second, spaced apart, side edges joining the leading edge to the trailing edge. A pair of first and second, spaced apart, sidewalls and a leading wall are also provided. Each sidewall extends upright from a respective side edge of the trailer bed. The leading wall is mounted between the first and second sidewalls and extends upright from the leading edge of the trailer bed. A rear cargo access door assembly is disposed opposite the leading wall and between the first and second sidewalls. The rear cargo access door assembly extends upright from the trailing edge of the trailer bed. The rear cargo access door assembly includes a door frame and a pair of first and second cargo access doors hingedly mounted to the door frame in a double door arrangement. Each of the cargo access doors frame is selectively deployable in one of a swing door configuration and a ramp-forming configuration. The covered utility trailer also includes a roof assembly carried above the trailer bed. The roof assembly is supported by the leading wall and the first and second sidewalls, and is connected to the door frame. The trailer bed, the first and second sidewalls, the leading wall, the rear cargo access door assembly and the roof assembly co-operate with each other to define a box-like structure having an interior cargo storage space. A trailer transport rack assembly is also provided for carrying a plurality of kits to be shipped.

30 Claims, 45 Drawing Sheets

U.S. PATENT DOCUMENTS

| | | | | |
|---|---|---|---|---|
| 1,207,266 | A * | 12/1916 | Bartholomew | 296/51 |
| 1,278,502 | A * | 9/1918 | Plummer | 16/362 |
| 1,317,905 | A * | 10/1919 | Baughman | 296/51 |
| 1,972,575 | A * | 9/1934 | Schmidt | 49/193 |
| 2,380,016 | A * | 7/1945 | Black | 280/42 |
| 2,456,013 | A * | 12/1948 | Nelson | 296/181.7 |
| 2,489,670 | A * | 11/1949 | Powell, Jr. | 296/182.1 |
| 2,806,735 | A * | 9/1957 | Smith | 296/51 |
| 3,155,203 | A * | 11/1964 | Kappen et al. | 49/37 |
| 3,387,406 | A * | 6/1968 | Coker et al. | 49/192 |
| 3,400,974 | A * | 9/1968 | Gage | 296/146.12 |
| 3,455,061 | A * | 7/1969 | Kesling et al. | 49/382 |
| 3,544,153 | A * | 12/1970 | Galbreath et al. | 296/51 |
| 3,567,274 | A * | 3/1971 | Kaptur, Jr. et al. | 296/50 |
| 3,623,764 | A * | 11/1971 | Jacobus | 296/50 |
| 3,912,326 | A * | 10/1975 | Tass | 296/51 |
| 3,972,428 | A * | 8/1976 | Love et al. | 414/537 |
| 4,076,301 | A * | 2/1978 | Gergoe | 296/50 |
| 4,881,298 | A * | 11/1989 | Turnbull | 16/266 |
| 5,133,584 | A * | 7/1992 | McCleary | 296/61 |
| 5,211,437 | A * | 5/1993 | Gerulf | 296/61 |
| 5,685,594 | A * | 11/1997 | Harper | 296/51 |
| 6,742,826 | B2 * | 6/2004 | Humphrey et al. | 296/51 |
| 6,805,393 | B1 * | 10/2004 | Stevenson et al. | 296/50 |
| 6,913,305 | B1 * | 7/2005 | Kern et al. | 296/51 |
| 7,080,868 | B2 * | 7/2006 | McClure et al. | 296/50 |
| 2005/0194814 | A1 * | 9/2005 | Willis et al. | 296/146.1 |
| 2006/0249971 | A1 * | 11/2006 | Ichinose | 296/51 |
| 2007/0024083 | A1 * | 2/2007 | Ryman | 296/146.1 |

OTHER PUBLICATIONS

Owner's manual for StrongBox (TM) Covered Trailer manufactured by Snowbear Limited, pp. 1 to 21, Guelph, London, 2004.

* cited by examiner

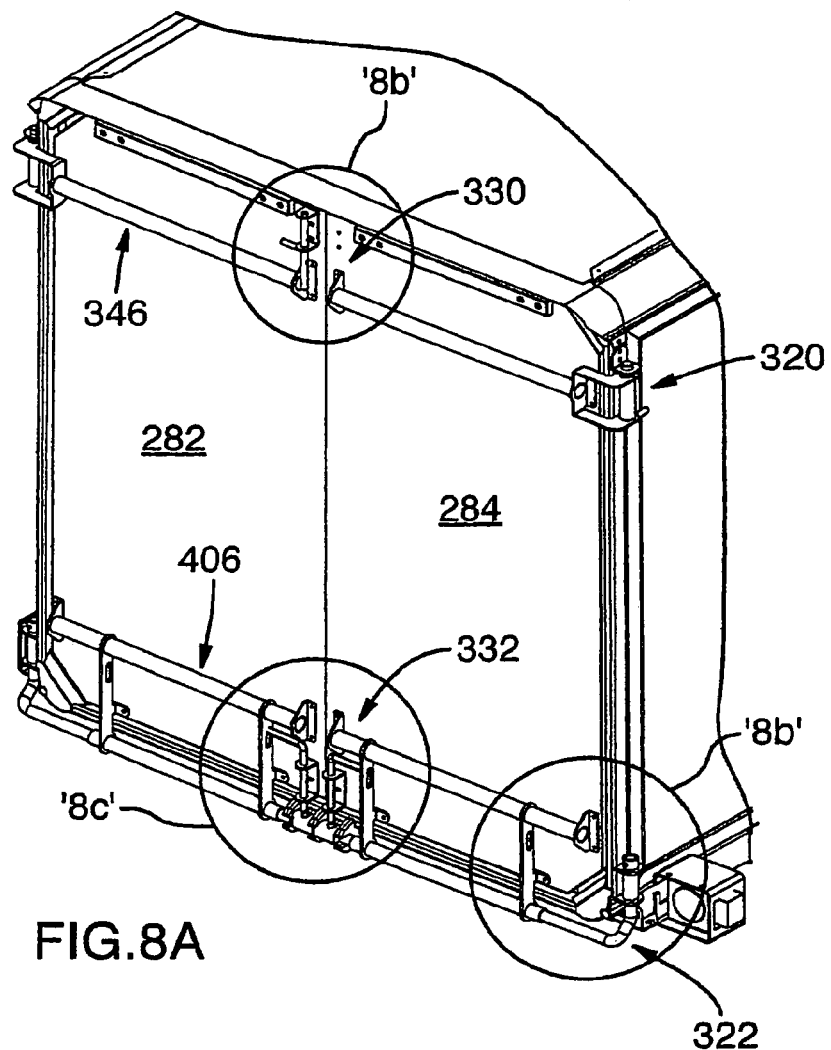
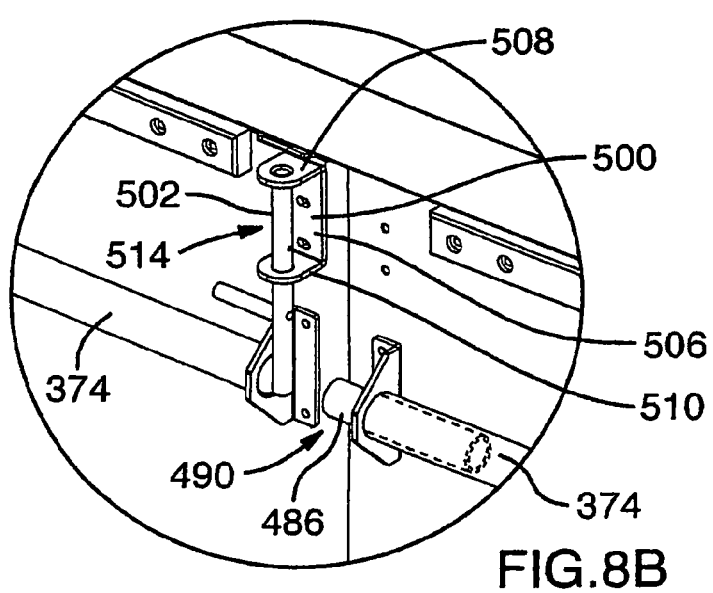

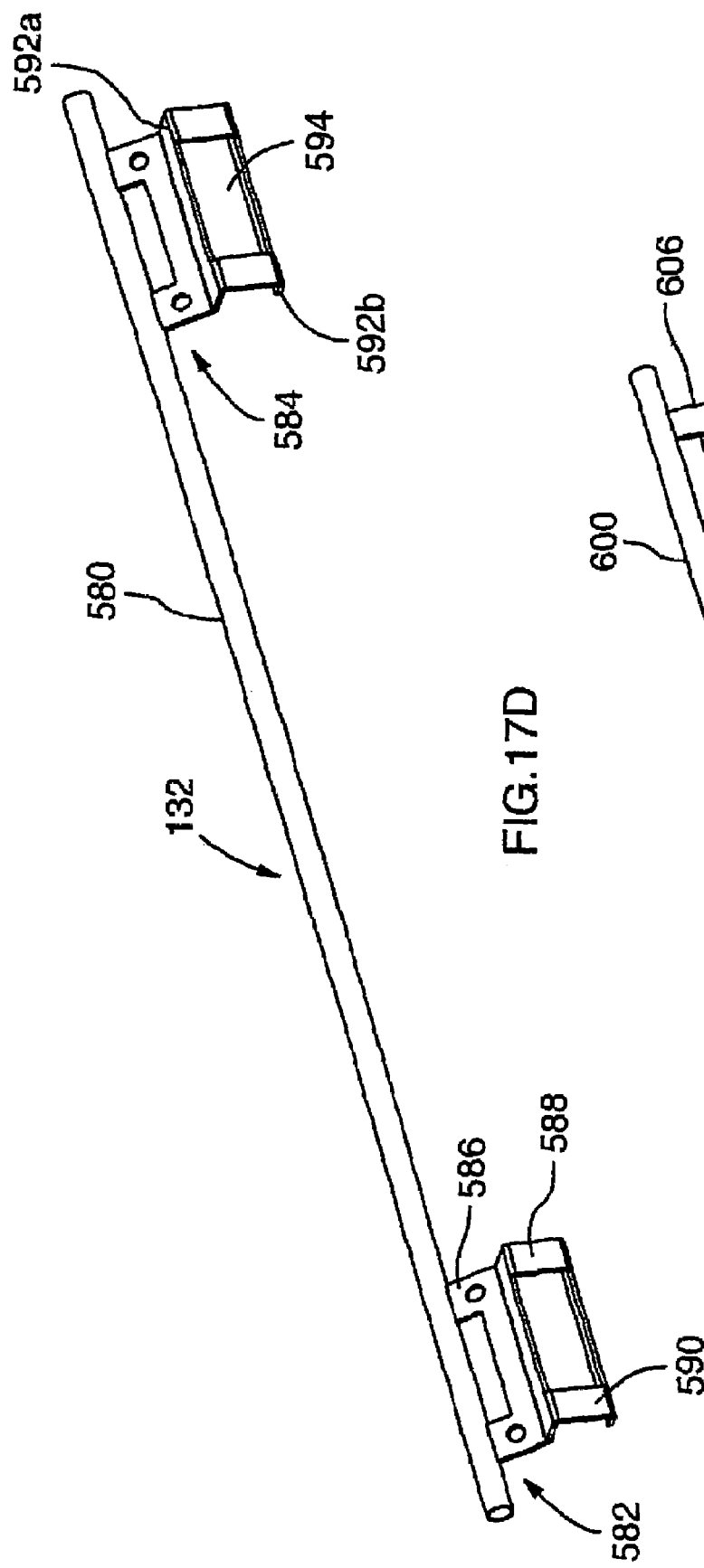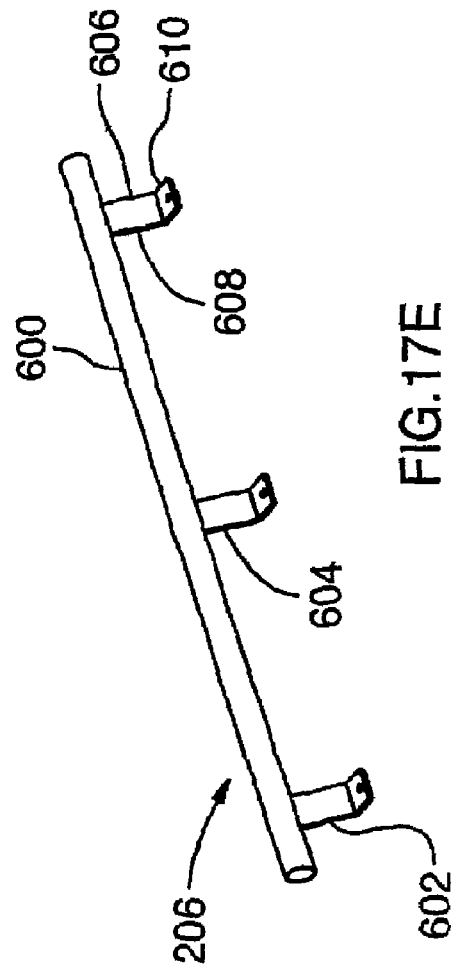

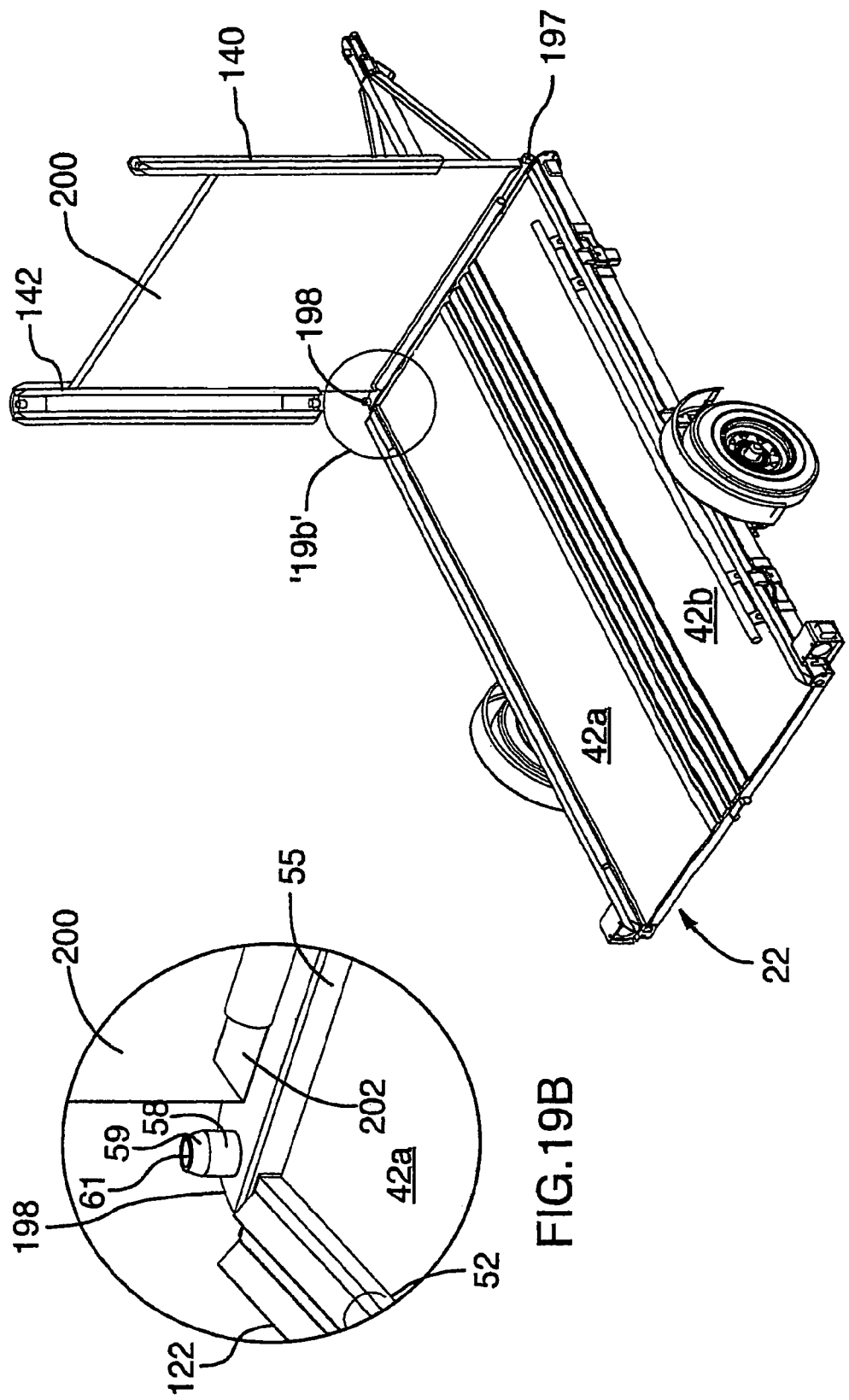

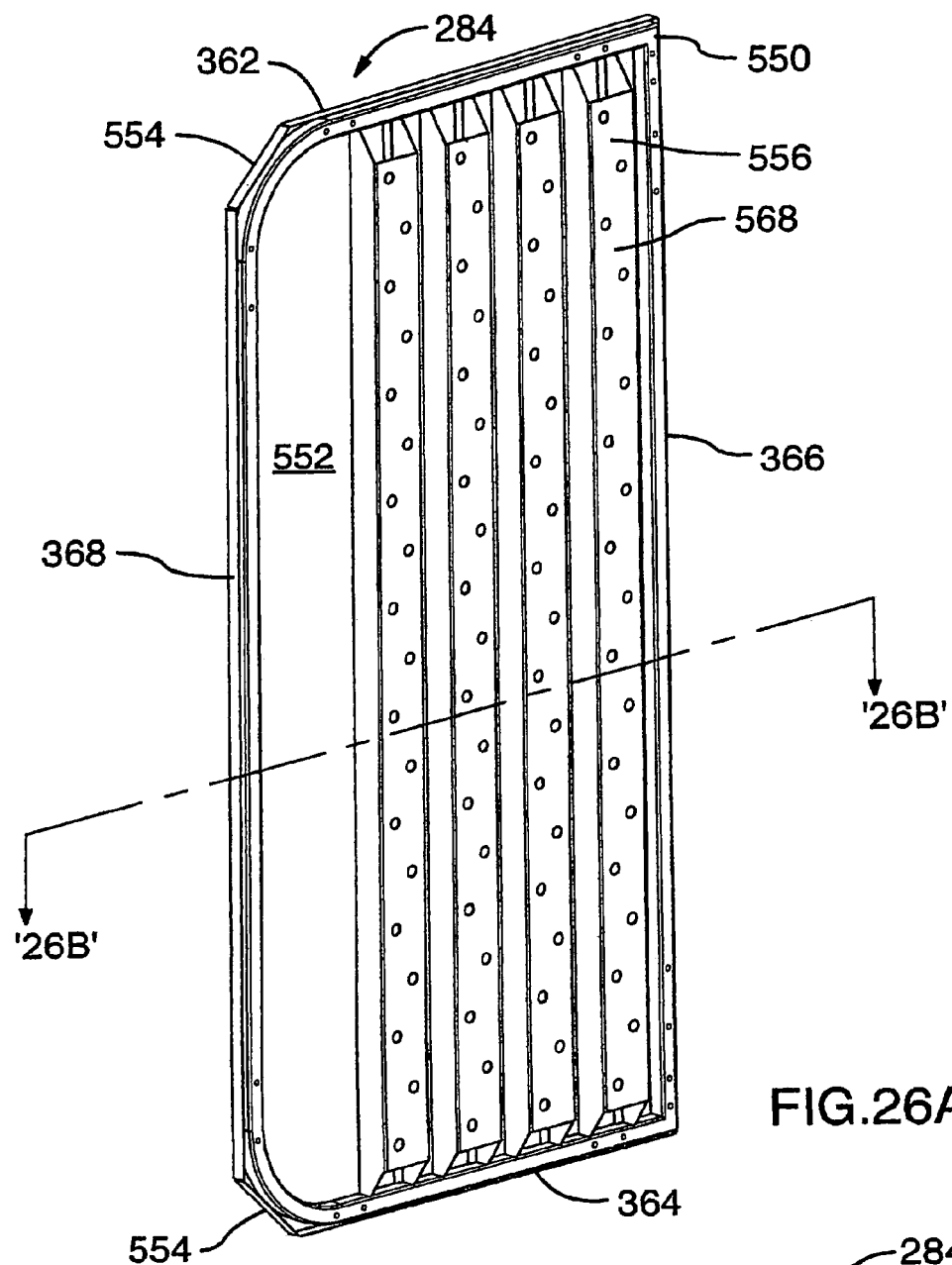
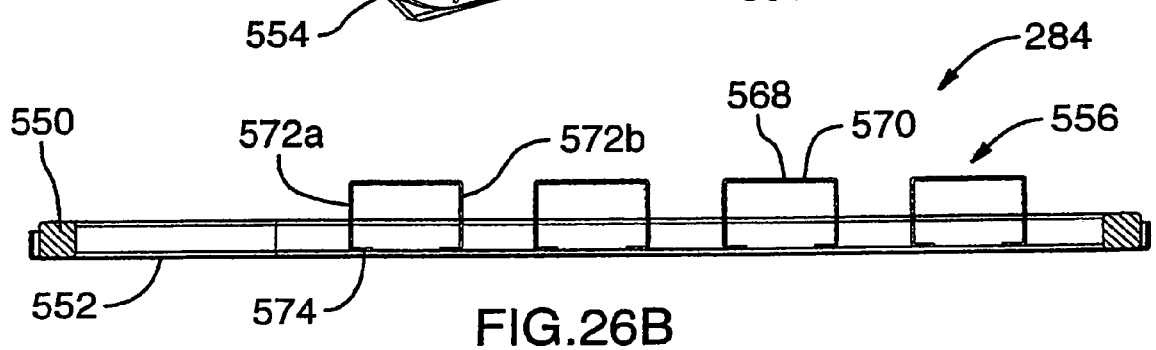

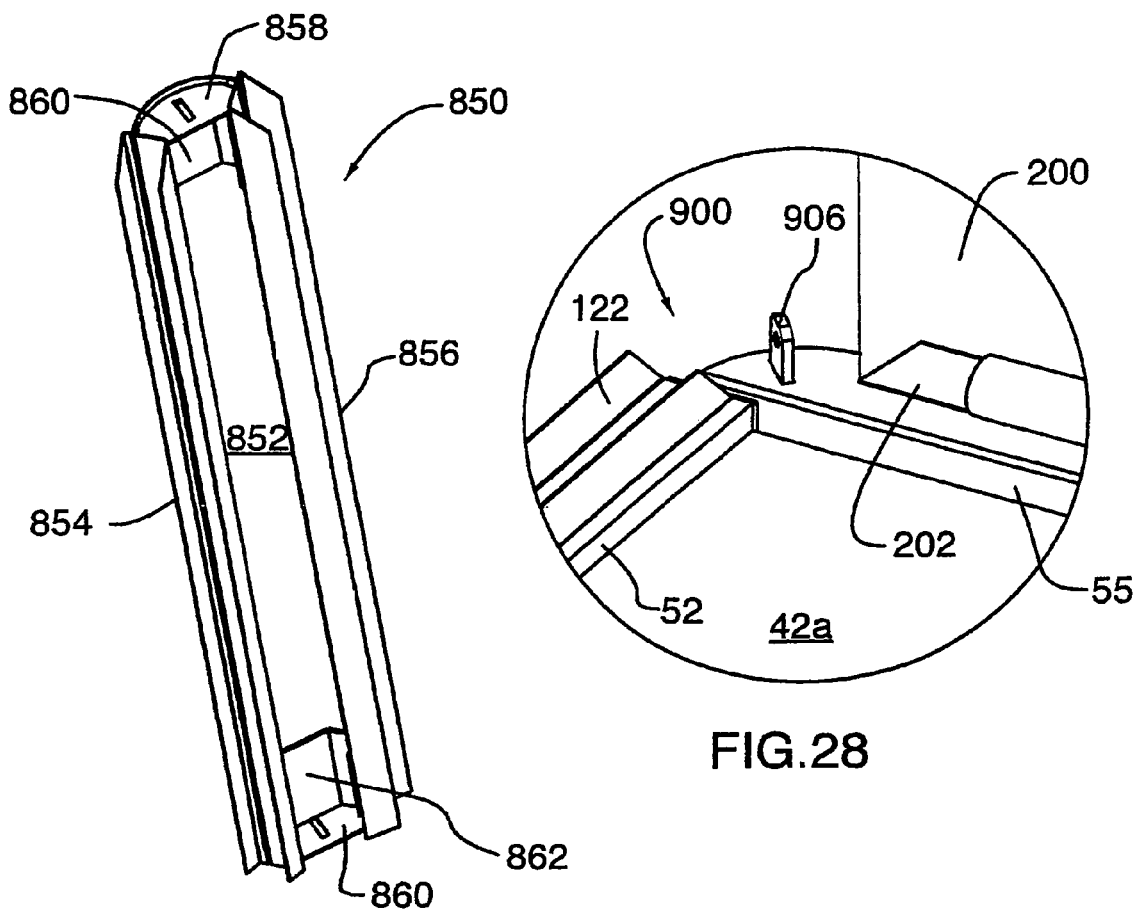
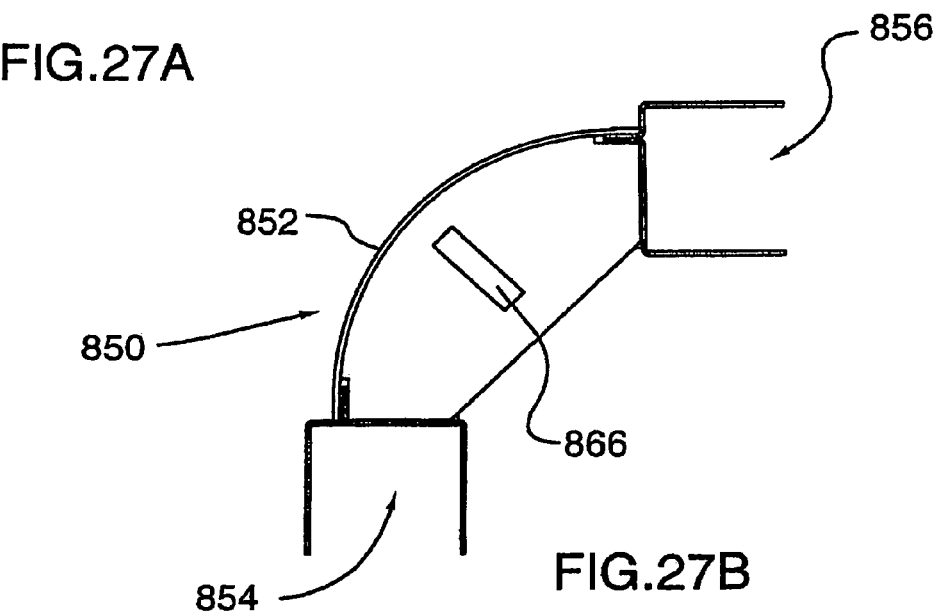

US 7,380,873 B2

COVERED UTILITY TRAILER AND KIT FOR ASSEMBLING SAME

FIELD OF THE INVENTION

The present invention relates to the field of utility trailers and more specifically, to a covered utility trailer and a kit for assembling same.

BACKGROUND OF THE INVENTION

The assembly of conventional, heavy duty, utility trailers, and in particular, covered utility trailers often requires special equipment or tools, and routinely involves welding. The need for such special tools and/or welding and the manual skill required to carry out such assembly activities has resulted in these covered utility trailers being manufactured and fully assembled in factories or machine shops, prior to being shipped to distributors and retailers for sale to customers.

While assembly prior to shipping confers certain advantages (for instance, the product is ready for sale once received), the freight costs associated with this type of utility trailer tend to be relatively high. This is because the trailer tends to be a relatively, low-density load when assembled—it is bulky due to its box-like construction, but tends to be relatively, lightweight. As a result, less than optimal use of cargo container space is achieved when shipping these trailers. Once the trailers are shipped, a similar problem may be encountered in respect of storage. The distributor or retailer who receives these utility trailers must have adequate space to store them. Such bulky items require large storage areas.

In light of the foregoing, there is a real need for a covered utility trailer that can be assembled manually in a quick and easy manner without the use of special tools. Such a trailer would tend not to require assembly prior to shipping and accordingly, could be shipped and stored in a more compact and economical fashion thereby obviating the drawbacks associated with known covered utility trailers.

Utility trailers are often provided with rear cargo access doors that are hung on the jambs of the door frame. These cargo doors are vertically hinged such that they swing outwardly of the door frame to give access to the interior storage space of the trailer. To facilitate loading and unloading of the trailer, separate ramp members releasably mountable to the bottom member of the door frame may also be provided. In some cases, these ramps are stored in the interior storage space of the trailer when not in use. In other cases, they may be stored beneath the trailer bed within a purpose-built slot.

While these types of ramps tend to function in a generally satisfactory manner, they do tend to suffer from certain drawbacks. More specifically, the ramps stored within the interior storage space when not in use, tend to take up storage space in the trailer and may knock about when the towing vehicle is in motion, potentially damaging the cargo. Additionally, these types of ramps may be more susceptible to being forgotten, lost or stolen. Conversely, those ramps that are stored beneath the trailer suffer other disadvantages. In particular, those ramps may experience difficulties in deployment and storage. For instance, the ramps may become jammed within the slot due to the accumulation of dirt therein or because the ramp has sustained some damage which has now caused it to become warped and ill-fitting within the slot. Accordingly, it would be advantageous to provide a utility trailer with a versatile and compact ramp that may be stored easily and avoids the foregoing disadvantages.

SUMMARY OF THE INVENTION

According to a broad aspect of an embodiment of the present invention, there is provided a door assembly for providing access to a cargo storage space within a vehicle. The door assembly includes a door frame defined by a pair of first and second, spaced apart vertically extending door jambs, and a pair of upper and lower, spaced apart, horizontally extending door frame members extending between the first and second door jambs. At least one door is mounted within the door frame. The at least one door is defined by a bottom edge, a top edge and a pair of spaced apart, first and second side edges. Also provided are at least one pair of upper and lower hinge assemblies pivotally connecting the at least one door to the door frame. The at least one pair of upper and lower hinge assemblies is operable to allow the at least one door to be selectively deployed in one of a swing door configuration and a ramp-forming configuration. When in the swing door configuration, the at least one door is pivotally connected to the first door jamb adjacent its first side edge for rotation about a vertical axis and is moveable between a closed position and an open position. When in the ramp-forming configuration, the at least one door is pivotally connected to the lower door frame member adjacent its bottom edge for rotation about a horizontal axis and is moveable between the closed position and a ramp-deployed position.

In an additional feature, the upper hinge assembly includes an upper hinge bracket fixed to first door jamb proximate the upper door frame member. A tubular hinge knuckle is attached to the first side edge of the at least one door proximate the top edge thereof. Also provided is a hinge pin that is housed within the hinge knuckle and rotatable relative thereto. The hinge pin is operatively engageable with the upper hinge bracket to hingedly connect the at least one door to the first door jamb. The hinge pin is moveable relative to the upper hinge bracket between a first position and a second position. In the first position, the hinge pin operatively engages the upper hinge bracket to thereby permit the at least one door to be deployed in the swing door configuration. In the second position, the hinge pin is operatively disengaged from the upper hinge bracket to thereby permit the at least one door to be deployed in the ramp-forming configuration. The hinge pin is retractable within the hinge knuckle. Additionally, the hinge pin is spring-loaded and is resiliently biased toward the first position.

In yet another feature, the lower hinge assembly includes a hinge member having a generally vertically extending portion, a generally horizontally extending portion and a transition portion joining the vertically extending portion to the horizontally extending portion. The horizontally extending portion has a proximal end adjacent the transition portion and a terminal end opposed from the proximal end. A pair of vertically spaced, lower hinge brackets is fixed to the first door jamb proximate the lower door frame member. The pair of lower hinge brackets receives therebetween the vertically extending portion of the hinge member. The vertically extending portion of the hinge member is rotatable about the vertical axis when the at least one door is deployed in the swing door configuration. The lower hinge assembly further has a generally horizontally extending tubular member carried by the at least one door below the bottom edge thereof. The tubular member has a passageway defined therein. The passageway receives the horizontally extending portion of the hinge member therein. The tubular section is rotatable about the horizontal axis when the at least one door is deployed in the ramp-forming configuration. At least one retaining member is attached to the lower door frame member for supporting a part of the horizontally extending portion of the hinge member. The at least one retaining member is substantially C-shaped and has an opening defined therein sized to permit the horizontally extending portion of the hinge member to swing clear of the at least one retaining member when the at least one door is deployed in the swing door configuration and is moved between the closed position and the open position.

In a further feature, the at least one retaining member includes first and second, spaced apart retaining members. A cylindrical member extends between, and is captively retained by, the first and second retaining members. The cylindrical member has a longitudinal cutout defined therein to receive the terminal end of the horizontally extending hinge member portion. The cylindrical member is rotatable about the horizontal axis to permit rotational displacement of the cutout. The cylindrical member is moveable between a blocking position and a clearance position relative to the terminal end of the horizontally extending hinge member portion. In the blocking position, the cylindrical member is oriented with the cutout lying out of alignment with the openings defined in the retaining members thereby causing the terminal end of the horizontally extending hinge member portion to be captively retained within the cutout, and impeding deployment of the at least one door in the swing door configuration. In the clearance position, the cylindrical member is oriented with the cutout lying in alignment with the openings defined in the retaining members thereby allowing the horizontally extending hinge member portion to swing clear of the cutout when the at least one door is deployed in the swing door configuration and is moved between the closed position and the open position.

In still another feature at least one door locking assembly for maintaining the at least one door in the closed position, is further provided. The at least one door locking assembly includes a first door locking assembly disposed adjacent the bottom edge of the at least one door and a second door locking assembly disposed adjacent the top edge of the at least one door. The first door locking assembly is operable to maintain the cylindrical member in the blocking position. The first door locking assembly is defined by a first latch mounting bracket, a locking pin and the cylindrical member of the lower hinge assembly. The first latch mounting bracket is mounted to the at least one door near the bottom edge thereof. The locking pin is slideably moveable relative to the first latch mounting bracket between a locked position and an unlocked position. The cylindrical member has a bore defined therein for receiving a portion of the locking pin therein. When moved to its locked position, a portion of the locking pin engages the bore of the cylindrical member to thereby maintain the cylindrical member in the blocking position.

In an additional feature, the second door locking assembly includes a second latch mounting bracket mounted to the at least one door near the top edge thereof. A vertically oriented, locking bar is slideably moveable relative to the second latch mounting bracket between a locked position and an unlocked position. Also provided is an apertured latch plate mounted to the upper door frame member. The apertured latch plate is adapted to receive a portion of the locking bar therein. When moved to its locked position, a portion of the locking bar engages the apertured latch plate thereby impeding deployment of the at least one door.

In a further feature, the at least one door is moveable to its open position when the locking pin of the first door locking assembly is moved to its unlocked position and the locking bar of the second door locking assembly is moved to its respective unlocked position. In another feature, the at least one door is moveable to its ramp-deployed position when the hinge pin of the upper hinge assembly is moved to its second position and the locking bar of the second door locking assembly is moved to its unlocked position.

According to another broad aspect of an embodiment of the present invention, there is provided a door assembly for providing access to a cargo storage space within a vehicle. The door assembly includes a door frame defined by a pair of first and second, spaced apart vertical door jambs, and a pair of upper and lower, spaced apart, horizontal door frame members extending between the first and second door jambs. First and second doors are mounted within the door frame in a double door arrangement. A pair of upper and lower hinge assemblies is provided for hingedly connecting each door to the door frame. The upper and lower hinge assemblies are operable to allow each door to be selectively deployed in one of a swing door configuration and a ramp-forming configuration. When in the swing door configuration, each door is hingedly connected to one of the door jambs for rotation about a vertical axis and is moveable between a closed position and an open position. When in the ramp-forming configuration, each door is hingedly connected to the lower door frame member for rotation about a horizontal axis and is moveable between the closed position and a ramp-deployed position.

According to yet another broad aspect of an embodiment of the present invention, there is provided a utility trailer. The utility trailer includes a trailer bed for supporting cargo. The trailer bed has a leading edge, an opposed trailing edge spaced apart from the leading edge and a pair of first and second, spaced apart, side edges joining the leading edge to the trailing edge. A pair of first and second, spaced apart, sidewalls and a leading wall are also provided. Each sidewall extends upright from a respective side edge of the trailer bed. The leading wall is mounted between the first and second sidewalls and extends upright from the leading edge of the trailer bed. A rear cargo access door assembly is disposed opposite the leading wall and between the first and second sidewalls. The rear cargo access door assembly extends upright from the trailing edge of the trailer bed. The rear cargo access door assembly includes a door frame and a pair of first and second cargo access doors hingedly mounted to the door frame in a double door arrangement. Each of the cargo access doors frame is selectively deployable in one of a swing door configuration and a ramp-forming configuration. The covered utility trailer also includes a roof assembly carried above the trailer bed. The roof assembly is supported by the leading wall and the first and second sidewalls, and is connected to the door frame. The trailer bed, the first and second sidewalls, the leading wall, the rear cargo access door assembly and the roof assembly co-operate with each other to define a box-like structure having an interior cargo storage space.

According to still another broad aspect of an embodiment of the present invention, there is a kit for assembling a utility trailer. The kit includes a trailer bed for supporting cargo. The trailer bed has a leading edge, an opposed trailing edge spaced apart from the leading edge and a pair of first and second, spaced apart, side edges joining the leading edge to the trailing edge. A pair of first and second, spaced apart, sidewalls and a leading wall for placement between the first and second sidewalls, are also provided. Each sidewall is mountable to extend upright from a respective side edge of the trailer bed. The leading wall is mountable to extend upright from the leading edge of the trailer bed. The kit further includes a rear cargo access door assembly for placement opposite the leading wall and between the first and second sidewalls. The rear cargo access door assembly is mountable to extend upright from the trailing edge of the trailer bed. The rear cargo access door assembly includes a door frame and a pair of first and second cargo access doors hingedly mounted to the door frame in a double door arrangement. When the kit is fully assembled, each of the cargo access doors frame is selectively deployable in one of a swing door configuration and a ramp-forming configuration. Also provided is a roof assembly for placement above the trailer bed. The roof assembly is connectable to the leading wall, the first and second sidewalls and the door frame. The trailer bed, the first and second sidewalls, the leading wall, the rear cargo access door assembly and the roof assembly are connectable to each other to define a box-like structure having an interior cargo storage space.

According to a further broad aspect of an embodiment of the present invention, there is provided a kit for converting a flat bed trailer into a covered utility trailer. The kit includes a pair of first and second, spaced apart, sidewalls and a leading wall for placement between the first and second sidewalls. Each sidewall is mountable to extend upright from the floor of the flat bed trailer. The leading wall is mountable to extend upright from the floor of the flat bed trailer. Also provided is a rear cargo access door assembly for placement opposite the leading wall and between the first and second sidewalls. The rear cargo access door assembly is mountable to extend upright from the floor of the flat bed trailer. The rear cargo access door assembly includes a door frame and a pair of first and second cargo access doors hingedly mounted to the door frame in a double door arrangement. When the kit is fully assembled each of the cargo access doors frame is selectively deployable in one of a swing door configuration and a ramp-forming configuration. The kit further includes a roof assembly for placement above the floor of the flat bed trailer. The roof assembly is connectable to the leading wall, the firsthand second sidewalls and the door frame. The first and second sidewalls, the leading wall, the rear cargo access door assembly, the roof assembly and the floor are connectable to each other to define a box-like structure having an interior cargo storage space.

BRIEF DESCRIPTION OF THE DRAWINGS

The embodiments of the present invention shall be more clearly understood with reference to the following detailed description of the embodiments of the invention taken in conjunction with the accompanying drawings, in which:

FIG. 8a is a top right perspective view of the rear end of the assembled covered utility trailer illustrated in FIG. 1 with its cargo access doors shown in a closed position and the latches of its upper and lower door locking assemblies shown in their respective disengaged, unlocked positions;

FIG. 8b is a magnified, top right perspective view of the upper door locking assembly shown in the encircled portion "8b" in FIG. 8a;

FIG. 8c is a magnified, top right perspective view of the lower door locking assemblies shown in the encircled portion "8c" in FIG. 8a;

FIG. 8d is a magnified, top right perspective view of the elbow hinge assembly of the first cargo access door shown in the encircled portion "8d" in FIG. 8a;

FIG. 17b is a magnified, rear right perspective view of one of the pockets depending from the side sill edge of the trailer bed, shown in the encircled portion "7b" in FIG. 17a;

FIG. 17c is a magnified, rear right perspective view of the rail member shown in FIG. 17a;

FIG. 17d is a rear right perspective view of the side tie-down rail shown in FIG. 17a;

FIG. 17e is a rear right perspective view of the front tie-down rail shown in FIG. 17a;

FIG. 19a is a rear right perspective view of the trailer bed illustrated in FIG. 18a with the front wall panel already mounted to the trailer bed and a pair of corner post members shown exploded;

FIG. 19b is a magnified, rear right perspective view of the corner of the trailer bed shown in the encircled portion "19b" in FIG. 19a;

FIG. 19c is a perspective view of the corner post member shown in FIG. 19a;

FIG. 26a is a perspective view one of the cargo access doors illustrated in FIG. 9, showing the interior facing side of the door; and FIG. 26b is a cross-sectional view of the cargo access door shown in FIG. 26a taken along line '26b-26b', with the upper and lower attachment assemblies omitted for clarity;

FIG. 27a is a perspective view of an alternative corner post member to that shown in FIG. 19a with its clamp members omitted for clarity;

FIG. 27b is a top plan view of the corner post member shown in FIG; 27b;

FIG. 28 is a magnified, rear right perspective view similar to that illustrated in FIG. 19a showing the corner of a trailer bed in accordance with an alternative embodiment of the present invention;

DETAILED DESCRIPTION OF EMBODIMENTS OF THE INVENTION

Figure 1:
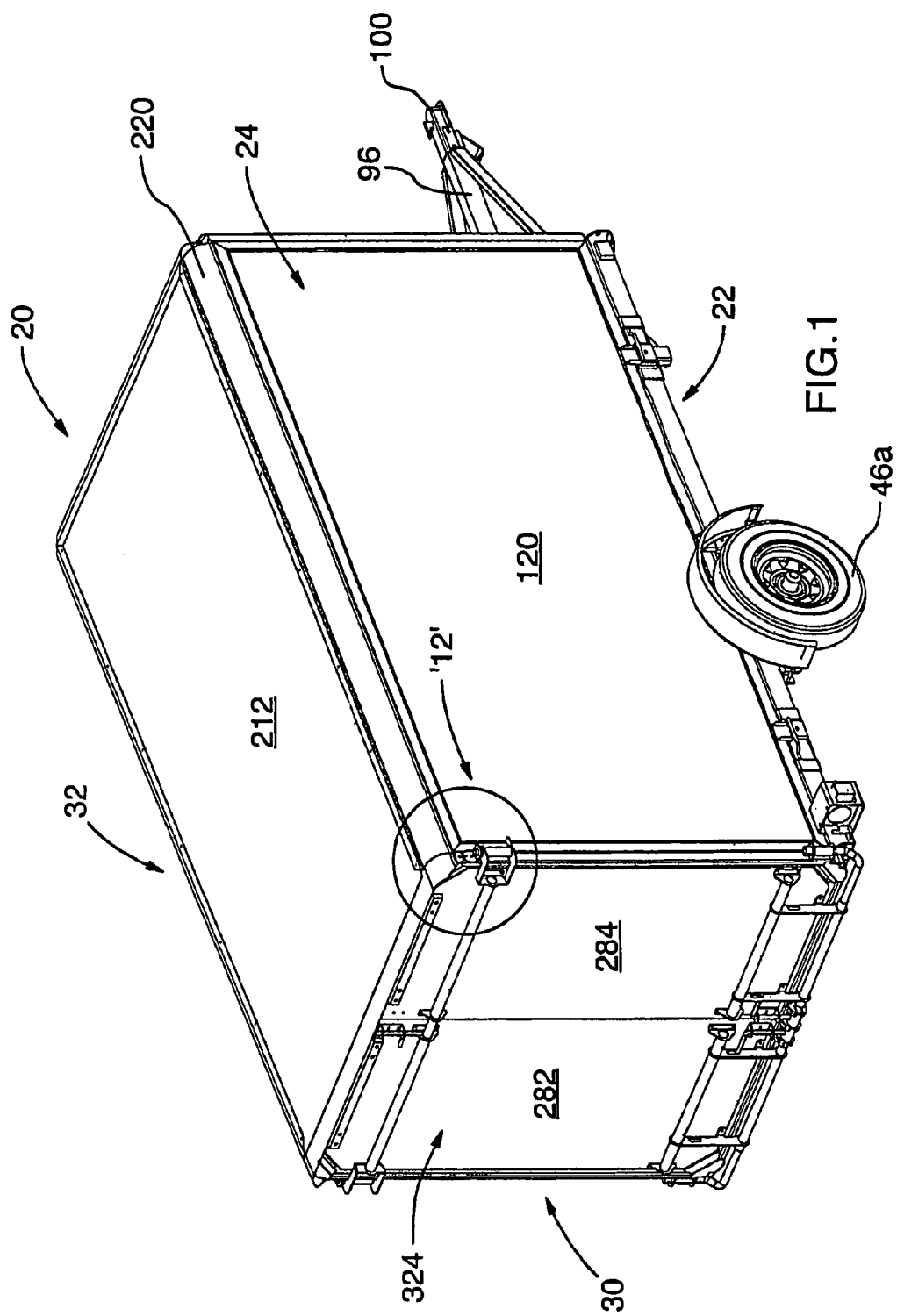
FIG. 1 is a rear right perspective view of an assembled covered utility trailer in accordance with an embodiment of the invention.
Figure 2:
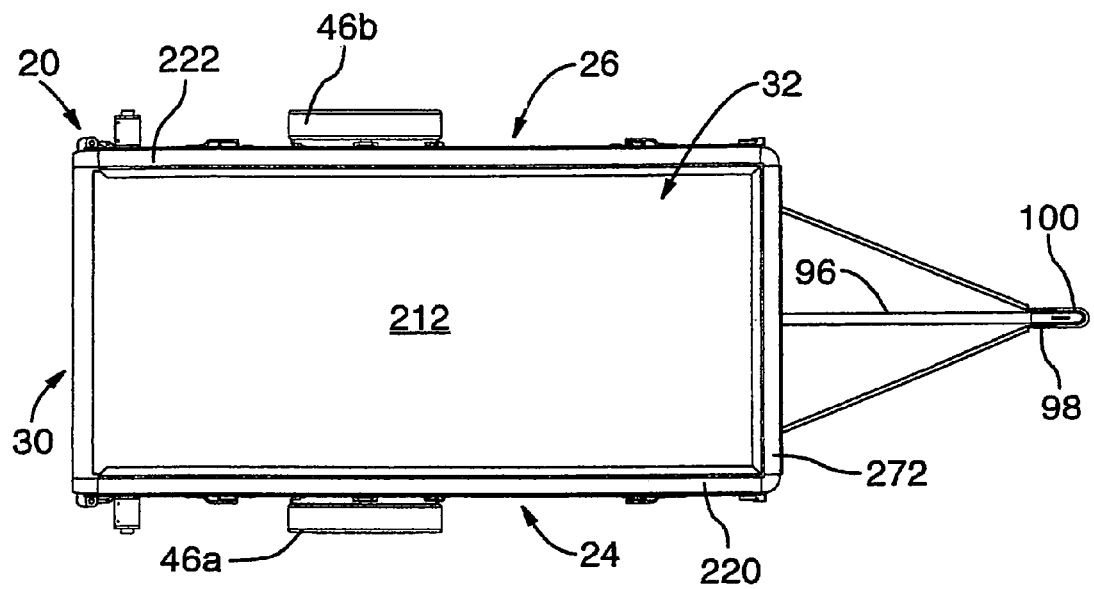
FIG. 2 is a top plan view of the assembled covered utility trailer shown in FIG. 1.

The description, which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Referring to FIGS. 1 to 6, there is shown an assembled covered utility trailer, designated generally with reference numeral 20. The trailer 20 is designed to be hitched to the rear of a motor vehicle and towed. The trailer 20 includes a trailer bed 22 for supporting cargo, a pair of spaced apart sidewalls 24 and 26, a front wall 28, a rear cargo access door assembly 30 disposed opposite the front wall 28, and a roof assembly 32, arranged in a generally rectangular, box-like configuration. The trailer bed 22, the sidewalls 24 and 26, the front wall 28, the rear cargo access door assembly 30 and the roof assembly 32 cooperate with each other to define an interior cargo storage space 34 (best shown in FIGS. 9 and 10).

Figure 3:
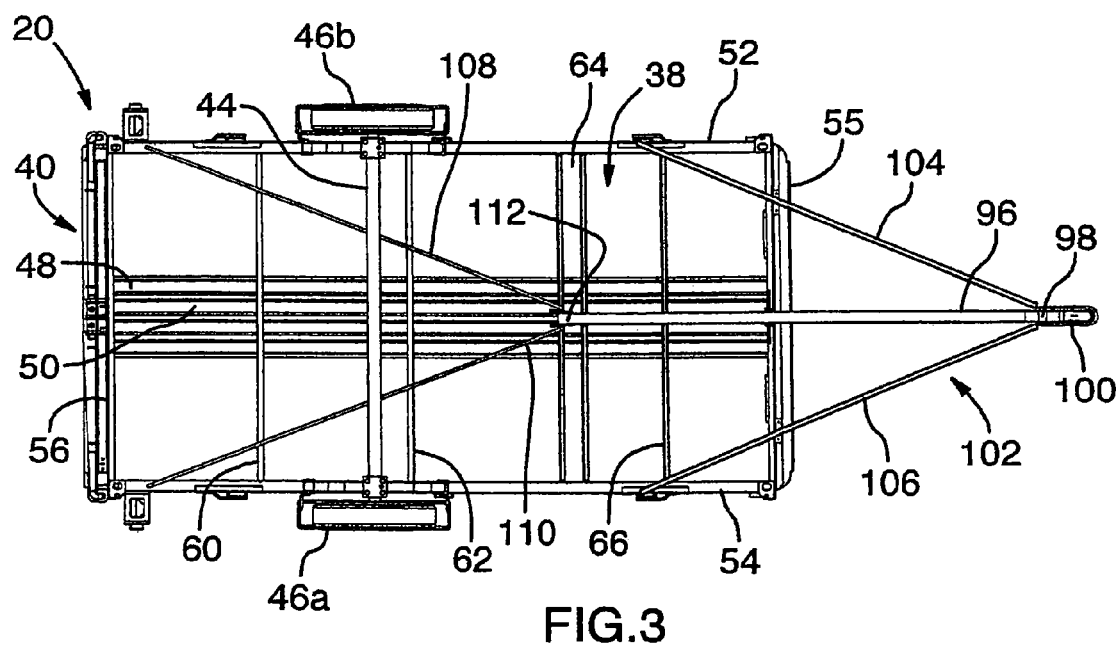
FIG. 3 is a bottom plan view of the assembled covered utility trailer shown in FIG. 1.

With specific reference to FIG. 3, the trailer bed 22 includes a support frame 40 and a floor 38 mounted atop the support frame 40 upon which cargo may be placed. The floor 38 includes two floorboards 42a and 42b, preferably, constructed of ¾ in. plywood. In this embodiment, the support frame 40 is operatively connected to a single axle 44 that carries a pair of spaced apart wheels 46a and 46b. In an alternative embodiment, the trailer could be configured as a dual-axle trailer. The trailer bed 22 is further provided with a multiple leaf springs-type suspension system (not shown).

Support frame 40 is of welded construction and includes a plurality of longitudinally extending centre stringers 50 and a pair of elongate side sills 52 and 54 disposed on either side of the centre stringers 50. Tying the centre stringers 50 and the side sills 52 and 54 to each other is a pair of front and rear end, sills 55 and 56, respectively.

Each centre stringer 50 is formed from a C-shaped, channel member 48 having a back and a pair of spaced apart arms joined to the back and extending away therefrom. The centre stringers 50 are mounted onto the support frame 40 with their backs facing upward. In the present embodiment, the support frame has four centre stringers. It will however be appreciated that in alternative embodiments, the support frame could employ three stringers or less, or five or more stringers. In a further alternative, the stringers could be replaced in favour of a single center sill.

Figure 19C:
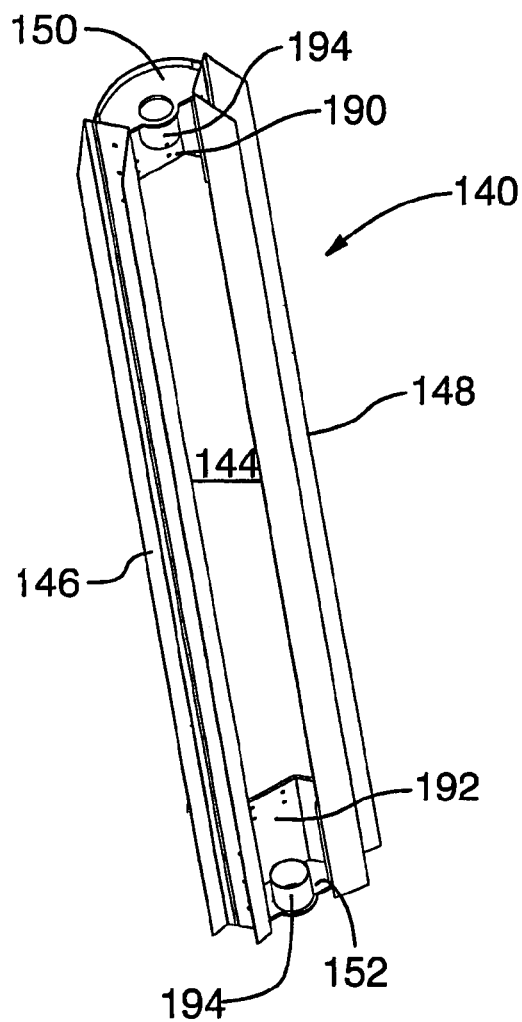

Preferably, the sills 52, 54 and 56 are made of generally rectangular hollow structural steel (HSS) members. However, in alternative embodiments, tubular structural steel members could also be employed to similar advantage. In contrast, the front end sill 55 is a C-shaped, channel member 57 with its back mounted against the support frame 40. Extending upwardly from the uppermost arm of the channel member 57 at each longitudinal end of the front end sill 55 is a guide pin 58. As best shown in FIG. 19b, the guide pin 58 has a generally frusto-conical tip 59 that has an aperture 61 defined therethrough for accommodating a fastener. As will be explained in greater detail below, the guide pin 58 assists in the alignment of the components of the covered trailer 20 thereby facilitating assembly thereof.

Additionally, cross-members 60, 62, 64 and 66 disposed at spaced apart locations between the front and rear end sills 55 and 56, extend beneath the centre stringers 50 to attach the side sills 52 and 54 to each other. The cross-members 60, 62, 64 and 66 also support floorboard 42a that is mounted between side sill 54 and centre stringers 50, and floorboard 42b that extends between side sill 52 and centre stringers 50.

Figure 17A:
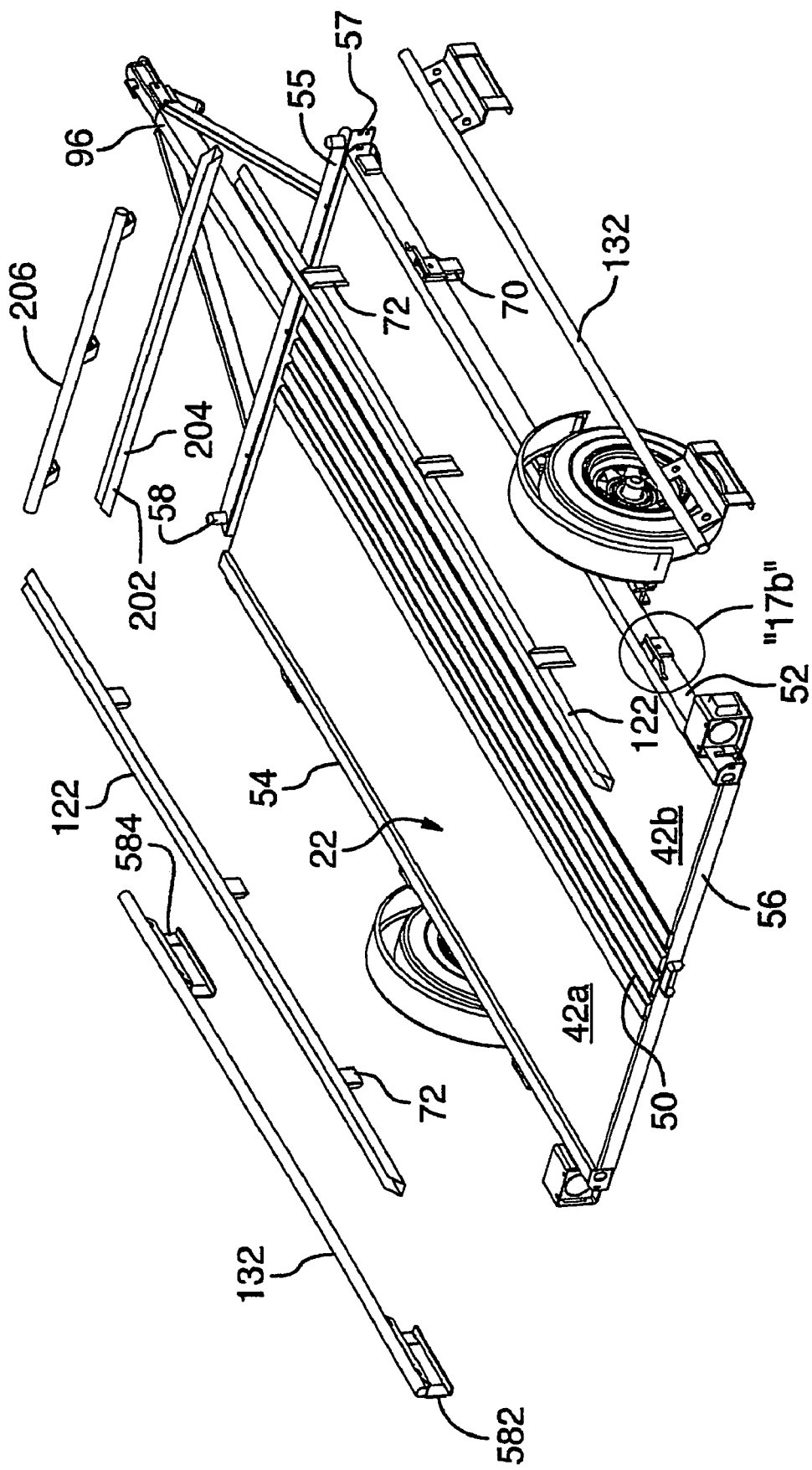
FIG. 17a is a rear right perspective view of the trailer bed illustrated in FIG. 16 with the rail members and tie down rails shown exploded.
Figure 17B:
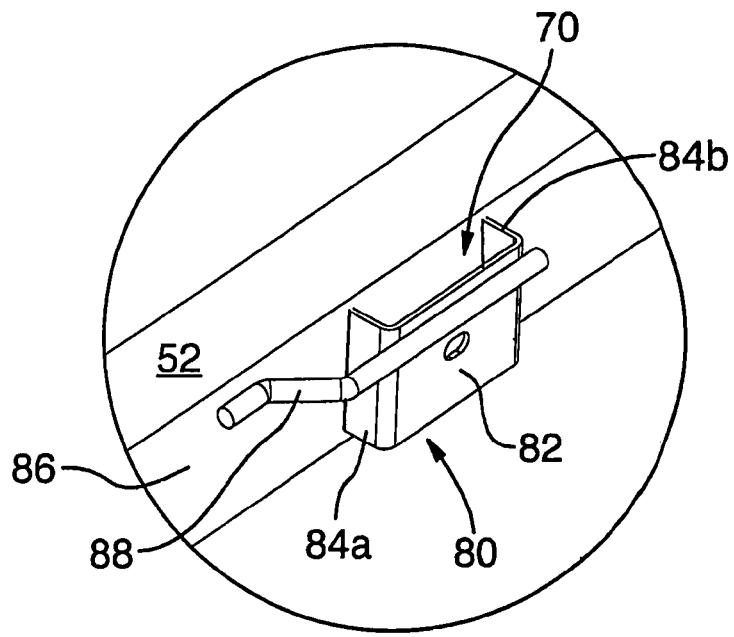

As best shown in FIGS. 3, 17a and 17b, each side sill 52 and 54 has a plurality of spaced apart, open-ended, pockets 70 sized to receive a post member 72 for securing the sidewalls 24 and 26 to the trailer bed 22. The pockets 70 of side sill 52 are generally aligned with those formed on side sill 54. While in the present embodiment three pockets are provided on each side sill 52, 54, in alternative embodiments, two pockets or four or more pockets could be used to similar advantage.

Each pocket 70 is formed by an elongate channel member 80 that has a back 82 and a pair of spaced apart arms 84a and 84b joined to the back 82 and extending away therefrom. More specifically, with the channel member 80 positioned in a generally vertical orientation, the terminal ends of the channel arms 84a and 84b are welded to the side face 86 of each side sill 52, 54, thereby forming pocket 70. Additional reinforcement is provided to each pocket 70 by a dog-legged bar 88 oriented generally horizontally and welded at one end to the side face 86 of side sill 52, 54 (as the case may be) and at the other end to the back 82 of the channel member 80.

The support frame 40 further includes an elongate tongue 96 that is centrally disposed between the side sills 52 and 54 and runs beneath the centre stringers 50 starting at the cross-member 64 and extending beyond the front end sill 55. The tongue 96 carries at its free end 98 a coupler 100 for connecting the trailer 20 to the hitch (not shown) of a motor vehicle. The tongue 96 is welded to each of the cross-members 64 and 66 and to the front end sill 55. A pair of triangular gussets 90 extending downwardly from the trailer bed 22 and disposed on either side of tongue 96, are welded to the support frame 40 adjacent the front end sill 55. Additional reinforcement for the tongue 96 is provided by a generally V-shaped brace member 102. The brace member 102 includes a pair of brace arms 104 and 106 arranged diagonally in a mirror image configuration. One end of each of the brace arms 104, 106 is fixed to a respective side sill 52, 54, while the opposite end thereof is fixed to the free end 98 of the tongue 96. Disposed rearwardly of the brace member 102 also in a V-shaped arrangement, is a set of wire tubes 108 and 110 for carrying the electrical wires to the rear of the covered utility trailer 20. Each wire tube 108, 110 is fixed at one end to the side sill 52, 54 (as the case may be) and at its opposite end, to end 112 of the tongue 96.

Figure 6:
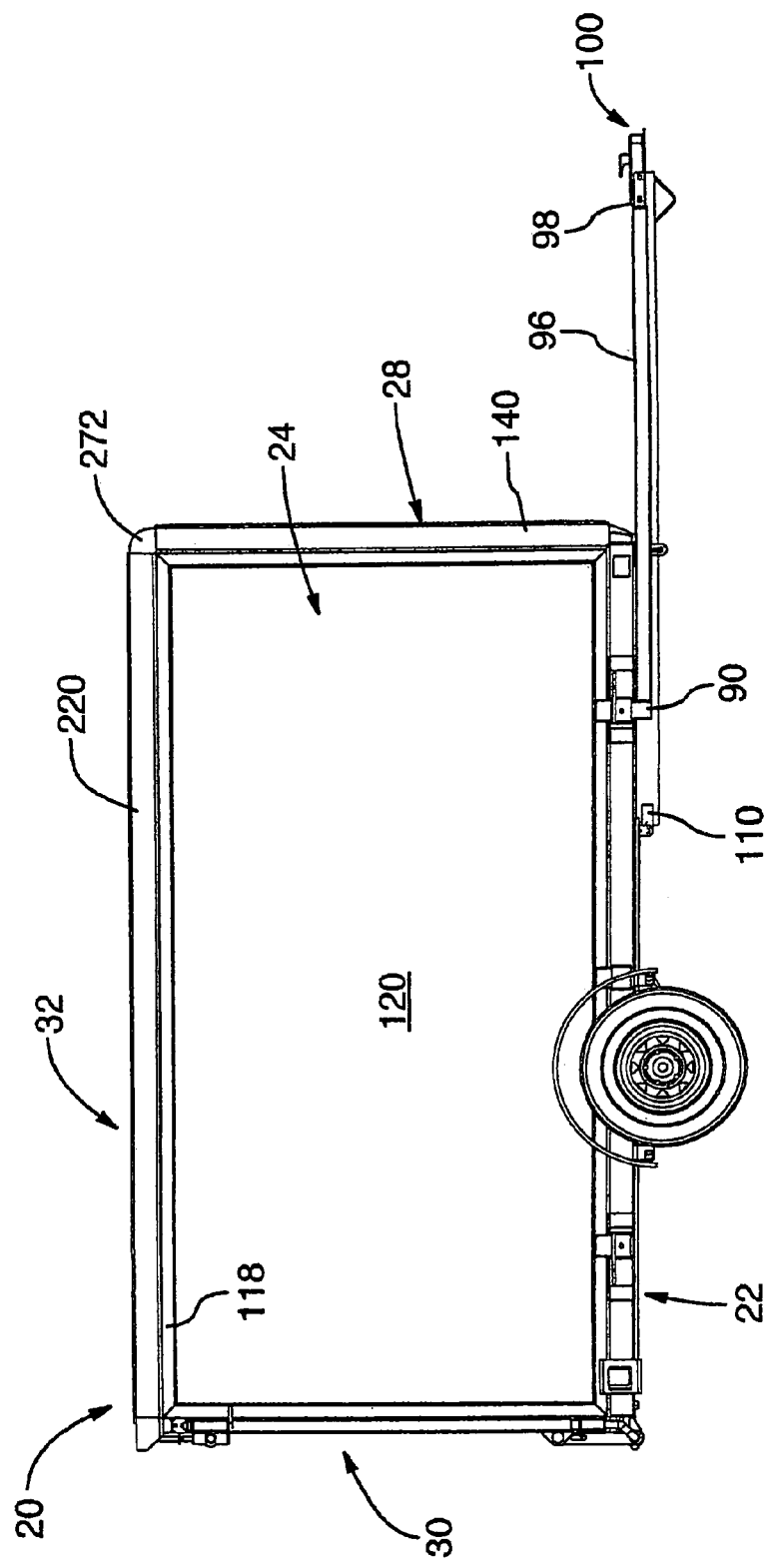
FIG. 6 is a right side elevation view of the assembled covered utility trailer shown in FIG. 1.

Sidewalls 24 and 26 are now more fully described with reference to FIGS. 1 and 6. As sidewall 24 and 26 are generally identical to each other in every respect, for the purposes of this description it will suffice to describe only one sidewall—sidewall 24. The description that follows will apply to sidewall 26 with appropriate modifications made to take into account the fact that certain corresponding components bear different reference numerals.

Sidewall 24 includes a generally rectangular panel 120 constructed of chip-resistant, reinforced fiberglass laminate. It will however be appreciated that other lightweight, strong and relatively wear resistant materials may be used to make the panel 120. In this embodiment, the panel 120 has a foam gasket 118 mounted about its edges to enhance the friction fit of the panel with the other components during assembly. As will be explained in greater detail below, panel 120 is connected to the trailer bed 22 by way of a rail member 122 which is itself secured to the side sill 52.

Figure 17C:
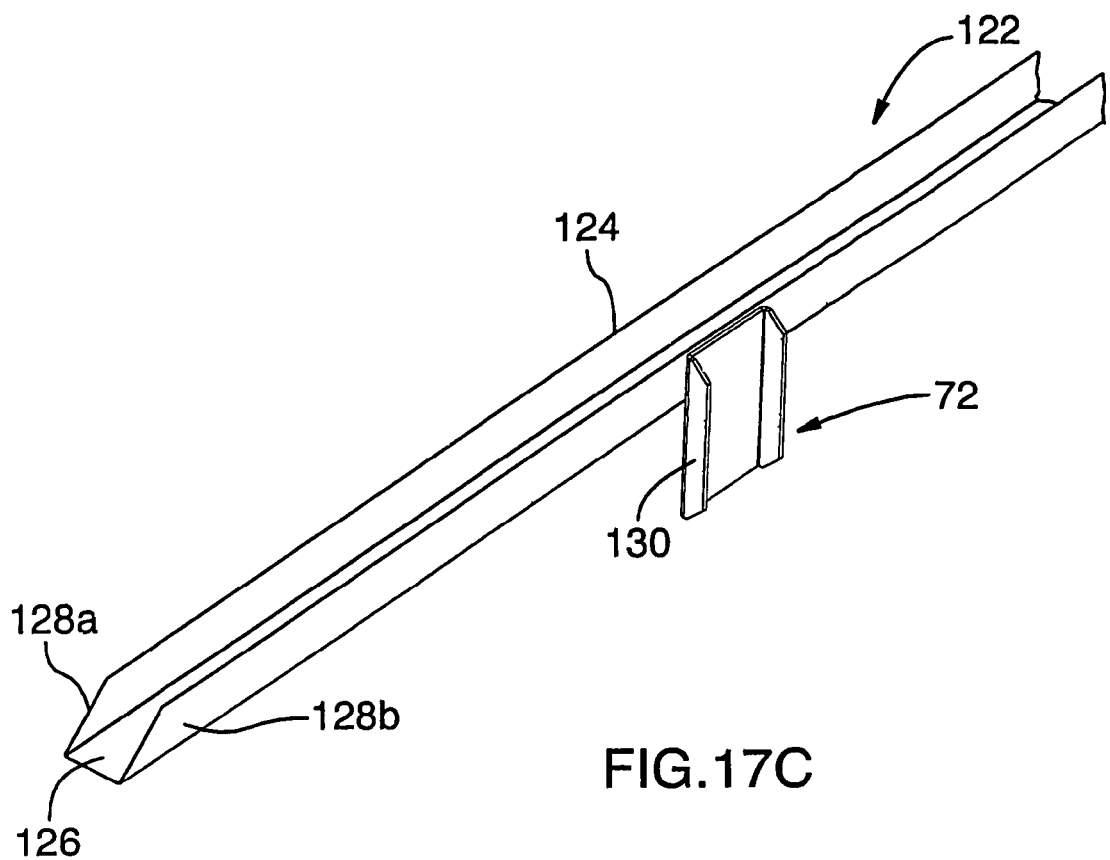
Figures 18A, 18B:
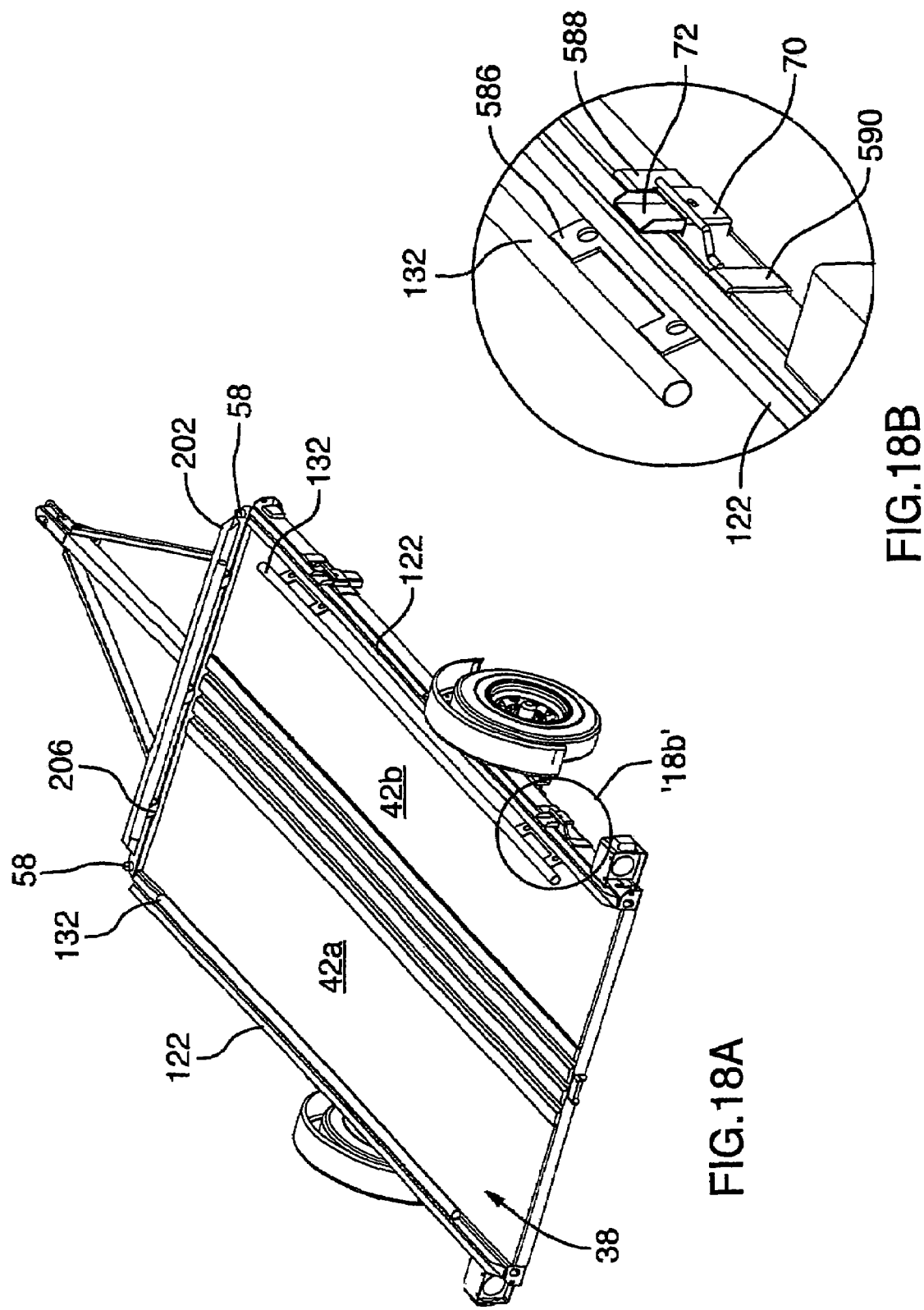
FIG. 18a is a rear right perspective view similar to that illustrated in FIG. 17a showing the rail member and the tie-down rail operatively connected to the trailer bed.
FIG. 18b is a magnified, rear right perspective view similar to that illustrated in FIG. 18a showing the encircled portion "18b"

As best shown in FIG. 17c, the rail member 122 is a generally C-shaped, elongate channel section 124 formed with a back 126 and a pair of spaced apart arms 128a and 128b joined to the back 126 and extending away therefrom. The space between the arms 128a and 128b is sized only slightly larger than the width of the panel 120 (in the area of the foam gasket 118) so as to ensure a snug, friction-fit between the rail member 122 and the bottom edge of panel 120 during assembly. The back 126 of channel section 124 is positioned atop the top face of side sill 52. The rail member 122 is fixed to the side sill 52 by a plurality of post members 72 received within the corresponding plurality of pockets 70 formed on side sill 52 as shown in FIG. 18b. In this embodiment, the post members 72 are formed by welding the backs of vertically oriented channel sections 130 onto the channel arm 128b of the channel section 124. The ends of rail member 122 terminate at a 45-degree angle so as to form a mitre joint with the corresponding rail members of the rear cargo access door assembly 30 and the corner post members 140 and 142.

Advantageously, the foregoing pocket and post member arrangement also serves to anchor the side tie-down rail 132 to the trailer bed 22. The side tie-down rail 132 is disposed within the interior cargo storage space 34 and runs along its entire length. The tie-down rail 132 may be used to secure cargo within space 34 during transport.

Referring to FIG. 17d, each side tie-down rail 132 includes an elongate tubular member 580 and a pair of mounting brackets 582 and 584 depending from the tubular member 580, for attaching the side tie-down rail 132 to the side sills 52 and 54. The mounting brackets 582 and 584 are spaced apart from each other with each bracket 582, 584 being disposed adjacent one end of the tubular member 580. Each of the mounting brackets 582, 584 is joined to the tubular member 580 by an attachment plate 586. Each of the mounting brackets 582, 584 is formed by a generally C-shaped member 588 having a back 590 and a pair of spaced apart arms 592a and 592b joined to the back 590 and extending away therefrom. The attachment plate 586 is welded to the terminal end of the arm 592a and extends therefrom toward the tubular member 580 on a slant. The space between the arms 592a and 592b is sized to correspond generally to the depth of the side sill 52, 54. When assembled to the side sill 52, 54 (as shown in FIGS. 18a and 18b), the arms 592a and 592b retain the side sill 52, 54 therebetween with the arm 592a abutting the top face of the side sill 52, 54. A cutout 594 defined in back 590 of the C-shaped member 588 provides a clearance for pocket 70. When mounted to the side sill 52, 54, the side rail member 122 maintains the mounting brackets 582 and 584 securely in place.

While in the preferred embodiment, the trailer 20 includes a pair of side tie-down rails 132, it will be appreciated that in alternative embodiments, a single tie-down rail may be provided. In a further alternative trailer, the tie-down rails could be omitted altogether.

Referring now to FIGS. 19a to 19d and 22a, the corner post members 140 and 142 join the sidewall 24 and 26 to the trailer bed 22 as well as to the front wall 28. Each corner post member 140, 142 includes an elongate panel 144 having a generally arcuate profile when viewed from above, a pair of rail members 146 and 148 welded to the longitudinal edges of the corner panel 144, and a pair of upper and lower gusset plates 150 and 152 welded along their edges to both the arcuate panel 144 and the rail members 146 and 148.

As rail members 146 and 148 are mirror images one of the other, for the purposes of this description, it will be sufficient to describe rail member 146 only. Rail member 146 is generally similar to rail member 122 in that it is adapted to retain the side edge of panel 120 by friction-fit and is generally a C-shaped, elongate channel section 154. However, in contrast to channel section 124 that is of unitary construction, channel section 154 is formed by a pair of first and second Z-shaped sections 156 and 158 joined to each other. The first Z-shaped section 156 includes first, second and third portions 160, 162 and 164. The second portion 162 joins the first portion 160 to the third portion 164. When viewed in top plan, the second portion 162 can be seen to have a generally perpendicular orientation relative to the first portion 160. Likewise, the third portion 164 is generally perpendicular to the second portion 162, except that it extends away in a direction opposite to that of the first portion 160.

The second Z-shaped section 158 is generally similar to the first Z-shaped section 156 in that it has first, second and third portions 170, 172 and 174. Moreover, the second portion 172 extends perpendicular to the first portion 170, while the third portion 174 is bent so as to be perpendicular to the second portion 172 and to extend in a direction opposite to the first portion 170. The third portions 164 and 174 of the Z-shaped sections 156 and 158 abut one another along their entire length and are fastened to each other by welding. Thus fastened, the third portions 164 and 174 define a lip 176 to which is welded to the longitudinal edges of the arcuate panel 144.

Figure 19D:
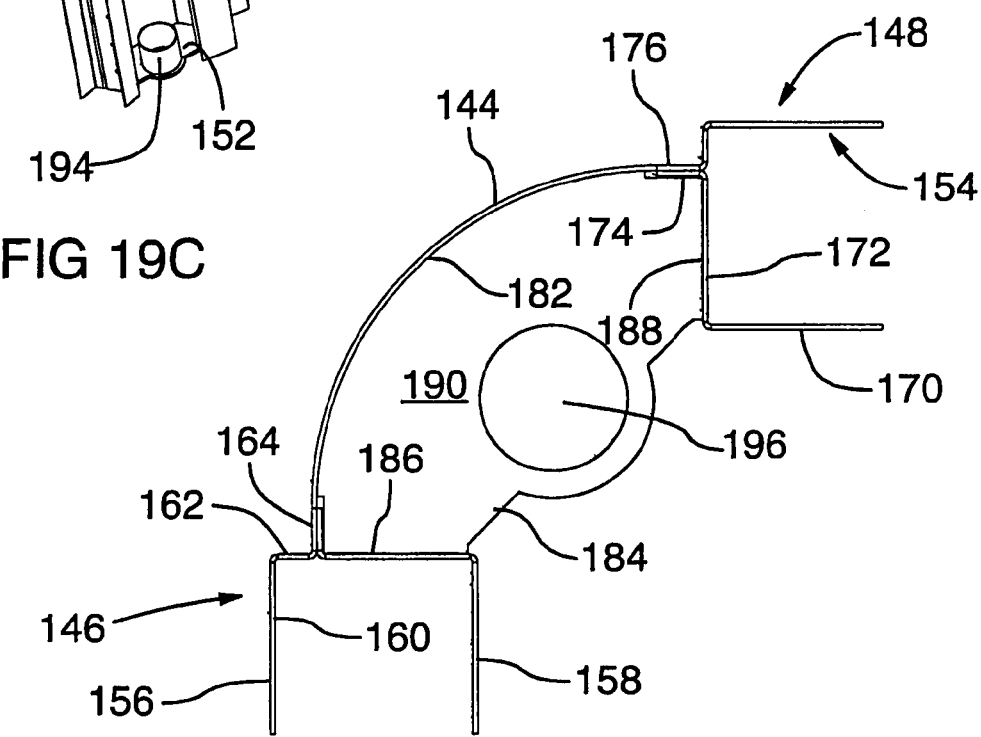
FIG. 19d is a top plan view of the corner post member shown in FIG. 19c.

As shown in FIG. 19d, the first portions 160 and 170 of the Z-shaped sections 156 and 158 define the arms of channel section 154. The channel section 154 has a space defined between its arms that is sized slightly larger than the width of panel 120 (in the area of the foam gasket 118) so as to ensure a snug, friction-fit between the rail member 146 and the panel 120. The orientation of the rail members 146 and 148 relative to each other is such that the panel 120 held by rail member 146 is generally perpendicular to panel 200 held by rail member 148.

Each gusset plate 150 and 152 is formed with a profile that generally corresponds to the interior profile of the corner post member 140. More specifically, the profile of each gusset plate 150 and 152 is defined by an arcuate edge 182, a first straight edge 184 disposed opposite the arcuate edge 182 and a pair of opposed, second and third straight edges 186 and 188 extending between the arcuate edge 182 and the first straight edge 184. The arcuate edge 182 conforms substantially to the curvature of the arcuate panel 144 thereby allowing the gusset plates 150 and 152 to be welded to the arcuate panel 144 along their arcuate edges 182. Similarly, the gusset plates 150 and 152 are welded to the backs of channel sections 154 of rail members 146 and 148 along their second and third straight edges 186 and 188. Additional reinforcement in the area of the gusset plates 150 and 152 is provided by plates 190 and 192 that are welded to the arcuate panel 144 and the channels sections 154.

Each gusset plate 150, 152 has a generally tubular sleeve member 194 welded thereto. The sleeve members 194 extend away from their respective gusset plates 150 and 152 toward the centre of the corner post member 140. An opening 196 defined in the gusset plate 150, 152 communicates with the passageway of the sleeve member 194. As will be explained in greater detail below, the sleeve members 194 cooperate with guide pins provided on the roof assembly 32 and trailer bed 22 to facilitate the alignment of the corner post members 140 with the roof assembly 32 and trailer bed 22 during assembly of the covered trailer 20.

Figure 4:
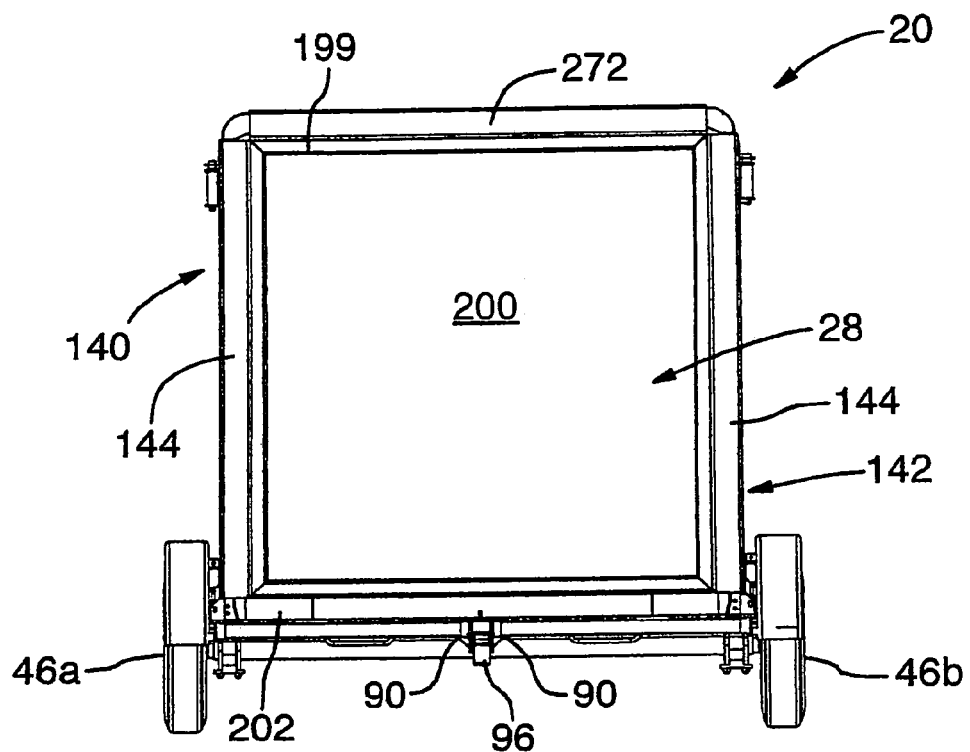
FIG. 4 is a front elevation view of the assembled covered utility trailer shown in FIG. 1.
Figure 21:
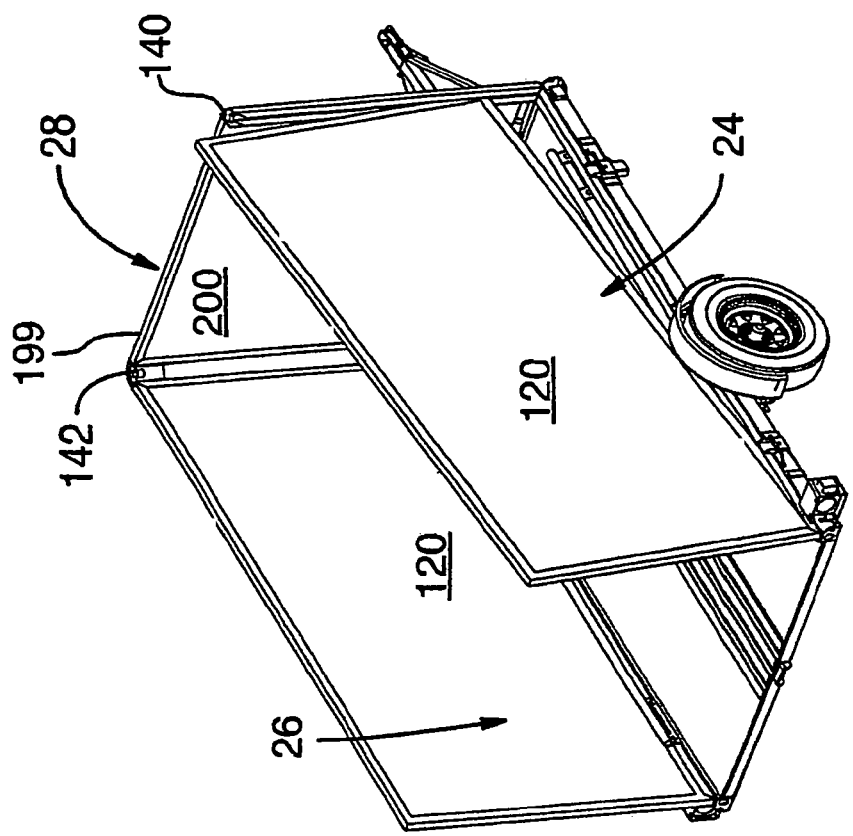
FIG. 21 is a rear right perspective view of the trailer bed similar to that illustrated in FIG. 20 showing the second sidewall panel being assembled to the trailer bed.

Referring now to FIGS. 4, 17a and 21, the front wall 28 includes a generally square panel 200 similar to panel 120 in that the latter is also constructed of chip-resistant, reinforced fiberglass laminate and has a foam gasket 199, similar to foam gasket 118, mounted about its edges. The panel 200 is mounted between, and firmly secured to, the corner post members 140 and 142—its side edges being retained by rail members 146 and 148 of corner post member 142 and 140, respectively. Similarly, the panel 200 is mounted to the trailer bed 22 by a rail member 202 positioned atop the top face of front end sill 55.

The rail member 202 is generally similar to rail member 122 used to secure panel 120, in that it is also a generally C-shaped, elongate channel section 204 formed with a back and a pair of spaced apart arms. The space between the arms of the channel section 204 is sized only slightly larger than the width of the panel 200 (in the area of foam gasket 199) at the so as to ensure a snug, friction-fit between the rail member 202 and the bottom edge of panel 200 during assembly. However, in contrast to rail member 122, the rail member 202 does not have a plurality of pockets depending therefrom. More specifically, the rail member does not use a pocket/post member arrangement to secure the rail member 202 to front end sill 55. Instead, conventional fasteners (i.e. screw, bolts) are used to attach the rail member 202 to the front end sill 55. Formed in the back of channel section 204, are apertures (not shown) that are adapted to receive such fasteners.

Advantageously, the foregoing attachment means also permits fastening of the front tie-down rail 206 to the trailer bed 22. The front tie-down rail 206 is disposed within the interior cargo storage space 34 adjacent the front wall 28. It runs the along the entire width of the space 34 and may be used to secure cargo within space 34 during transport.

Referring to FIG. 17e, there is shown a front tie-down rail 206. The tie-down rail 206 includes an elongate tubular member 600 generally similar to tubular member 580 of tie-down rail 132 and a plurality of mounting arms 602, 604 and 606 depending from the tubular member 600, for attaching the front tie-down rail 206 to the front end sill 55. The mounting arms 602, 604 and 606 are spaced apart from each other with each arm 602, 606 being disposed adjacent one end of the tubular member 600 and arm 604 being disposed midway therebetween.

Each mounting arm 602, 604 and 606 has a first portion 608 welded to the tubular member 600 and a second portion 610 joined to the first portion 608, for abutting the top edge of the front end sill 55. The first portion 608 is welded to the proximal end of the second portion 610 and extends therefrom toward the tubular member 600 on a slant. The second portion 610 has apertures (not shown) that receive the fasteners used to secure the rail member 202 to the front end sill 55.

While in the preferred embodiment, the trailer 20 includes a front tie-down rails 206, it will be appreciated that in an alternative embodiment, the front tie-down rail could be omitted altogether.

Referring to FIGS. 2 and 25a to 25d, the roof assembly 32 includes a roof support structure 210 and a roof panel 212 secured to the roof support structure 210. The roof panel 212 is generally rectangular and is made of tear-proof, translucent fiberglass. The roof support structure 210 has a pair of spaced apart, elongate, side rail members 214 and 216 and a plurality of rib-like cross-members 218a, 218b, 218c, 218d, 218e, 218f and 218g (collectively, "cross-members 218") that extend between the side rail members 214 and 216 and serve to tie the rail members to each other. The side rail members 214 and 216 are welded to the underside of the cross-members 218. Additionally, running substantially parallel to the side rail members 214 and 216, are first and second, generally arcuate panels 220, 222 not unlike arcuate panel 144 of corner post member 140, 142. As will be explained in greater detail below, the arcuate panels 220 and 222 are fitted on top of, and fastened to, the end portions of the cross-members 218.

The side rail members 214 and 216 are generally similar to rail members 146 and 148 in that the latter are also built-up channel sections. These channel sections (designated with reference numeral 230) are each formed by a pair of first and second Z-shaped sections 232 and 234 joined to each other in a configuration similar to that of the Z-shaped sections 156 and 158. More specifically, the first Z-shaped section 232 has first, second and third portions 236, 238 and 240 and the second Z-shaped section 234 includes first, second and third portions 242, 244 and 246. As shown in FIG. 25c, the third portions 240 and 246 of the Z-shaped sections 232 and 234 about one another along their entire length to define a lip 248 that is welded to the longitudinal edges of arcuate panel 220, 222 (as the case may be). The first portions 236 and 242 of the Z-shaped sections 232 and 234 define the arms of channel section 230. The channel section 230 has a space defined between the first portions 236 and 242 that is sized slightly larger than the width of panel 120 so as to ensure a snug, friction-fit between the side rail member 214, 216 and the panel 120.

Figure 23A:
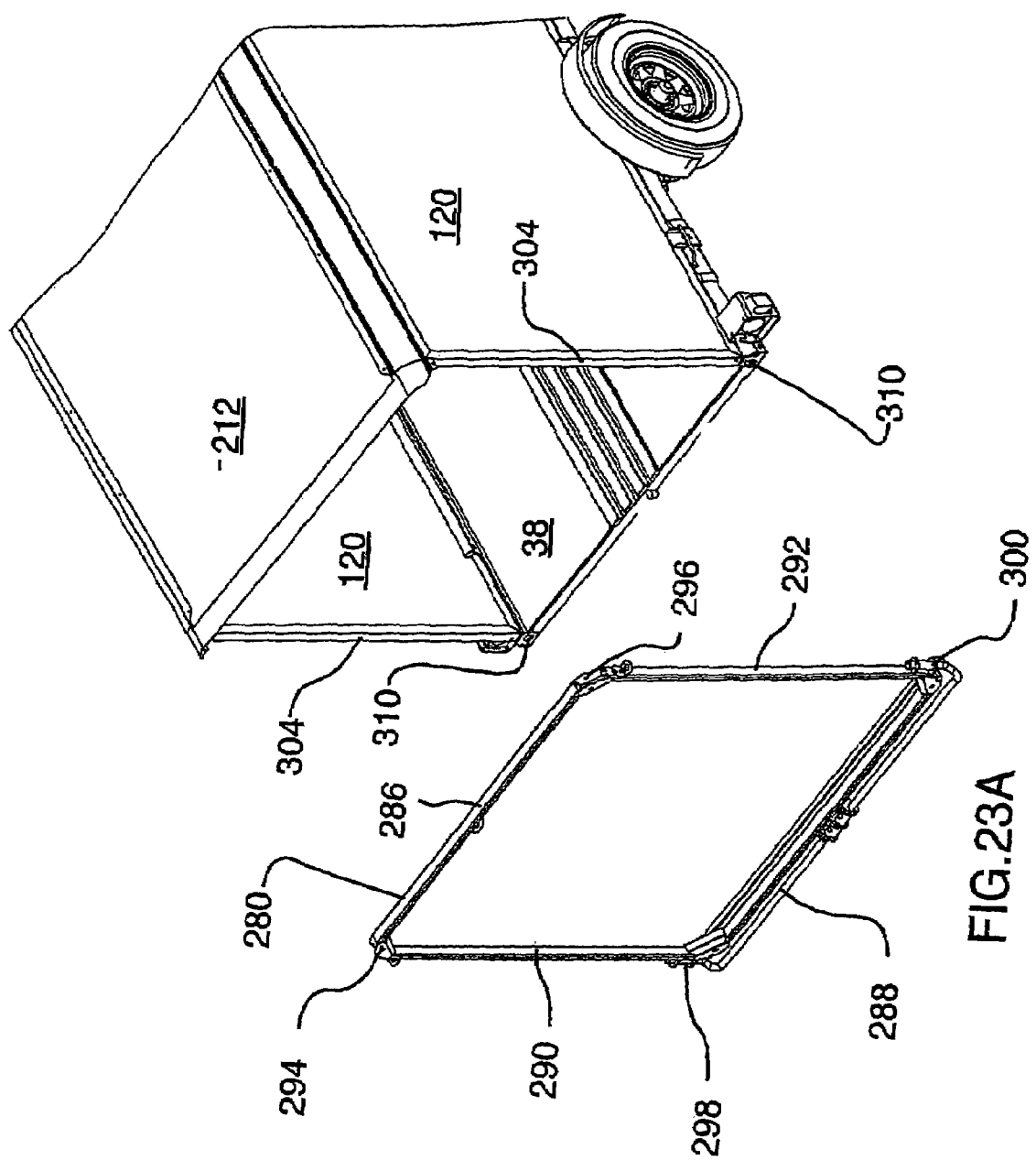
FIG. 23a is a rear right partial perspective view of the trailer bed similar to that illustrated in FIG. 21 with the sidewall and front wall panels shown assembled to the trailer bed, the roof assembly shown mounted to the sidewall and front wall panels, and the door frame shown exploded.
Figure 23B:
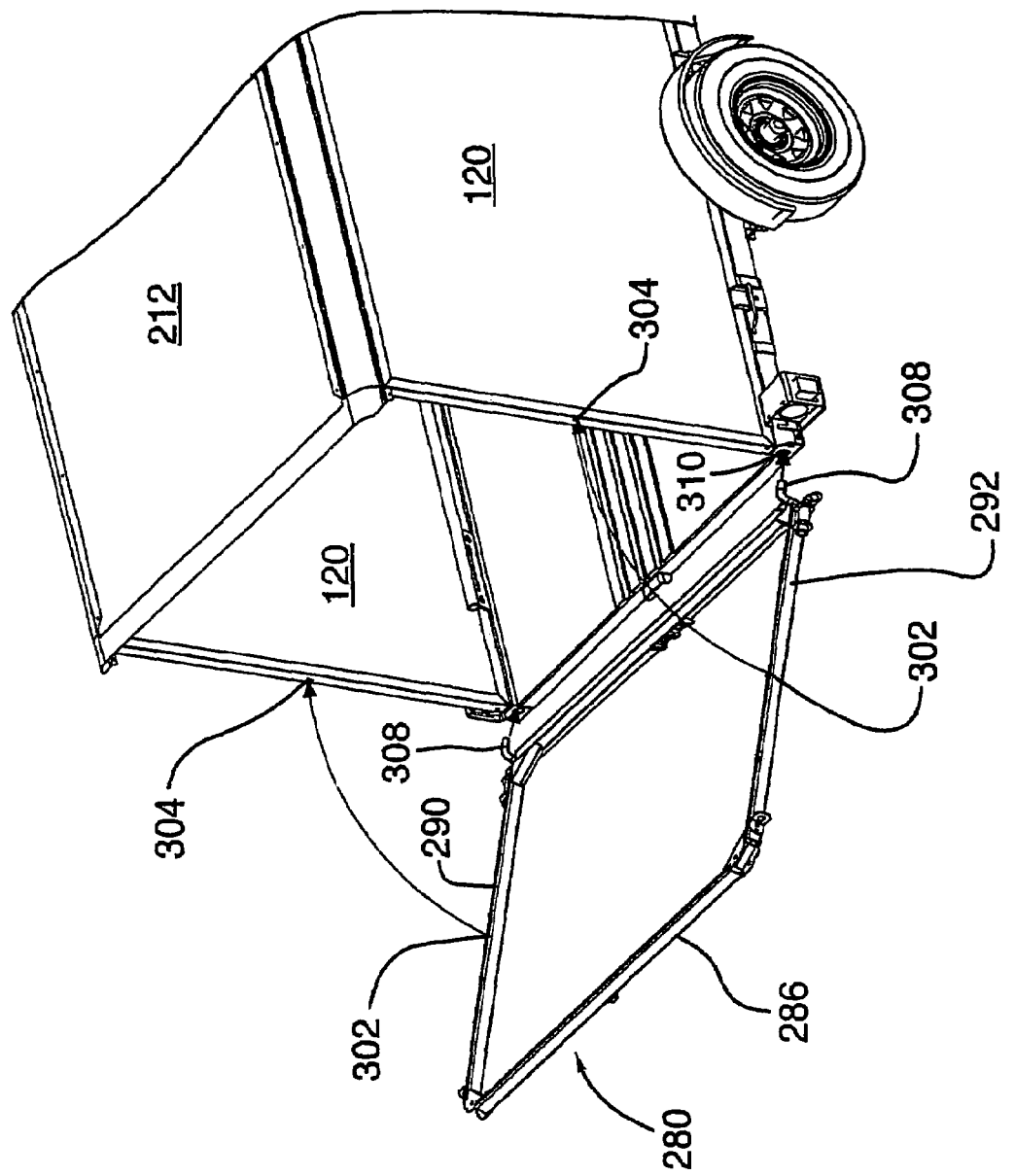
FIG. 23b is rear right partial perspective view of the partially assembled trailer similar to that illustrated in FIG. 23a with the door frame shown oriented for mounting to the trailer bed.
Figure 23C:
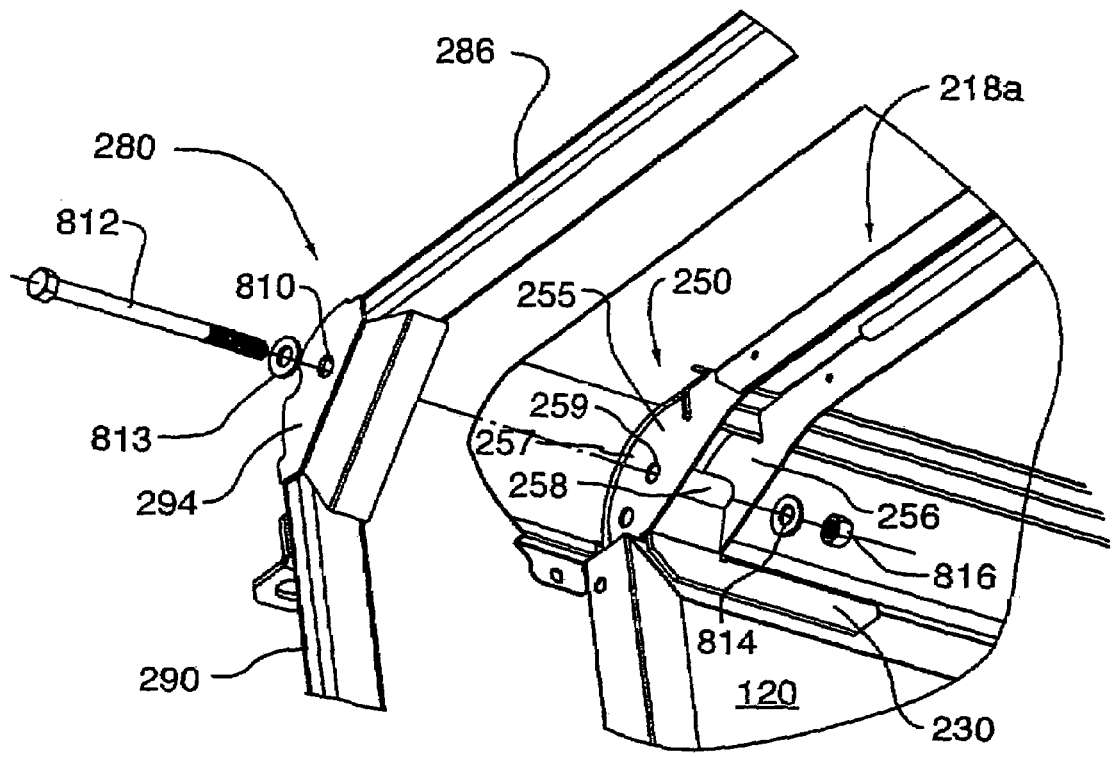
FIG. 23c is a magnified perspective view of the exterior rear corner of the partially assembled trailer illustrated in FIG. 23b showing the corner of the door frame and fasteners exploded.

Each cross-member 218 has a pair of opposed end portions 250 and 252, and a substantially straight, intermediate portion 254 disposed between the end portions 250 and 252. In cross-section, the intermediate portion 254 can be seen to be generally C-shaped. As shown in FIG. 25b, the end portions 250 and 252 curve slightly downwardly relative to the intermediate portion 254 thereby giving the cross-members 218 their rib-like appearance. The profile of each of the first and second arcuate panels 220 and 222 is adapted to conform substantially to the curved profile of the end portions 250 and 252 so as to permit attachment of the arcuate panels 220 and 222 to the cross-members 218. Each end portion 250, 252 terminates in a generally straight edge 253 to which is fastened the back of channel section 230. As best shown in FIG. 23c, the end portions 250, 252 are built-up sections that include a pair of spaced apart sidewalls 255, 256 joined to each other by a curved wall 257. In cross-member 218a, a tube section 258 is welded in place between the sidewalls 255 and 256 and is accessible through apertures 259 defined in the sidewalls. The tube section 258 is adapted to receive a fastener therethrough to attach a portion of the cargo access door assembly 30 to the roof assembly.

Figure 25A:
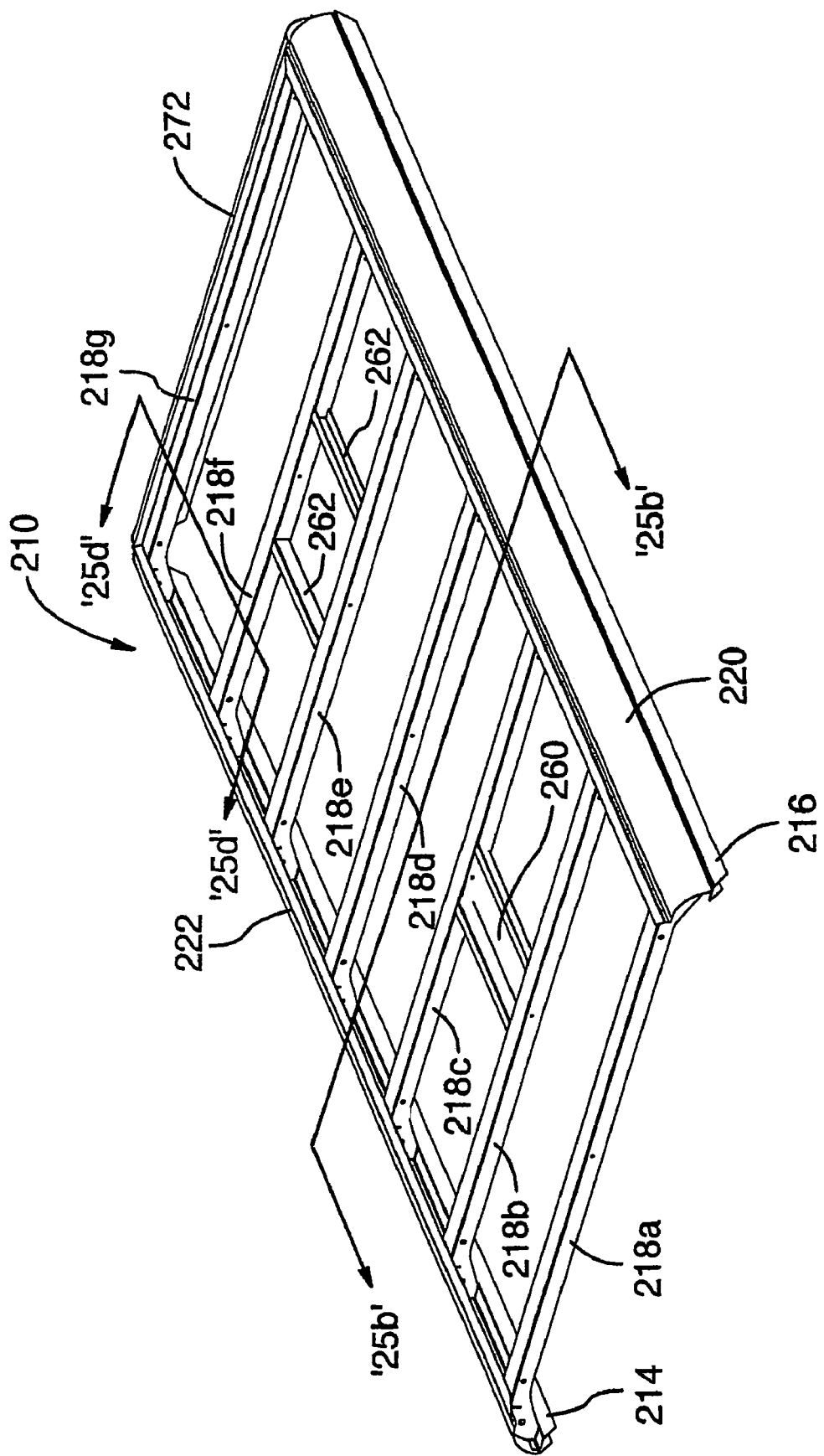
FIG. 25a is a rear right perspective view of the roof assembly shown in FIG. 22a with the roof panel removed.
Figure 25B:
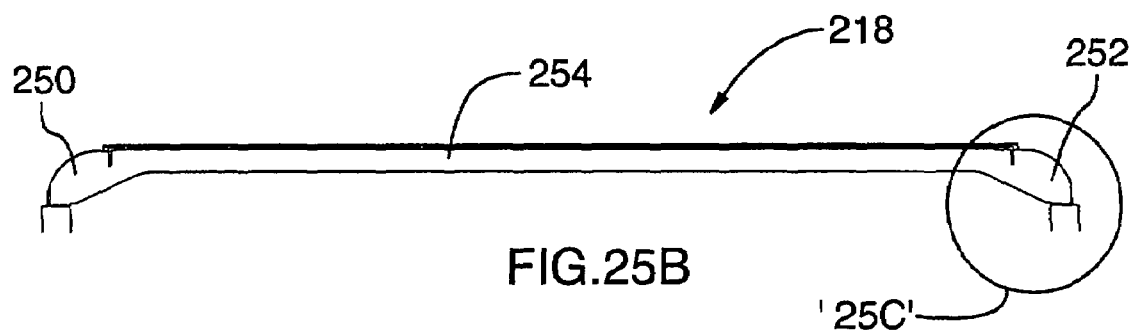
FIG. 25b is a cross-sectional view of the roof assembly shown in FIG. 25a taken along line '25b-25b'.
Figure 25C:
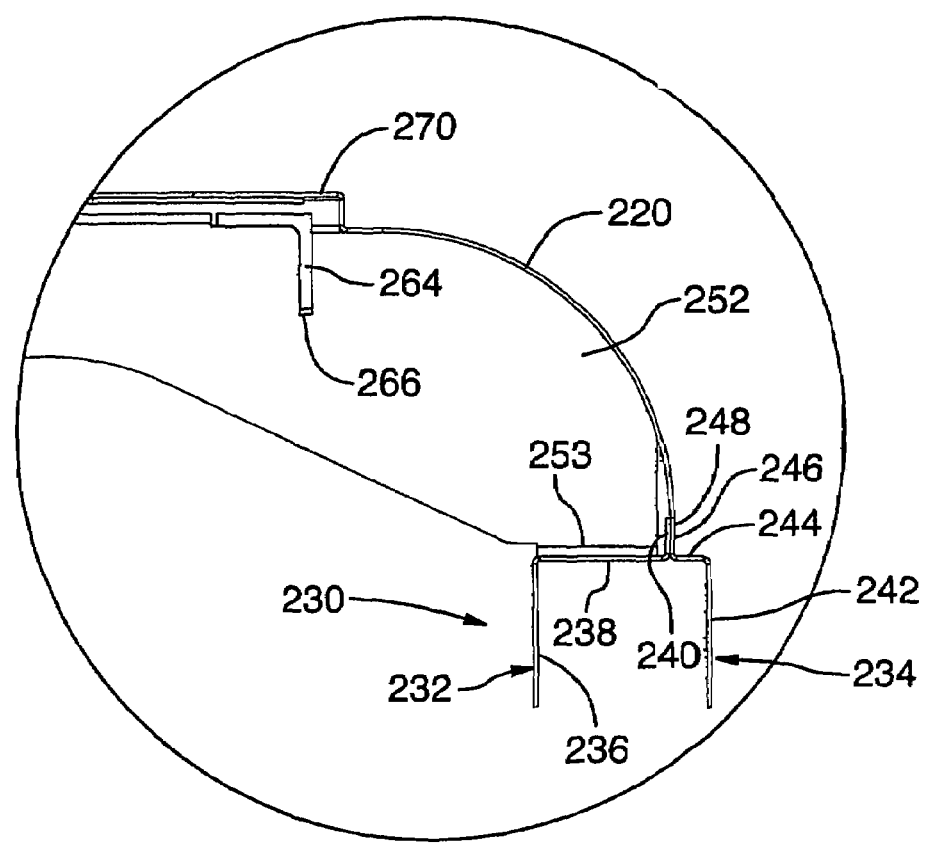
FIG. 25c is a magnified view of roof assembly shown in the encircled portion "25c" in FIG. 25b.

As shown in FIG. 25a, a lighting pan 260 is supported between adjacent cross-members 218b and 218c and a pair of support members 262 extends between adjacent cross-members 218e and 218f. The members 262 serve to support a roof vent (not shown) carried on the roof assembly 32. Also provided is a pair of angle irons 264 that runs parallel to the side rail members 214 and 216. Each angle iron 264 is attached to the top of the cross-members 218 proximate the transition area where the intermediate portion 254 meets the end portion 250 and the end portion 252. Defined in the cross-members 218 at each transition area, is a vertical notch 266. The notch 266 is adapted to receive one of the legs of the angle iron 264 therein. The other leg of the angle iron 264 abuts the top portion of each cross-member 218 and partially supports the roof panel 212. The roof panel 212 is maintained in position by a z-section member 270 that is welded along the topmost, longitudinal edge of each arcuate panel 220 and 222.

Figure 25D:
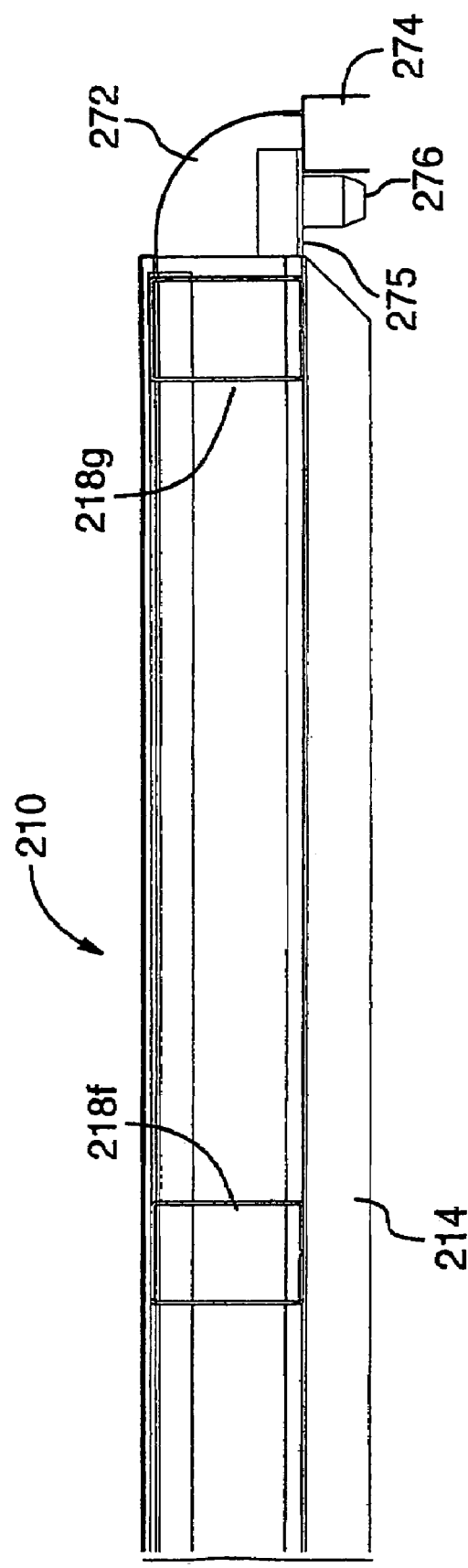
FIG. 25d is a cross-sectional view of the roof assembly shown in FIG. 25a taken along line '25d-25d'.

Referring specifically to FIG. 25d, depending from the end cross-member 218g is a third arcuate panel 272. The arcuate panel 272 carries a front rail member 274 that is adapted to receive and retain the top edge of panel 200 of the front wall 28. As the third arcuate panel 272 and the front rail member 274 are generally similar to their counterpart component—first and second arcuate panels 220 and 222 and side rail members 214 and 216, respectively—both in their configuration and their means of attachment no further description is required. As shown in FIG. 22b, a dog-legged plate member 275 is welded to the backs of the channel sections 230 thereby joining front rail member 274 to side rail member 214. Front rail member 274 is connected to the side rail member 216 in the same fashion. Depending downwardly from the plate member 275 is a guide pin 276. The guide pin 276 is generally similar to guide pin 58 described earlier. It has a generally frusto-conical tip 277 that has an aperture 278 defined therethrough for accommodating a fastener. Guide pin 276 is sized to fit within the tubular sleeve member 194 to facilitate alignment of the corner post member 140 with the roof assembly 32 during assembly of the covered trailer 20.

Figure 23D:
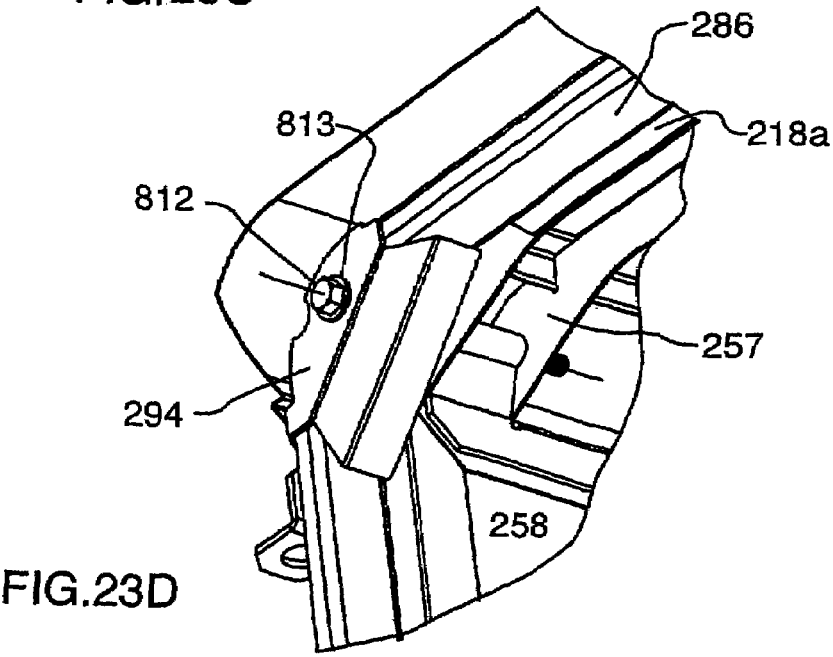
FIG. 23d is a magnified perspective view similar to FIG. 23c showing the corner of the door frame fastened to a portion of the roof assembly.

The rear cargo access door assembly 30 is now described in greater detail with reference to FIGS. 5, 7a and 8a. The rear cargo access door assembly 30 includes a generally square, door frame 280 and a pair of first and second, generally rectangular, cargo access doors 282 and 284 which are hinged for movement relative to the door frame 280. The door frame 280 has upper and lower, horizontally extending frame members 286 and 288 and first and second, spaced apart, vertical frame members or door jambs 290 and 292 that extend between the upper and lower frame members 286 and 288. The vertical frame members 290 and 292 are joined to the upper and lower horizontal frame members 286 and 288 at top reinforced corners 294 and 296 and bottom reinforced corners 298 and 300. As shown in FIG. 23b, located approximately midway between respective top and bottom corners, each vertical frame member 290 and 292 has a guide pin 302 that projects from front face 304 of the door frame 280. The guide pin 302 is sized to fit within an aperture 306 formed in the lateral edge of the side wall 24, 26 (as the case may be) and tends to facilitate alignment and connection of the door frame 280 during assembly of the covered trailer 26. In addition, at each bottom reinforced corner 298, 300, a downwardly depending, generally L-shaped, finger or hook member 308 extends away the front face 304. During assembly of the covered trailer 20, the hook members 308 are inserted in corresponding L-shaped openings 310 defined at either end of the rear end sill 56 and serve to secure the door frame to the trailer bed 22. Lastly, the door frame 280 is secured to the roof assembly 30 by fastening the top reinforced corners 294 and 296 to the cross-member 218a as shown in FIGS. 23c and 23d.

Each of the cargo access doors 282 and 284 is hung to the door frame 280 by an upper hinge assembly 320 and a lower hinge assembly 322. As will be explained in greater detail below, the upper and lower hinge assemblies 320 and 322 allow the cargo access doors 282 and 284 to assume a swing door or "barn door" style configuration or a ramp-forming configuration for increased versatility and convenience. In the swing door configuration, the cargo access doors 282 and 284 are pivotable about a vertical axis 'Y-Y' between a closed position 324 (shown in FIG. 5) and an open position 326 (shown in FIG. 9). In contrast, when used in their ramp-forming configuration, the cargo access doors 282 and 284 are pivotable about a horizontal axis 'X-X' between the closed position 324 and a ramp-deployed position 328 (shown in FIG. 10). Upper and lower door locking assemblies 330 and 332 are provided to maintain the cargo access doors 282 and 284 in the closed position 324.

Figure 12:
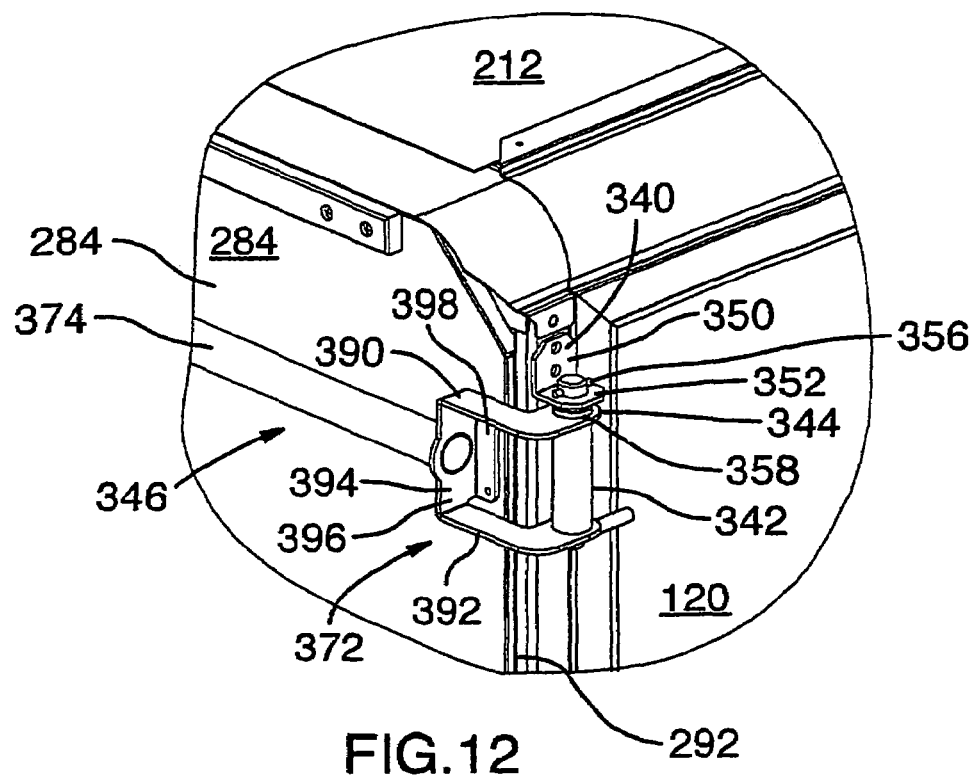
FIG. 12 is a magnified, rear right perspective view of the upper hinge assembly of the first rear cargo access door shown in the encircled portion "12" in FIG. 1, the upper hinge assembly being operatively connected to the trailer sidewall.
Figure 13:
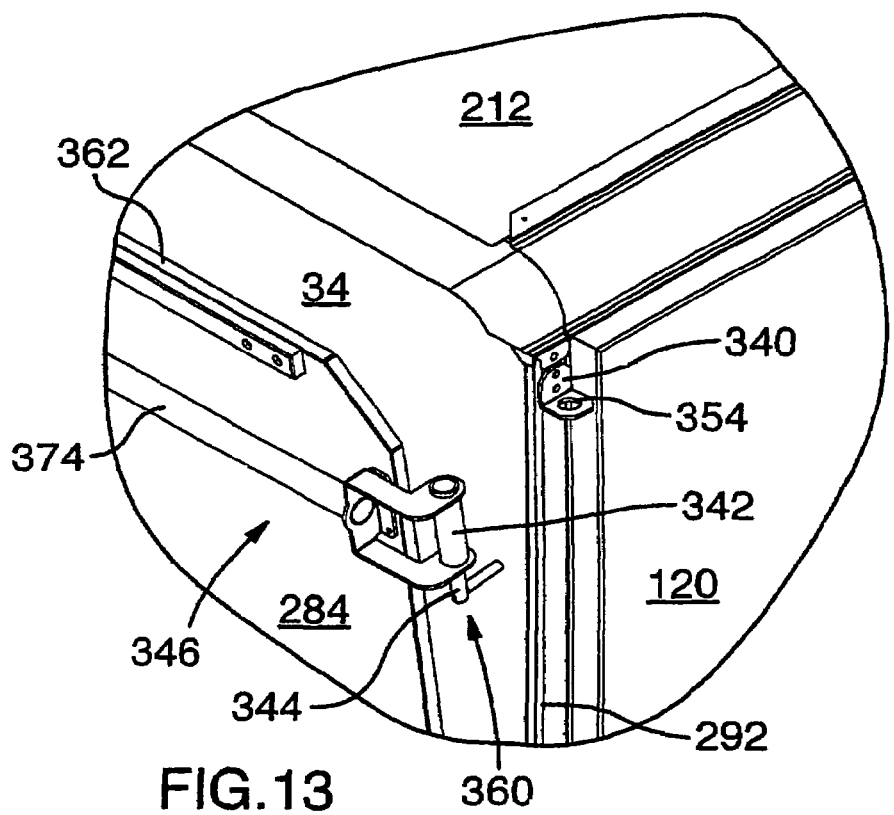
FIG. 13 is a magnified, rear right perspective view generally similar to that illustrated in FIG. 12 showing the upper hinge assembly of the first rear cargo access door unhinged to allow the door to move to its ramp-forming configuration.
Figure 14:
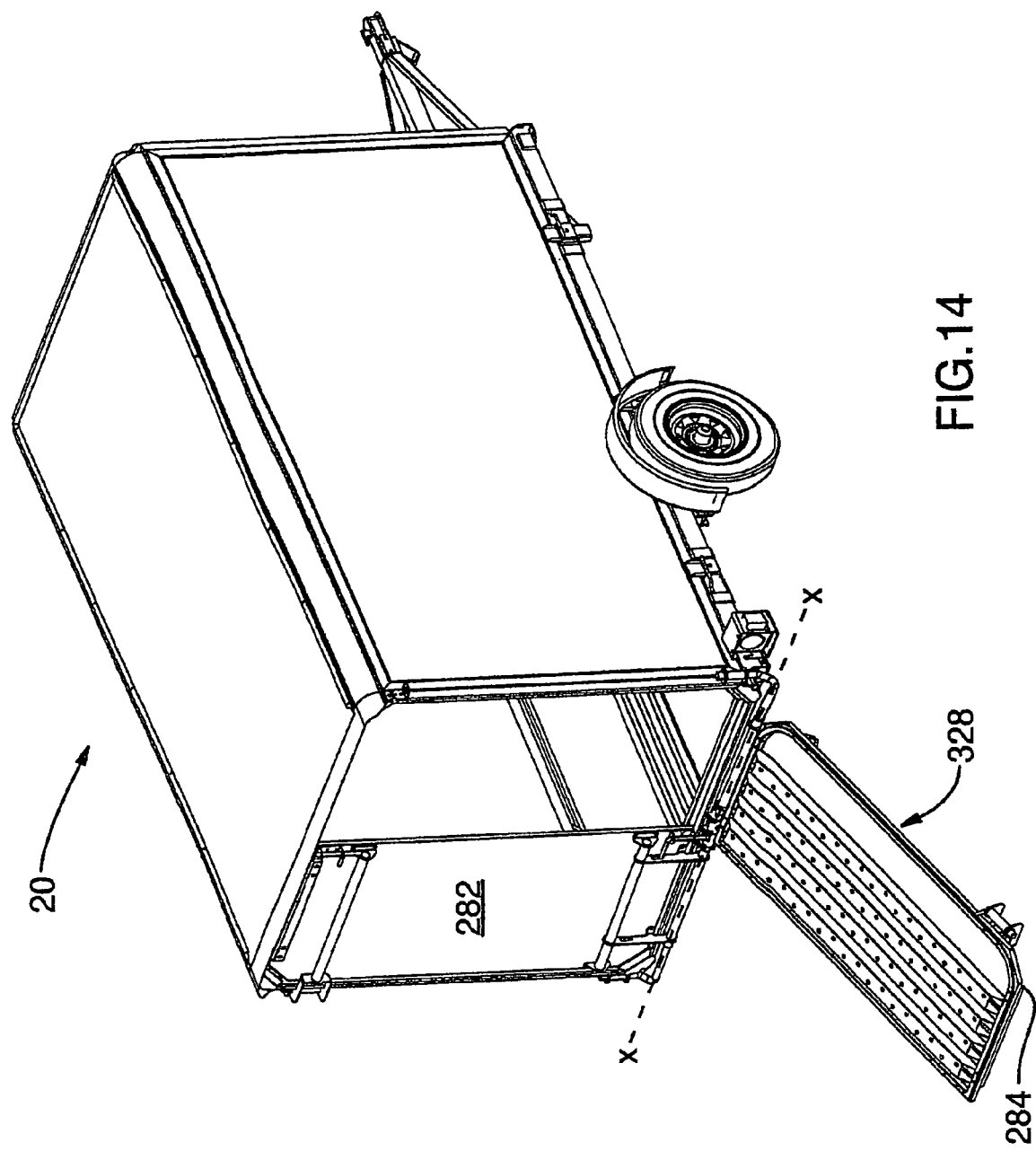
FIG. 14 is another rear, right perspective view of the assembled covered utility trailer illustrated in FIG. 1 showing one the rear cargo access door in a single ramp-forming configuration and the other rear cargo access door in the closed position.

With reference to FIG. 12, each upper hinge assembly 320 includes an upper hinge bracket 340, a cylindrical upper hinge knuckle 342, a spring-loaded, upper hinge pin 344 for insertion in the upper hinge bracket 340 and the hinge knuckle 342, and attachment means 346 for operatively connecting the hinge knuckle 342 to the upper portion of the cargo access doors 282, 284.

The generally L-shaped, upper hinge bracket 340 has a first arm 350 fixed to the vertical frame member 290, 292 (as the case may be) and a second arm 352 extending substantially perpendicularly from the first arm 350. The second arm 352 has defined therein an aperture 354 sized to receive an end of the hinge pin 344. When the cargo access door 282, 284 is in its swing door configuration, the upper hinge pin 344 is engaged within the aperture 354 and maintained in that position by pin locking means in the nature of a cotter pin 356.

The upper hinge pin 344 and its spring mechanism (not shown) are retained within the hinge knuckle 342. Upper attachment means 346 connects the hinge knuckle 342 to the cargo access door 282, 284 (as the case may be). The upper hinge pin 344 is moveable relative to the hinge knuckle 342 between an engaged position 358 wherein it is captively retained by the upper hinge bracket 340 (as shown in FIG. 12) and a disengaged position 360 wherein it is released from the upper hinge bracket 340 to permit the cargo access door 282, 284 to assume its ramp-forming configuration.

Upper attachment means 346 is disposed across the cargo access door 282, 284 a short distance from the top edge 362 of the door 282, 284. It includes a mounting plate 370, a mounting bracket 372 spaced apart from the mounting plate 370 and a tubular crossbar 374 extending therebetween. The mounting plate 370 and the mounting bracket 372 are configured to receive the ends of the crossbar 374 therethrough. The mounting plate 370 is fixed to the cargo access door 282, 284 near its longitudinal edge 366 while the mounting bracket 372 is secured to the cargo access door 282, 284 near the opposite longitudinal edge 368 of the door 282, 284.

The mounting plate 370 has a first portion 380 for abutting against the cargo access door 282, 284 and a second portion 382 joined to, and standing proud of, the first portion 380. The first portion 380 of the mounting plate 370 is attached to the cargo access door 282, 284 by conventional fasteners, such as bolts, screws and the like. The second portion 382 has an aperture defined therein that receives an end of the crossbar 374.

The mounting bracket 372 includes a pair of spaced apart, L-shaped arms 390 and 392 and a mounting plate 394 mounted therebetween that joins the arms 390 and 392 to each other. The mounting plate 394 has a first portion 398 for abutting against the cargo access door 282, 284 and a second portion 396 that is joined to the first portion 398. The second portion 396 stands proud of the first portion 398 and has an aperture formed therein. The aperture receives the other end of the crossbar 374. The L-shaped arms 390 and 392 are attached to the second portion 396 of the mounting plate 394 at their respective proximal ends. The hinge knuckle 342 is mounted between the terminal ends of the arms 390 and 392.

Referring to FIGS. 5, 7a, 8a and 8d, the lower hinge assembly 322 includes a hinge member 400, a pair of spaced apart, apertured, lower hinge brackets 402 and 404 adapted to receive a portion of the hinge member 400 for pivotal movement relative thereto, and lower attachment means 406 for connecting the hinge member 400 to the lower portion of the cargo access door 282, 284. The lower hinge brackets 402 and 404 are mounted to the vertical member 290, 292 of the door frame 280 a short distance up from the lower frame member 288. When the cargo access door 282, 284 is in its swing door style configuration, the apertures formed in the lower hinge brackets 402 and 404 are vertically aligned with the aperture 354 formed in the upper hinge bracket 340. Thus aligned, these apertures together define the vertical pivot axis 'Y-Y'.

In this embodiment, the hinge member 400 is made of steel tubing and is formed with a first, dog-legged, portion 410, a second elbow portion 412 and a third, generally straight, horizontally oriented portion 414. The first portion 410 has a first, generally straight, vertically oriented arm 416 and a second arm 418 joined to the first arm 416. The first arm 416 is mounted between, and retained by, the pair of lower hinge brackets 402 and 404. As shown in FIG. 6, the second arm 418 extends downwardly and away from the first arm 416 in a generally canted fashion, thus defining the dog-legged shape of the first portion 410 of the hinge member 400. The second elbow portion 412 extends downwardly from the second arm 418 of the first portion 410 and curves to meet the third portion 414. The elbow portion 412 is radiused such that the third portion 414 is seen to extend substantially perpendicular to the first arm 416 of the first portion 410 when the hinge member 400 is viewed in elevation as shown in FIG. 5.

The third portion 414 runs along the bottom edge 364 of the cargo access door 282, 284. As it extends away from the elbow portion 412 and toward the midpoint of the lower frame member 288, the third portion 414 passes through a tubular section 422. The tubular section 422 is concentrically mounted to the third portion 414 and is adapted for rotational movement relative thereto. Beyond the tubular section 422, the third portion 414 is supported by at least one generally C-shaped retaining member 424. The C-shaped retaining member 424 has an opening defined therein sized to permit the third portion 414 to swing clear of the retaining member when the door 282, 284 is deployed in the swing door configuration.

At its terminal end, the third portion 414 is ultimately received within a cylindrical member 426 that is retained between a pair of adjacent retaining members 424. The cylindrical member 426 has a longitudinal cutout 428 defined therein to accommodate, the terminal end of third portion 414. The longitudinal cutout 428 provides clearance for the terminal end of the third portion 414 to egress/access the cylindrical member 426 when the cargo access door 282, 284 is swung open or closed. The cylindrical member 426 is rotatable about the horizontal axis 'X-X' thereby permitting rotational displacement of the cutout 428 between a blocking position (not shown) and a clearance position 432 relative to the third portion 414. In the blocking position, the cylindrical member 426 is oriented with the cutout 428 lying out of alignment with the openings defined in the retaining members thereby causing the terminal end of the third portion 414 to be captively retained within the cutout 428, and impeding deployment of the door 282, 284 in the swing door configuration. This safety feature prevents the door 282, 284 from accidentally becoming detached along its horizontal axis when the door 282, 284 is being deployed in its ramp-forming configuration. In the clearance position 432, the cylindrical member 426 is oriented with the cutout 428 lying in alignment with the openings defined in the retaining members 424 thereby allowing the third portion 414 to swing clear of the cutout when the door 282, 284 is deployed in the swing door configuration and is moved between the closed position 324 and the open position 326.

Additionally, the cylindrical member 426 has a bore 430 formed through its body transverse to its longitudinal axis. The bore 430 is adapted to receive a portion of the lower door locking assembly 322. When the cargo access door 282, 284 is used in its ramp-forming configuration, the passageway of the tubular section 422 is horizontally aligned with the cutout 428 of the cylindrical member 426. Thus aligned, the passageway and the cutout together define the horizontal pivot axis 'X-X'.

Figure 5:
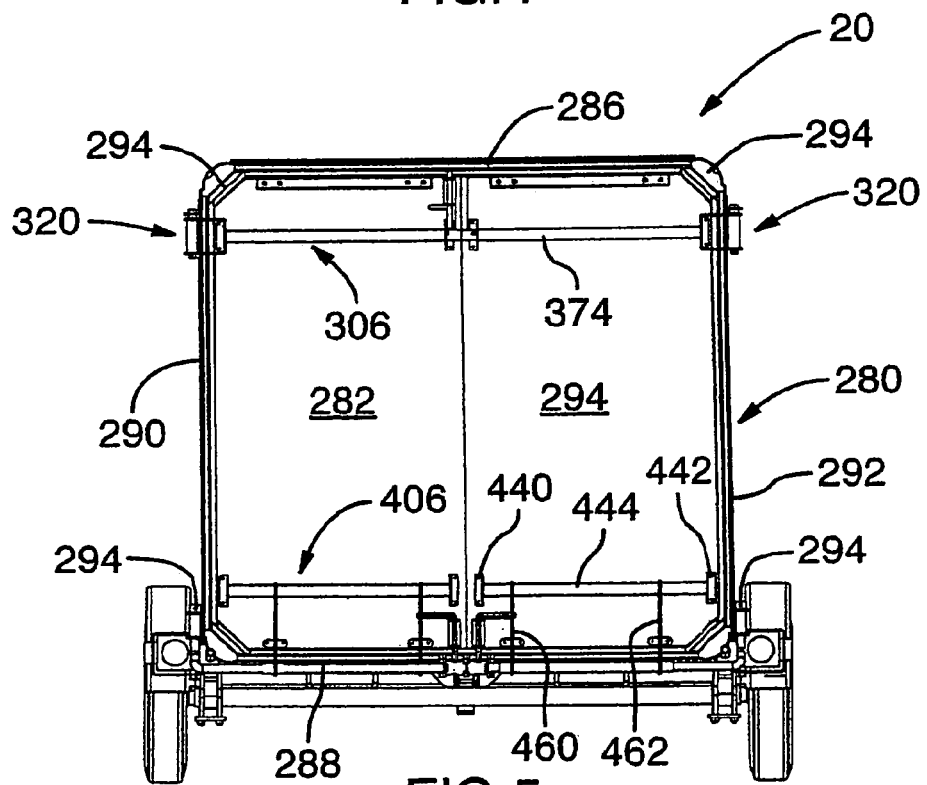
FIG. 5 is a rear elevation view of the assembled covered utility trailer shown in FIG. 1.
Figure 7A:
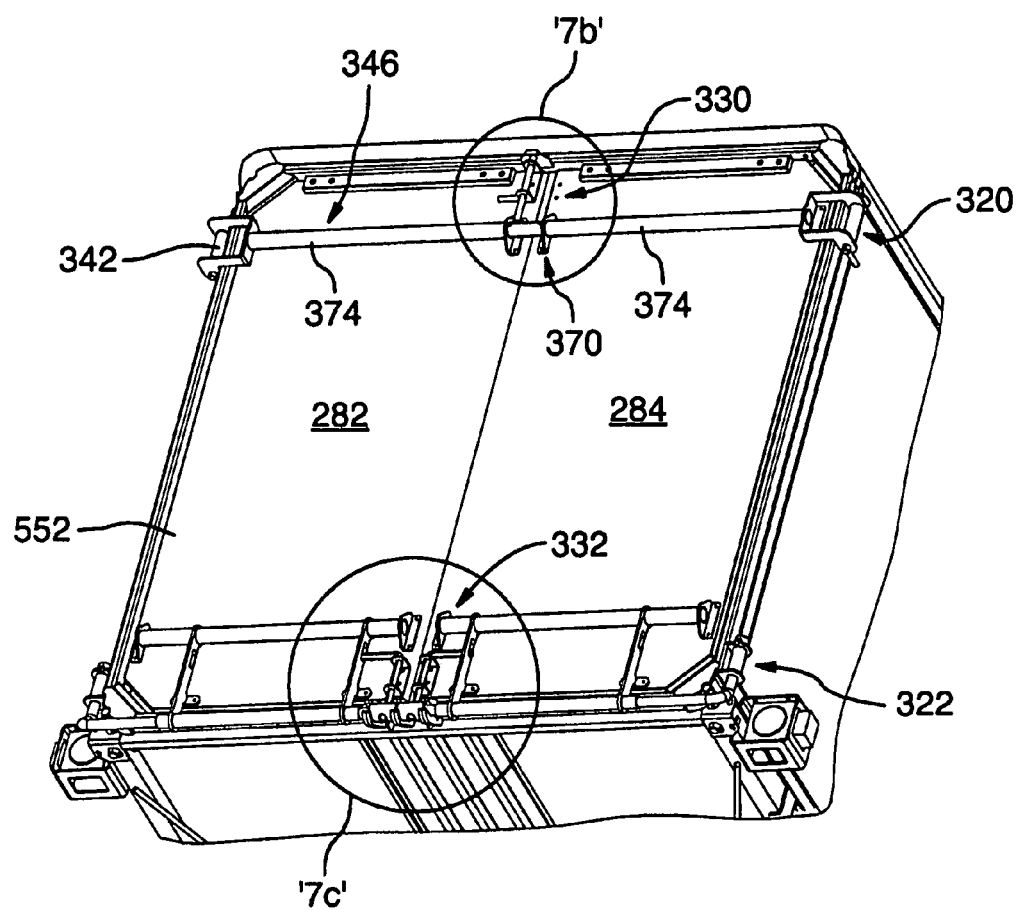
FIG. 7a is a bottom right perspective view of the rear end of the assembled covered utility trailer illustrated in FIG. 1 with its cargo access doors shown in a closed position.

Referring specifically to FIGS. 5, 7*a* and 8*a*, the lower attachment means 406 is disposed across the cargo access door 282, 284 a short distance from the bottom edge 364 of the door 282, 284. The lower attachment means 406 includes first and second, spaced apart, lower mounting plates 440 and 442 and a tubular crossbar 444 extending between the mounting plates 440 and 442. The mounting plate 440 is fixed to the cargo access door 282, 284 near its longitudinal edge 366 while the mounting plate 442 is secured to the cargo access door 282, 284' near the opposite longitudinal edge 368 of the door 282, 284.

Each mounting plate 440 and 442 is generally similar to mounting plate 370 in that it has a first portion 446 for abutting against the cargo access door 282, 284 and a second portion 448 joined to, and standing proud of, the first portion 446. The first portion 446 of each mounting plate 440, 442 is attached to the cargo access door 282, 284 by conventional fasteners, such as bolts, screws and the like. An aperture defined in the second portion 448 of each mounting plate 440, 442 receives the ends of the crossbar 444. The crossbar 444 is connected to the tubular section 422 by a pair of downwardly extending, spaced apart arms 460 and 462 that are fastened to the cargo access door 282, 284. Arm 460 is disposed adjacent mounting plate 440 while arm 462 is located near mounting plate 442. Arm 460 has defined therein a slot 464 that is adapted to receive a portion of a lower door locking assembly 332.

It will thus be appreciated that in the foregoing arrangement, the hinge member 400 may serve as a vertical hinge pin and a horizontal hinge pin for the cargo access doors 282 and 284. In this regard, the first arm 416 of the first hinge member portion 410 tends to function as the vertical hinge pin of the lower hinge assembly 322 when the cargo access door 282, 284 is used in its swing door configuration. More specifically, the first arm 416 rotates relative to the lower hinge brackets 402 and 404 (about the 'Y-Y' axis) as the cargo access door 282, 284 is moved to its open position 326. When the cargo access door 282, 284 is employed in its ramp-forming configuration, the third portion 414 tends to function as the horizontal hinge pin for the lower hinge assembly 322. As the cargo access door 282, 284 is moved to its ramp-deployed position 328, the tubular portion 422 (with cargo access door 282, 284 attached thereto) pivots relative to the third portion 414 (about the 'X-X' axis).

Referring to FIGS. 7*b*, 7*c*, 8*b* and 8*c*, the upper and lower door locking assemblies 330 and 332 are now described in greater detail. The upper door locking assembly 330 includes a horizontal latch assembly 480 and a vertical latch assembly 482. The horizontal latch assembly 480 is defined by the tubular crossbars 374 of the cargo access doors 282, 284 and a horizontal locking bar 486 that is sized to fit through the apertures in the crossbars 374. The locking bar 486 can be moved between an engaged position 488 and a disengaged position 490 using the handle 492. In the engaged position 488, the locking bar 486 is positioned between the crossbars 374 of the cargo access doors 282 and 284 (with each of its ends received within the openings of the tubular crossbars 374) so as to bridge the gap therebetween. An aperture 494 defined in the locking bar 486 is adapted to receive therein means (such as a cotter pin 496 or a padlock) for maintaining the locking bar 486 in the engaged position. With the locking bar 486 in the engaged position 488, the cargo access doors 282 and 284 cannot be opened (when used in their swing door configuration). To enable the cargo access doors 282 and 284 to be opened, the locking bar 486 is moved to its disengaged position 490 wherein it is partially retracted into the tubular crossbar 374 of the cargo access door 282.

The vertical latch assembly 482 includes a generally C-shaped, latch mounting bracket 500, a locking pin 502 slideably moveable relative to the latch mounting bracket 500 and an apertured latch plate 504 mounted to the upper horizontal frame member 286 of door frame 280. The apertured latch plate 504 is adapted to receive an end of the locking pin 502 through its aperture.

The latch mounting bracket 500 is secured to the corner of the cargo access door 282 formed by the top edge 362 and the longitudinal edge 366. It has a back portion 506 fastened to the cargo access door 282 and a pair of spaced apart arm portions 508 and 510 standing proud of the back portion 506. Each of the arm portions 508, 510 has an opening sized to receive the locking pin 502 therethrough.

Figure 7B:
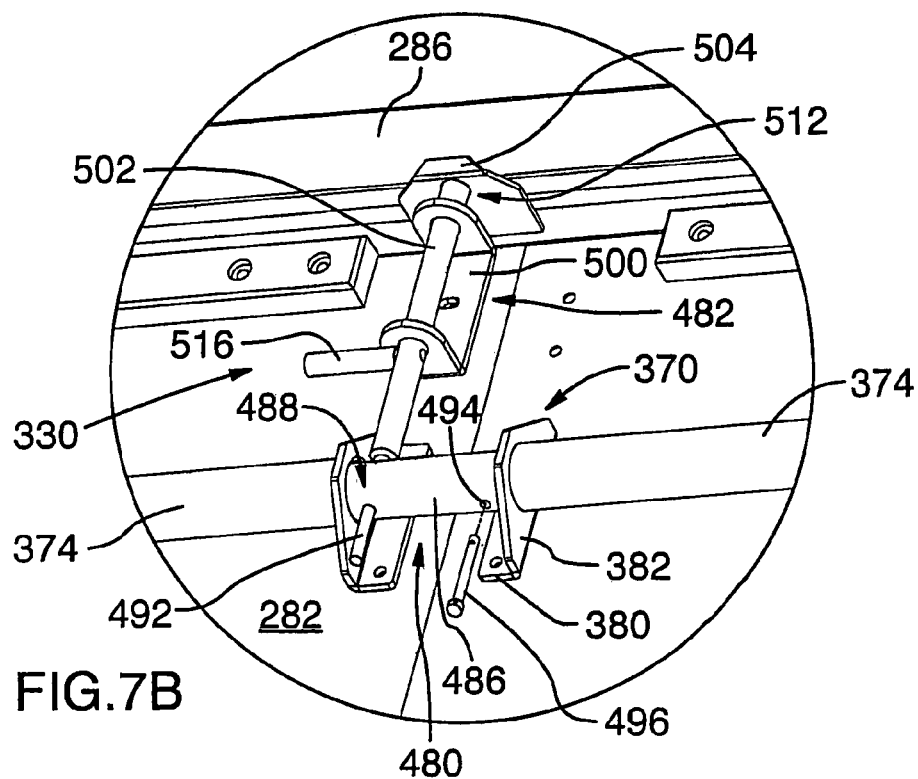
FIG. 7b is a magnified, bottom right perspective view of the upper door locking assembly shown in the encircled portion "7b" in FIG. 7a, with its vertical and horizontal latches both shown in their respective engaged, locked positions.
Figure 7C:
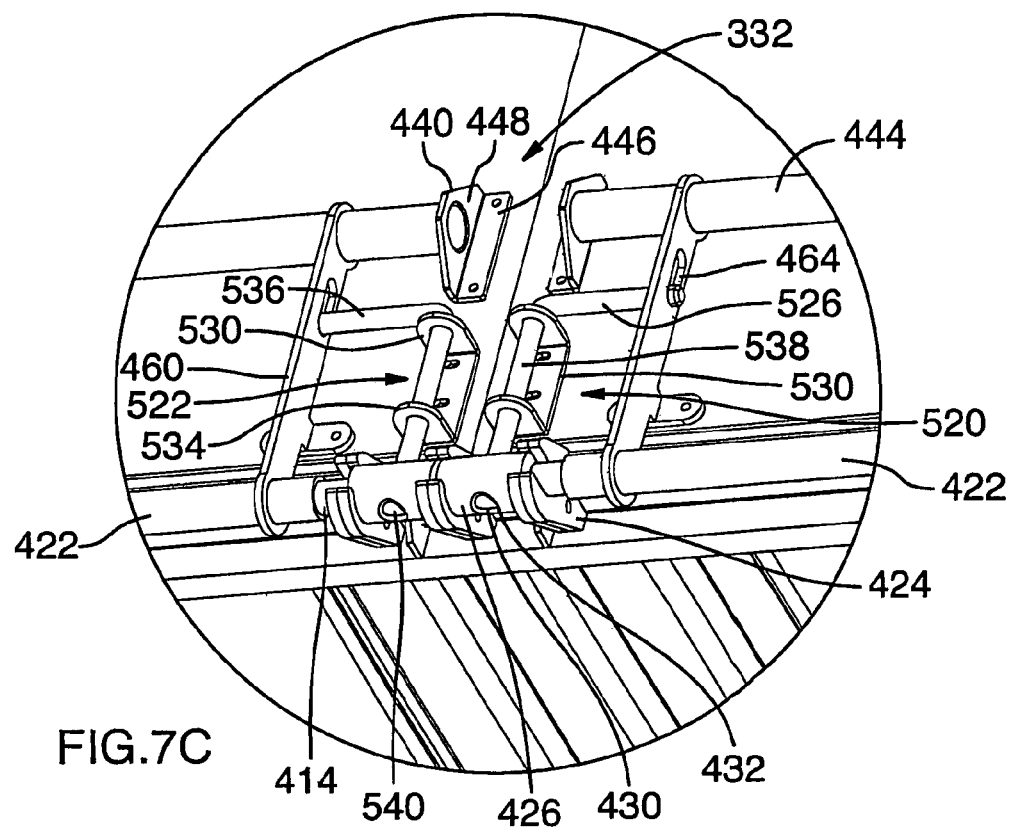
FIG. 7c is an magnified, bottom right perspective view of the lower door locking assemblies shown in the encircled portion "7c" in FIG. 7a, with each of their vertical latches shown in the engaged, locked position.

The locking pin 502 is moveable between a locked position 512 (shown in FIG. 7b) and an unlocked position 514 (shown in FIG. 8b). In the locked position 512, the locking pin 502 extends through the arm portions 508 and 510 of the latch mounting bracket 500 and into the aperture formed in the latch plate 504 thereby inhibiting opening of the cargo access door 282. As shown in FIG. 7b, when occupying its engaged position 488, the locking bar 486 acts as a stop to maintain locking pin bar 502 in its locked position 512. A nub 516 extending from the locking pin 502 facilitates grasping of the pin 502 when actuating the vertical latch assembly 482. The locking pin 502 is moved to its unlocked position 514 by retracting the pin 502 from the latch plate 504. When the locking pin is in its unlocked position 514 the upper door locking assembly 330 is disengaged.

Turning now to the lower door locking assembly 332, it includes a pair of vertical latch assemblies 520 and 522—one for each cargo access doors 282 and 284. Vertical latch assemblies 520 and 522 are identical to each other such that it will suffice to describe a single assembly (assembly 522). The vertical latch assembly 522 is defined by a generally C-shaped, latch mounting bracket 524, an L-shaped locking pin 526 slideably moveable relative to the latch mounting bracket 524 and the cylindrical member 426 with its bore 430. The bore 430 is adapted to receive therein an end of the locking pin 526.

The latch mounting bracket 524 is secured to the corner of door 284 formed by the bottom edge 364 and the longitudinal edge 368. The latch mounting bracket 524 is generally similar to latch mounting bracket 500 in that the latter also has a back portion 530 fastened to the cargo access door 284 and a pair of spaced apart arm portions 532 and 534 standing proud of the back portion, 530. Each of the arm portions 532, 534 has an opening sized to receive a portion of the locking pin 526 therethrough.

The L-shaped locking pin 526 is formed with first and second portions 536 and 538 mounted at right angles to each other. The first portion 536 is oriented vertically and is received through the arm portions 532 and 534 of the latch mounting bracket 524. The second portion 538 is oriented horizontally and extends away from the second portion 538 toward the arm 460 of the lower attachment means 406. The terminal end of the second portion passes through the slot 464 defined in the arm 460. The slot 464 limits the vertical travel of the locking pin 526 thereby tending to ensure that the locking pin 526 does not become disassembled from the vertical latch assembly 522 and possibly lost.

Figure 8C:
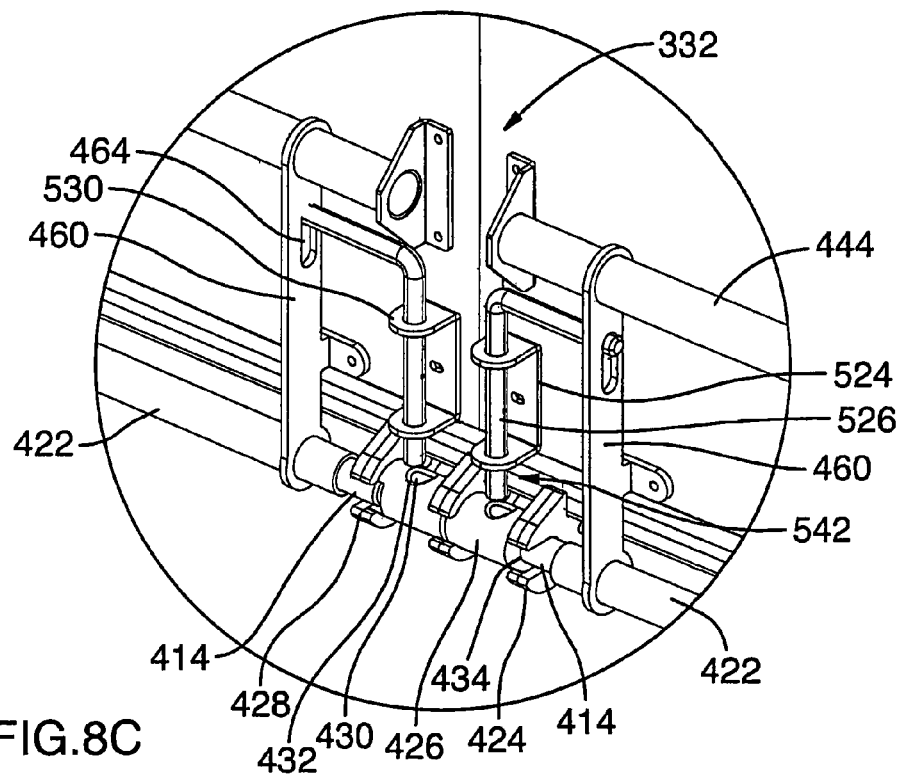
Figure 8D:
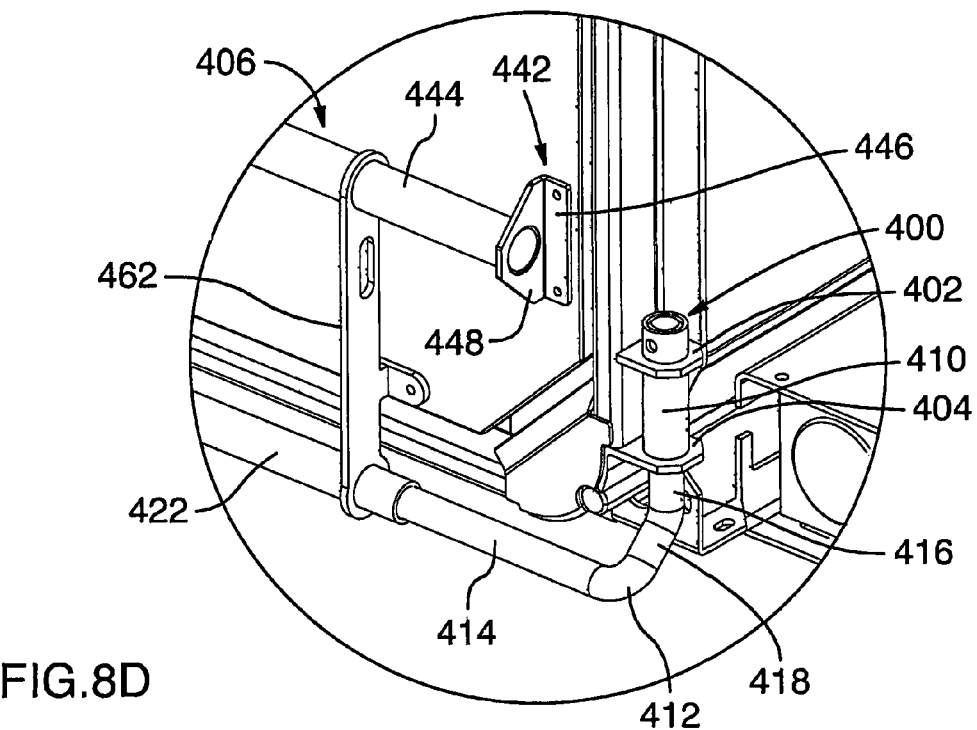

The locking pin 526 is moveable between a locked position 540 (shown in FIG. 7c) and an unlocked position 542 (shown in FIG. 8c). In the locked position 540, the locking pin 526 extends through the arm portions 532 and 534 of the latch mounting bracket 524 and into the bore 430 formed in the cylindrical member 426 thereby inhibiting deployment of the cargo access door 284 in its swing door configuration. To move the locking pin 526 to its unlocked position 542, the first portion 536 thereof is retracted from the cylindrical member 426. When the locking pin 526 is in its unlocked position 542 the vertical latch assembly 522 is disengaged.

Figure 9:
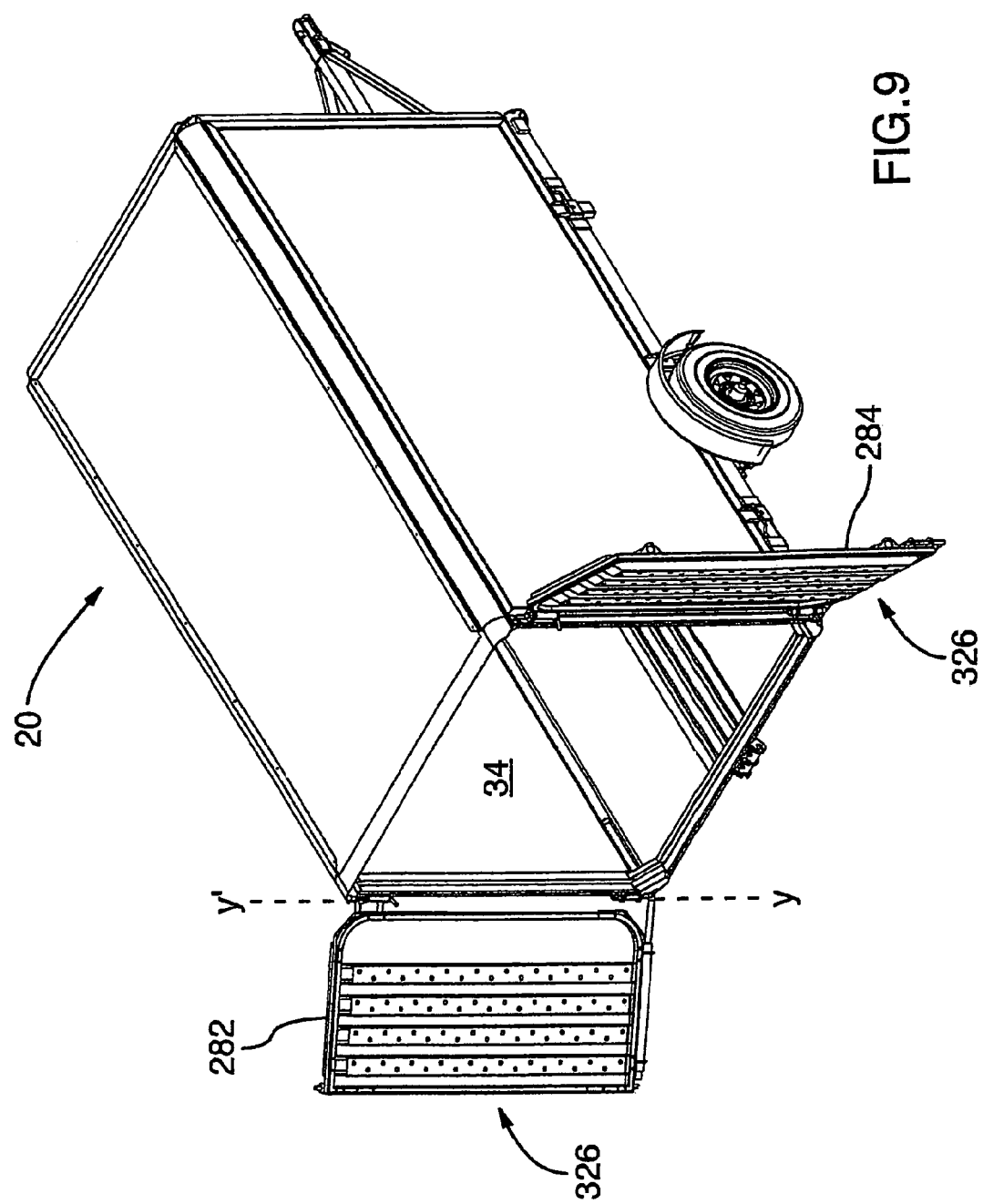
FIG. 9 is another rear, right perspective view of the assembled covered utility trailer illustrated in FIG. 1 showing each of its rear cargo access doors in an open position and hingedly mounted for rotation about a vertical axis.

FIG. 5 shows the cargo access doors 282 and 284 in their closed positions 324 with their upper and lower door locking assemblies 330 and 332 engaged. To deploy the cargo access doors 282 and 284 in their swing door configuration, the horizontal latch assembly 480 of the upper door locking assembly 330 is disengaged by retracting the locking bar 486 into the tubular crossbar 374. Next, the locking pin 502 of the vertical latch assembly 482 is moved to its unlocked position 514. Finally, the vertical latch assemblies 520 and 522 of the lower door locking assembly 330 are disengaged by sliding the locking pins 526 to their unlocked positions 542. With the locking pins 526 no longer extending within the bores 430, the cargo access doors 282 and 282 are no longer fastened to the lower frame member 288. The cargo access doors 284 and 284 are free to pivot about their respective vertical hinge pins (defined by their upper hinge pins 344 and the first arms 416 of the first hinge member portions 410) and may be pulled apart to provide access to the interior cargo storage space 34 (as shown in FIG. 9). As the cargo access doors 282 and 284 are moved to their open positions 326, the terminal ends of the third hinge member portions 414 are swung clear of the cutouts 428 formed in the cylindrical members 426.

Figure 10:
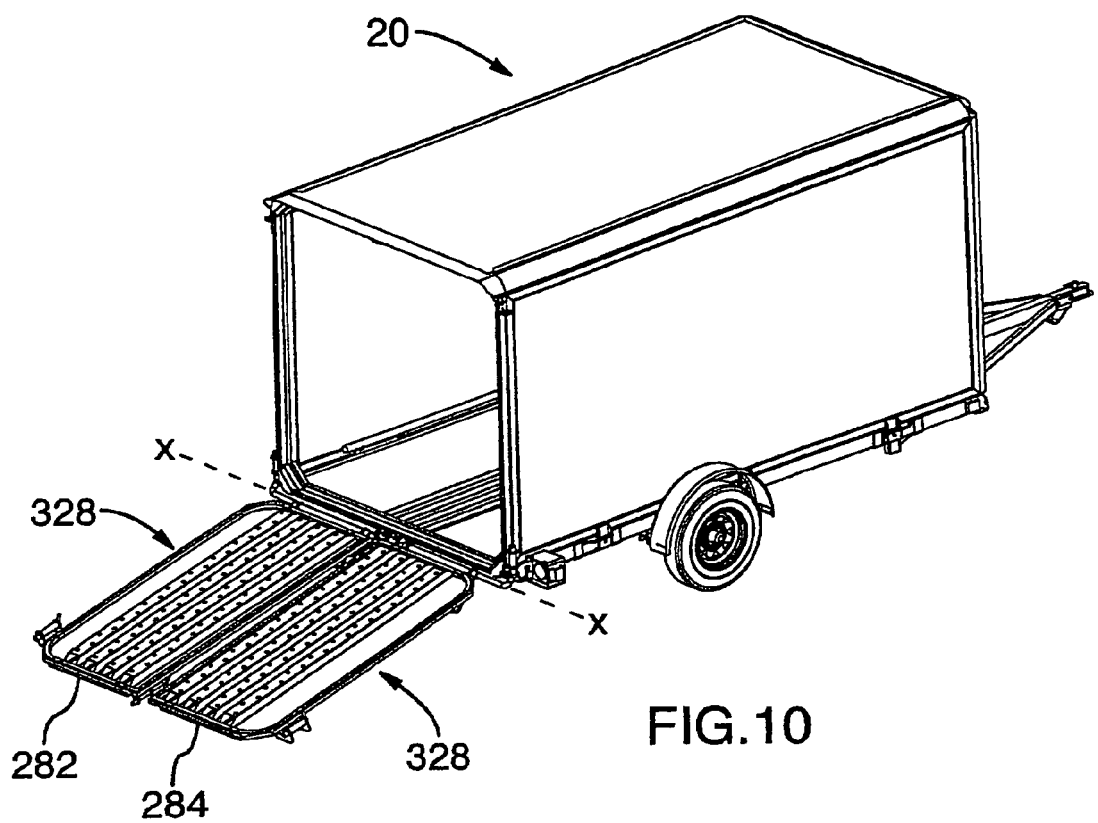
FIG. 10 is another rear, right perspective view of the assembled covered utility trailer illustrated in FIG. 1 showing its rear cargo access doors in a dual ramp-forming configuration.
Figure 11:
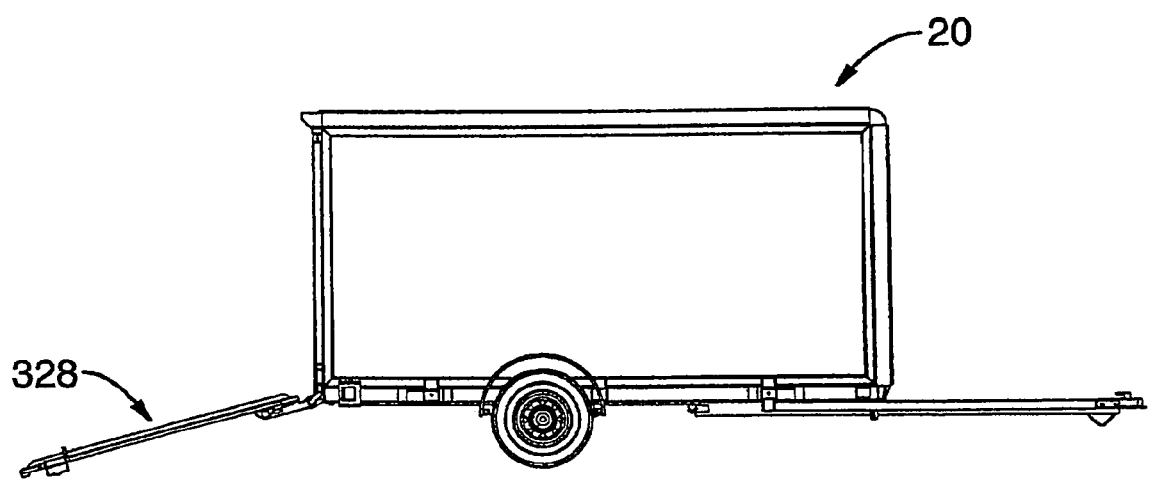
FIG. 11 is a right side elevation view of the assembled covered utility trailer shown in FIG. 10.

Deployment of the cargo access doors 282 and 284 in their ramp-forming configuration may be carried out relatively quickly and with ease. Starting with the doors 282 and 284 in their closed position 324, the horizontal and vertical latch assemblies 480 and 482 of each upper door locking assembly 330 are disengaged. Next the upper hinge pin 344 of each of the upper hinge assemblies 320 is released from its engaged position 358 by disengaging the pin locking means 356 and retracting the pin 344 within the hinge knuckle 342. With their respective upper hinge pins 344 in the disengaged position 360, the cargo access doors 282 and 284 are now free to rotate about the third portion 414 of the hinge member 410 to thereby allow the doors 282 and 284 to assume their respective ramp-deployed position 328 (as shown in FIGS. 10 and 11). While deploying the doors 282 and 284 in their ramp-forming configuration, the lower door locking assembly 332 remains engaged.

While FIGS. 10 and 11 show the doors 282 and 284 employed in their dual ramp-forming configuration, it should be appreciated that this need not be the case in every application. In certain applications, it may be advantageous to have only one door moved to its ramp-deployed position 328. FIG. 9 illustrates door 282 used in a single ramp-forming configuration.

Referring now to FIGS. 26a and 26b, there is shown a cargo access door 284. Door 284 is defined by its top edge 362, its bottom edge 364 and its longitudinal edges 366 and 368. Door 282 includes a frame member 550 and a door panel 552 fastened on the frame member 550. The frame member 550 and door panel 552 are generally rectangular but for truncated corner portions 554 (formed where the top edge 364 and the bottom edge 366 meet the longitudinal edge 368) which are adapted to conform to the reinforced corners 294 of the door frame 280.

A plurality of stringers 556 extends between the top and bottom edges 362 and 364 of the cargo access door 282 and is fixed to both the frame member 550 and the door panel 552. Each stringer 556 is a generally C-shaped structural member 568 that has a back 570 and a pair of spaced apart arms 572a and 572b joined to the back 570 and extending away therefrom. The arms 572a and 572b each terminate with inwardly facing fingers 574. The stringers 556 are welded to the door panel 552 with their fingers 574 abutting the panel 552. The stringers 556 serve to reinforce the cargo access door 284 so that is capable of supporting relatively heavy loads when the door 284 is employed in its ramp-forming configuration.

Since door 282 is a mirror image of door 284, no additional description is required for door 284.

An embodiment of an assembled covered utility trailer in accordance with the principles of the present invention has now been fully described. However, an advantage of the present invention is that the covered utility trailer can be shipped disassembled as a kit for assembly by the retailer or by a consumer or end user. A description of such a kit and its mode of assembly now follows.

Figure 15:
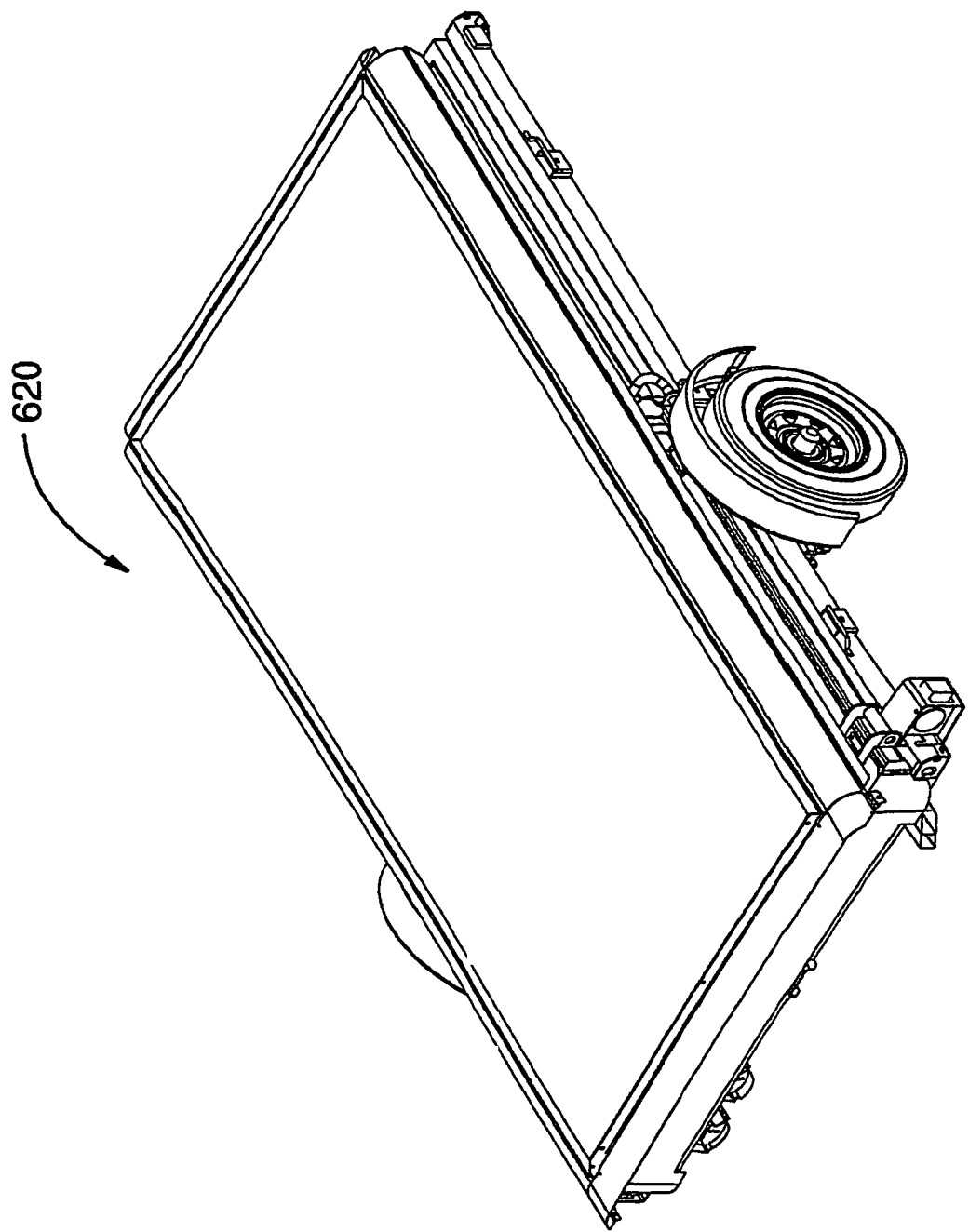
FIG. 15 is a rear right perspective view of a kit for assembling the covered utility trailer illustrated in FIG. 1 shown with its component parts stacked to facilitate shipping thereof.
Figure 16:
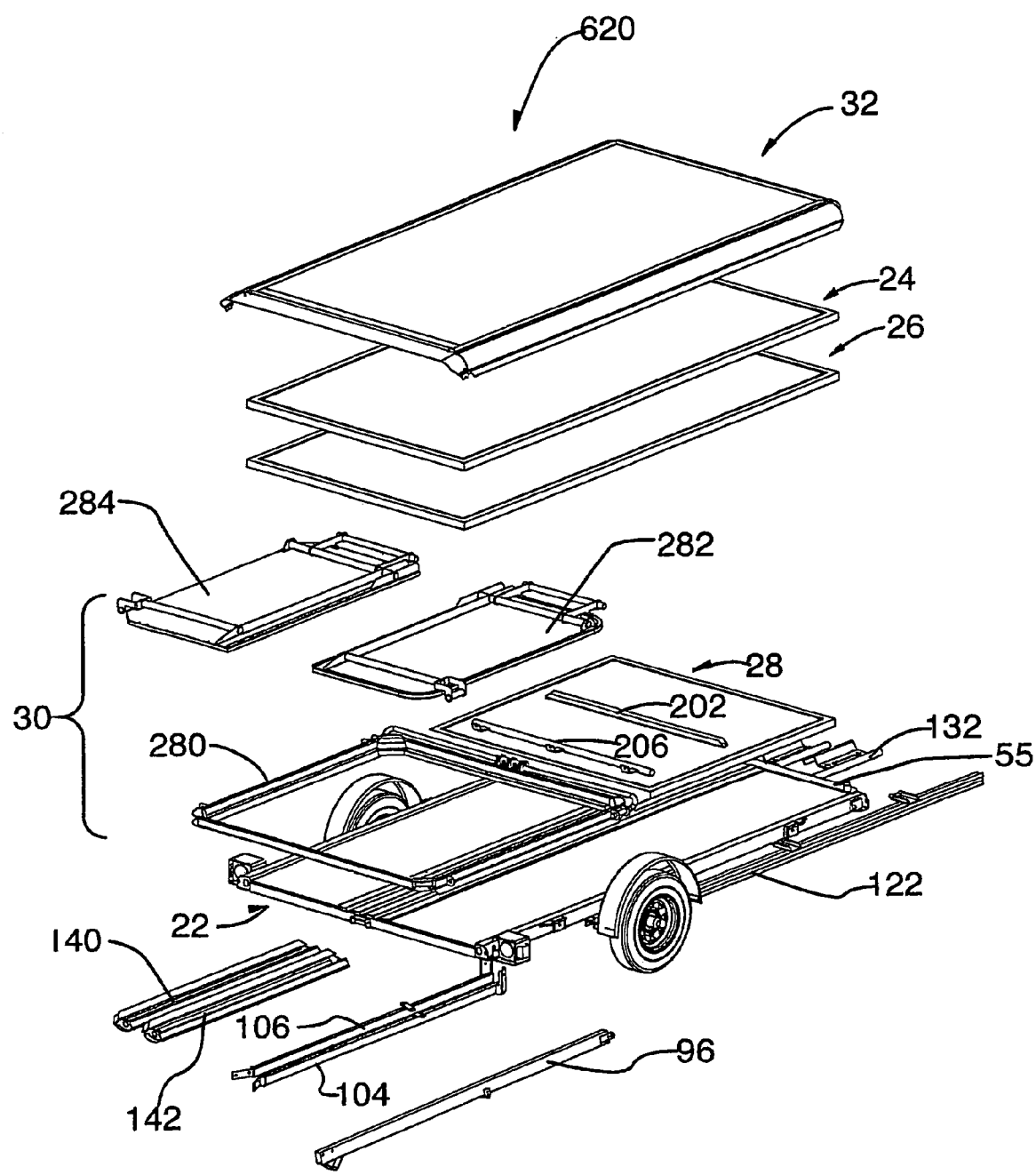
FIG. 16 is an exploded, rear right perspective view of the kit shown in FIG. 15.

FIGS. 15 and 16 show a kit for assembling a covered utility trailer 20, generally designated with reference numeral 620. The covered trailer kit 620 includes the following components listed in the order in which they are stacked for transport (starting from the bottom up): a pair of rail members 122, a pair of side tie-down rails 132, a pair of corner post members 140 and 142, the tongue 96 and the set of braces arms 104 and 106 (all placed side-by-side); the trailer bed 22; the door frame 280 and the front wall 28 placed side-by-side; the cargo access doors 282 and 284 placed side-by-side on top of the door frame 280; the rail member 202 and the front tie-down rail 204 placed on top of the front panel 28, the sidewalls 24 and 26; and lastly, the roof assembly 32. For the purposes of clarity, the securing straps and/or packaging materials used to restrain or protect the various components of the kit 620 during transport having been omitted from the drawings. Also not shown, is the plurality of conventional fasteners (i.e. pins, screws, bolts and the like) used to secure the various components to each other. In an alternative embodiment, the components of a covered trailer kit could be stacked in an order different than that shown in FIG. 16.

As shown in FIG. 15, the various components of the kit 620 lie relatively flat on top of the trailer bed 22 when the kit 620 is shipped from the site of fabrication. Thus arranged, the covered trailer kit 620 tends to occupy a significantly smaller volume than a fully assembled trailer 20. In this regard, it should be noted that a fully assembled cover utility trailer stands 82 inches from the floor whereas a kit measures only 31.5 inches high. It will thus be appreciated that the reduced profile of the covered trailer kit 620 provides a compact arrangement for shipping that makes more efficient use of shipping space. More specifically, this reduced profile makes it possible to transport multiple kits 620 in a stacked arrangement in the same space previously occupied by a single assembled trailer. As a result, significant savings in freight costs may be achieved.

Figure 31:
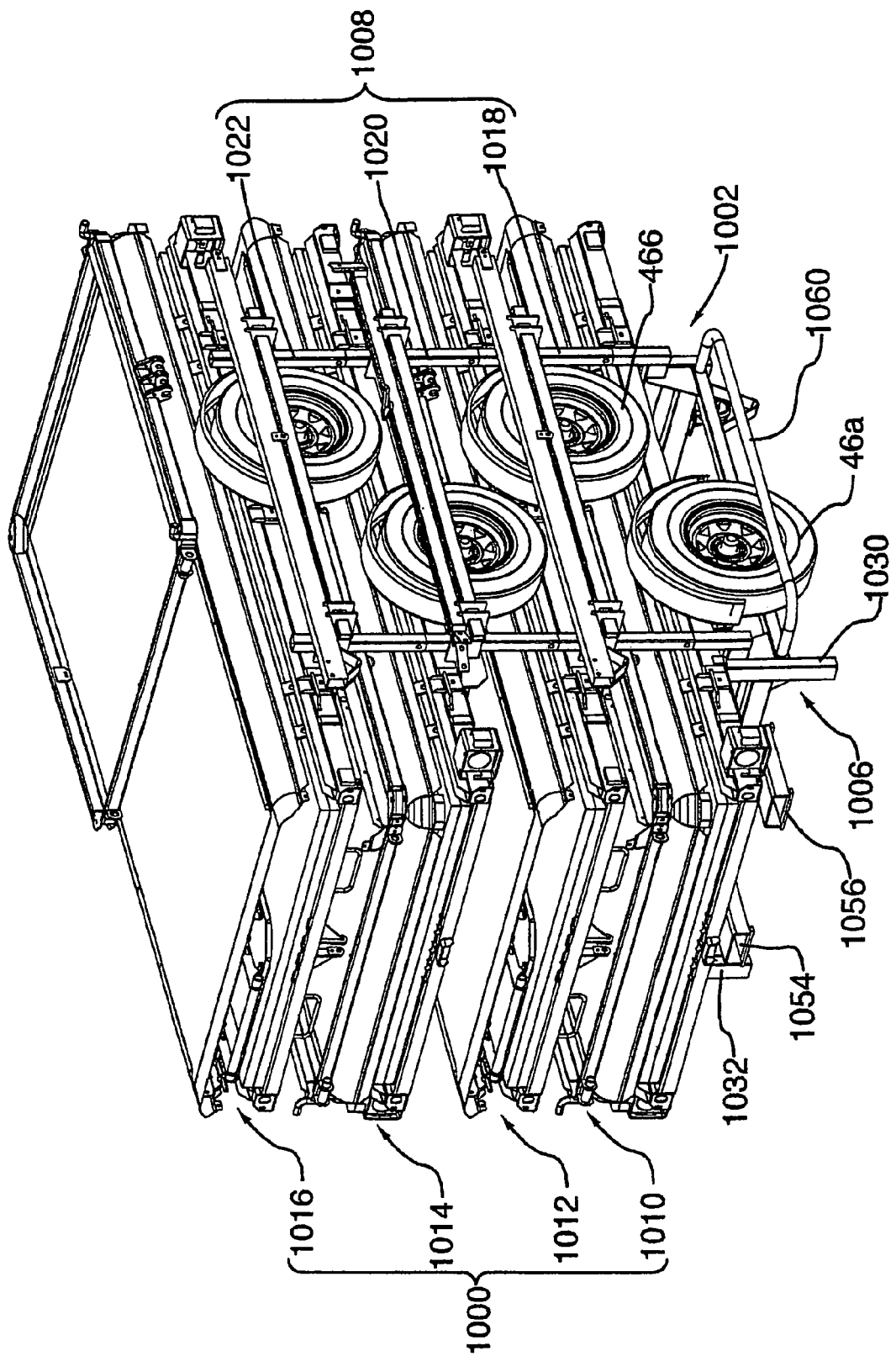
FIG. 31 is a perspective view of a plurality of assembly kits for the covered utility trailer illustrated in FIG. 1 shown stacked one on top of the other and supported on a specially adapted transport rack assembly.
Figure 32:
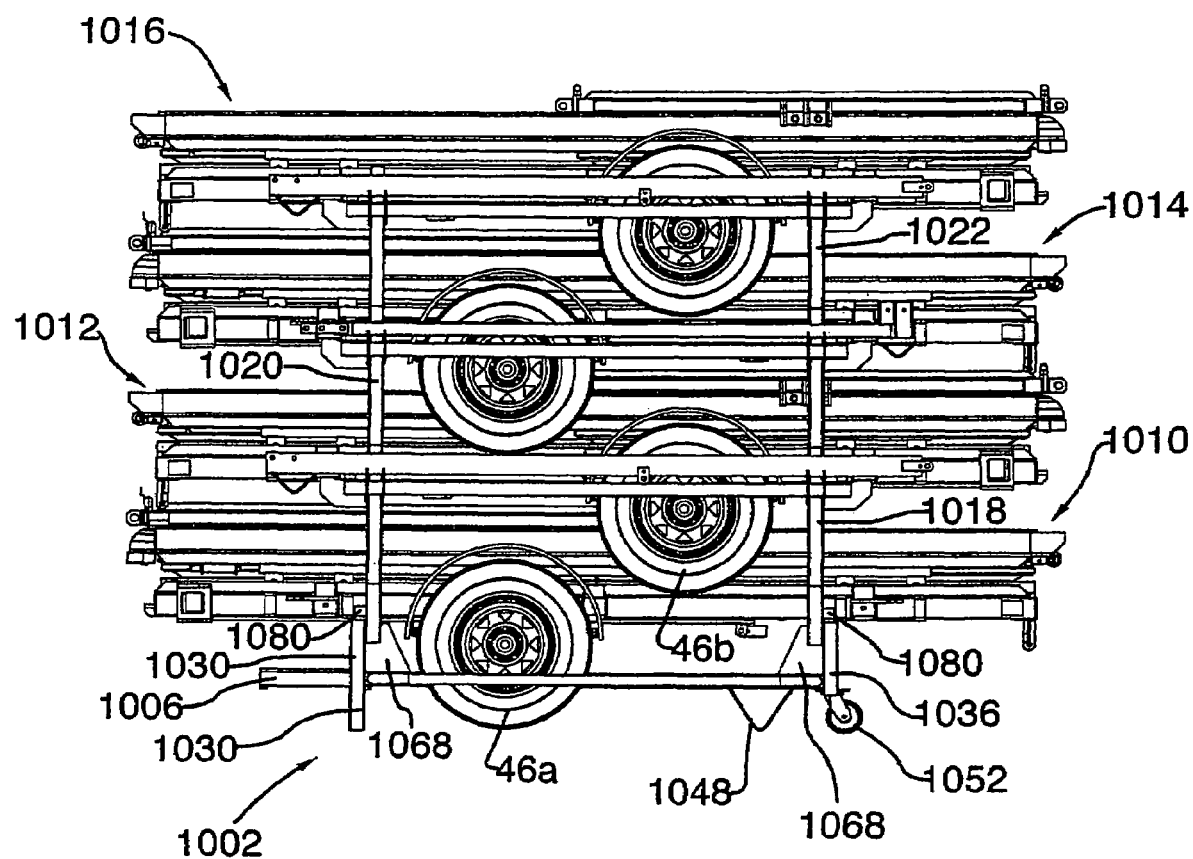
FIG. 32 is side elevation view of the kits stacked on the transport rack assembly shown in FIG. 31.

Referring now to FIGS. 31 and 32, there is shown a plurality of kits 1000 supported on a specially adapted, trailer transport rack assembly 1002 in a stacked arrangement. The trailer transport rack assembly 1002 includes two types of trailer support frames or racks (designated generally with the reference numeral 1004)—a base support rack 1006 for placement on a floor or lading surface and a stackable support rack 1008 which is designed to be stacked on top of the base support rack 1006 or on top of other stackable support racks 1008. The plurality of kits 1000 includes a first kit 1010, a second kit 1012, a third kit 1014 and a fourth kit 1016. Each kit 1010, 1012, 1014 and 1016 has associated therewith a support rack 1004. More specifically, the first kit 1010 is borne by base support rack 1006 while the second, third and fourth kits 1012, 1014 and 1016 rest on stackable support racks 1018, 1020 and 1022, respectively. While in this embodiment, the trailer transport rack assembly 1002 supports four kits, it will be appreciated that in an alternative embodiment a different number of kits could be carried on the trailer transport rack assembly 1002 by removing or adding one or more stackable support racks 1008. The ability to remove or add stackable support racks 1008 permits customization of the trailer transport rack assembly 1002 to accommodate a desired number of kits to make optimal use of lading space. As a result, the trailer transport rack assembly 1002 tends to be scaleable and versatile.

Each kit 1010, 1012, 1014, 1016 is similar to kit 620 in that it includes the same components, namely: the roof assembly 32, the sidewalls 24 and 26, the front wall 28, the cargo access doors 282 and 284, the door frame 280, the rail member 202, the front tie-down rail 204, a pair of rail members 122, a pair of side tie-down rails 132, a pair of corner post members 140 and 142, the tongue 96, the set of braces arms 104 and 106 and the trailer bed 22. However, as will be described in greater detail below, the difference between the kits 1000 themselves and the kit 620 lies in the particular stacking arrangement of the components in each kit.

Figure 36:
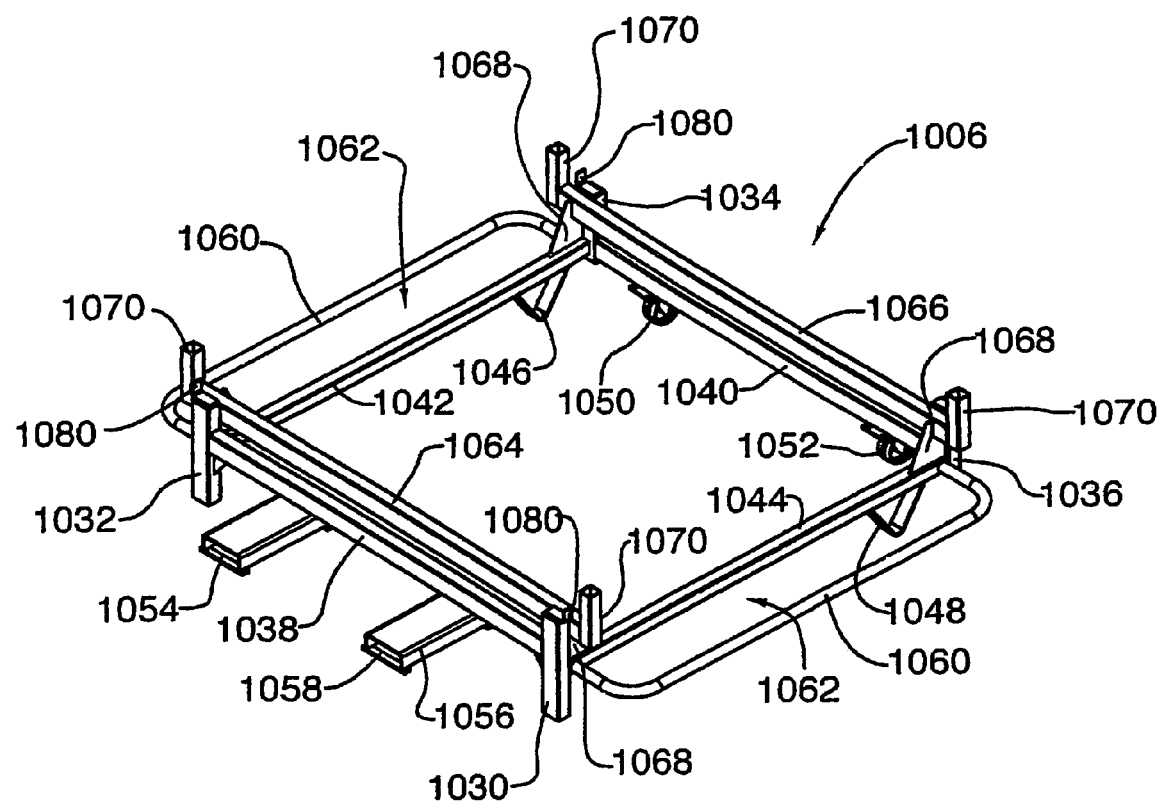
FIG. 36 is a perspective view of the base support rack of FIG. 34.

Referring now to FIG. 36, the base support rack 1006 is generally rectangular. Its shape is defined by first, second, third and fourth corner posts 1030, 1032, 1034 and 1036 and a plurality of frame members 1038, 1040, 1042 and 1044 extending therebetween. More specifically, frame member 1038 extends between, and is welded to, the first and second corner posts 1030 and 1032. Similarly, the frame member 1042 extends between, and is welded to, the second corner post 1032 and the third corner post 1034. Mounted between the third and fourth corner posts 1034 and 1036 is the frame member 1040. Finally, the frame member 1044 joins the fourth corner post 1036 to the first corner post 1030.

The base support rack 1006 is supported above the floor by the first and second corner posts 1030 and 1032, and first and second, generally V-shaped feet 1046 and 1048. The foot 1046 is mounted to the frame member 1042 adjacent the corner post 1034. In like fashion, the foot 1048 supports the frame member 1044 at a location adjacent the corner post 1036. To facilitate rolling of the trailer transport rack assembly 1002 on the floor, the base support rack is provided with a pair of castors 1050 and 1052 that are attached to the underside of the frame member 1040. Welded to the lower face of the frame member 1038 in a crosswise orientation relative thereto is a pair of spaced apart rectangular hollow structural steel sections (HSS) 1054 and 1056. The sections 1054 and 1056 are appropriately spaced from each other and configured in such a manner as to accommodate in their openings 1058 the forks or lifting members of a fork lift (not shown). This feature tends to facilitate loading and unloading of trailer transport rack assemblys 1002 during shipping and receiving activities. Additionally, it tends to ensure that the weight of the trailer transport rack assembly 1002 is more evenly borne by the lifting members of the forklift thereby minimizing the risk of the trailer transport rack assembly 1002 accidentally toppling over.

Mounted to, and extending outwardly from, each side of frame member 1042 and 1044 is a C-shaped member 1060. The C-shaped members 1060 in cooperation with each of the frame members 1042 and 1044 define a space 1062 that is sized to accommodate one wheel 46*a* or 46*b* (as the case may be) of the trailer bed 22 included in the kit 1000.

The base support member 1006 further includes additional fifth and sixth frame members 1064 and 1066. The fifth and sixth frame members 1064 and 1066 are sized to be longer than the width of the kit 1010. The fifth frame member 1064 is carried above the frame member 1038 and is welded to the first and second corner posts 1030 and 1032. Additional reinforcement is provided by a gusset plate 1068 that connects the fifth frame member 1064 to the frame member 1042, 1044 and to the corner post 1030, 1032. The sixth frame member 1066 is similarly welded to the third and fourth corner post members 1034 and 1036 with reinforcement provided by the gusset plates 1068. A relatively short HSS section 1070 is welded in an upright position to each end of frame member 1064. As will be explained in greater detail below, each HSS section 1070 serves as a connection point for attachment to mating members of a stackable support rack 1008.

Figure 35:
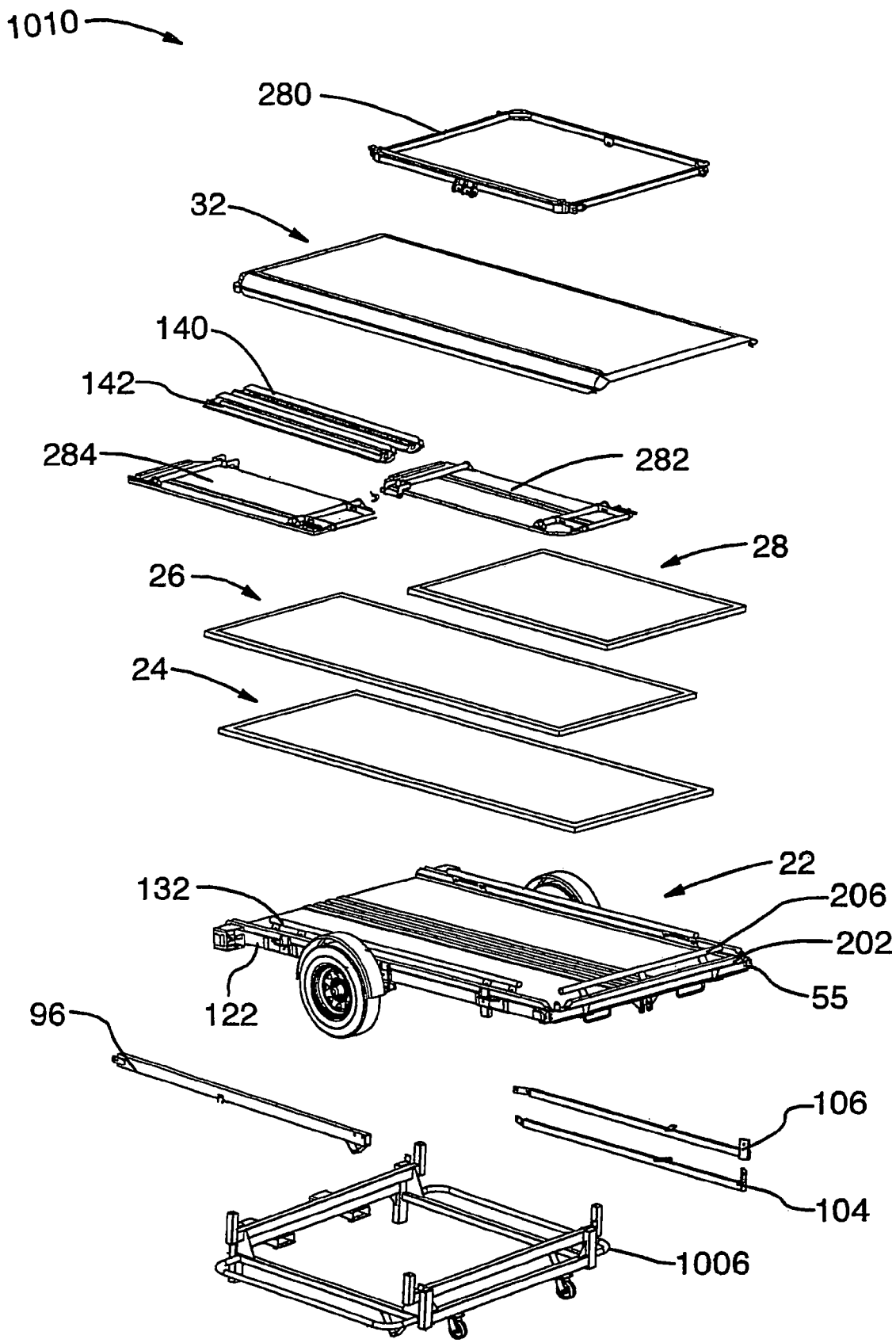
FIG. 35 is an exploded perspective view of the first kit and the base support rack shown in FIG. 34.

FIG. 35 shows an exploded view of the kit 1010 to reveal the stacking order of the components. Starting from the bottom up, the components of the kit are stacked as follows: the trailer bed 22 (with the pair of rail members 122, the pair of side tie-down rails 132, the rail member 202 and the front tie-down rail 204 each connected to the trailer bed 22 as shown in FIGS. 18*a* and 18*b*); the sidewalls 24 and 26; the cargo access doors 282 and 284 (placed diagonally one relative to the other; a pair of corner post members 140 and 142 (placed alongside one the cargo access doors); the roof assembly 32 and lastly, the door frame 280. In this kit, the tongue 96 and the set of braces 104 and 106 are tied to C-shaped members 1060 on either side of the base frame member 1006. The base frame member 1006 with the kit 1010 supported thereon stands 32 inches high.

Figure 39:
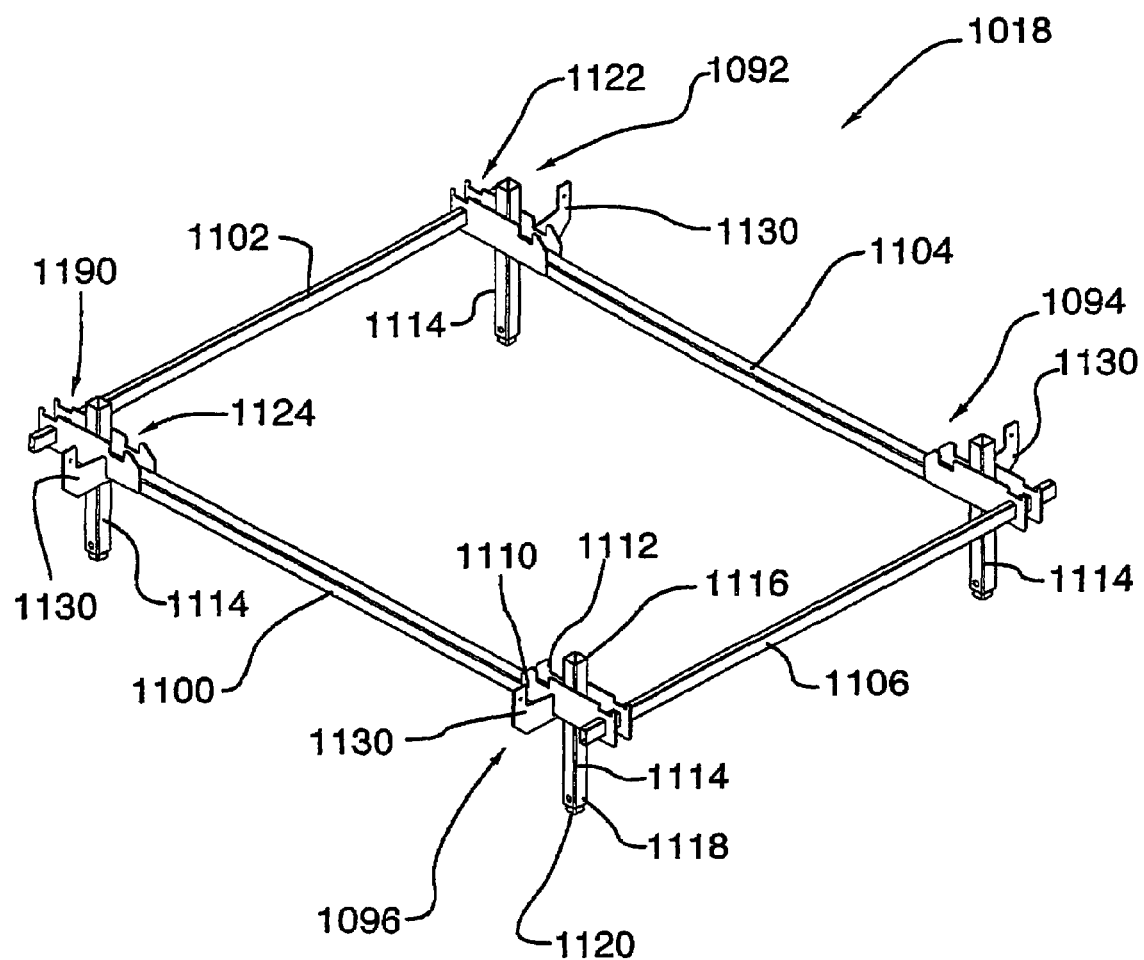
FIG. 39 is a perspective view of the stackable support rack of FIG. 37.

With reference to FIG. 39, the stackable support rack 1018 is now described in greater detail. The stackable support rack 1018 has a rectangular structure that is defined by first, second, third and fourth corner connection members 1090, 1092, 1094 and 1096 and a plurality of frame members 1100, 1102, 1104 and 1106 extending therebetween. More specifically, frame member 1102 extends between, and is welded to, the first and second corner connection members 1090 and 1092. The frame member 1104 is mounted between the second corner connection member 1092 and the third corner connection member 1094. Extending between the third and fourth corner connection members 1094 and 1096 is the frame member 1106. Finally, the frame member 1100 joins the fourth corner post 1096 to the first corner post 1090.

Each corner connection member 1090, 1092, 1094, 1096 includes a pair of plates 1110 and 1112 and a post 1114 mounted therebetween. The post 1114 is fabricated from a HSS section having a substantially square cross-section. The post 1114 has an apertured upper end 1116 and a lower end 1118 from which extends a fitting 1120. The fitting 1120 it sized to fit within the apertured upper end 1116 of another stackable support rack 1008.

The plates 1110 and 1112 are welded to opposite sides of the post 1114 about one their respective faces. Each plate 1110, 1112 has first and second spaced apart cutouts 1122 and 1124 defined in its upper edge. The first and second cutouts 1122 and 1124 are disposed on opposite sides of the post 1114. The first cutout 1122 is sized slightly larger than the width of a side sill 52, 54, whereas the second cutout 1124 is proportioned to accommodate tongue 96 or brace arms 104 and 106. Adjacent the first cutout 1122, a generally L-shaped securement flange 1130 extends outwardly from the plate 1110. Below the second cutout 1124, each plate 1110 and 1112 receives a portion of the frame member 1102, 1106 (as the case may be) through an aperture defined therein.

Figure 38:
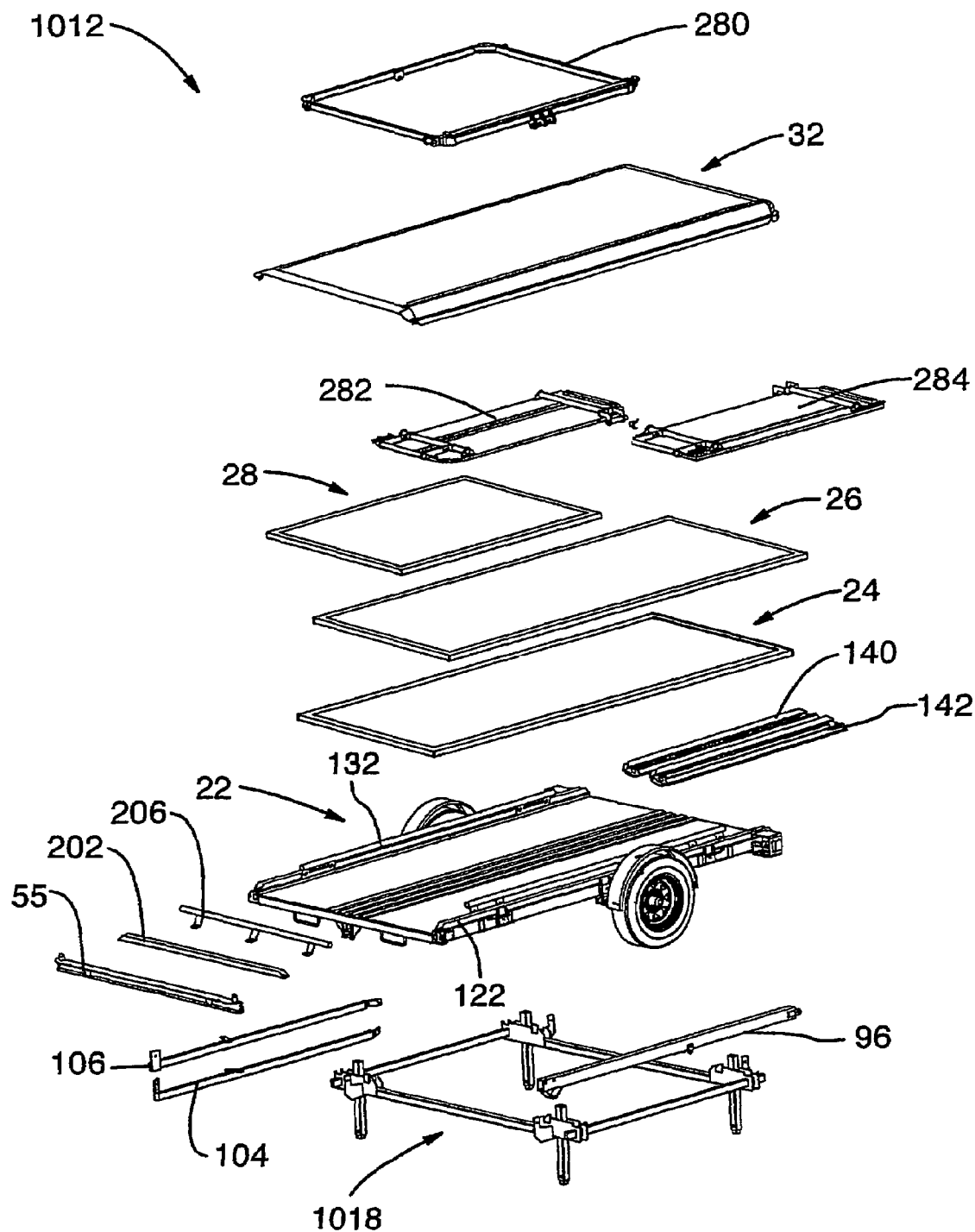
FIG. 38 is an exploded perspective view of the second kit and the stackable support rack shown in FIG. 37.

Turning now to FIG. 38, there is shown an exploded view of the kit 1012 to reveal the stacking order of the components. Starting from the bottom up, the components of the kit are stacked as follows: the trailer bed 22 (with the pair of rail members 122, the pair of side tie-down rails 132, the rail member 202 and the front tie-down rail 204 each connected to the trailer bed 22 as shown in FIGS. 18*a* and 18*b*); the sidewalls 24 and 26; the cargo access doors 282 and 284 (placed diagonally one relative to the other); a pair of corner post members 140 and 142 (placed alongside one the cargo access doors); the roof assembly 32 and lastly, the door frame 280. In this kit, the tongue 96 and the set of braces 104 and 106 are supported on the stackable frame member 1018 and placed on either side of the trailer bed 22. The stackable frame member 1018 with the kit 1012 supported thereon stands 32 inches high.

Figure 33:
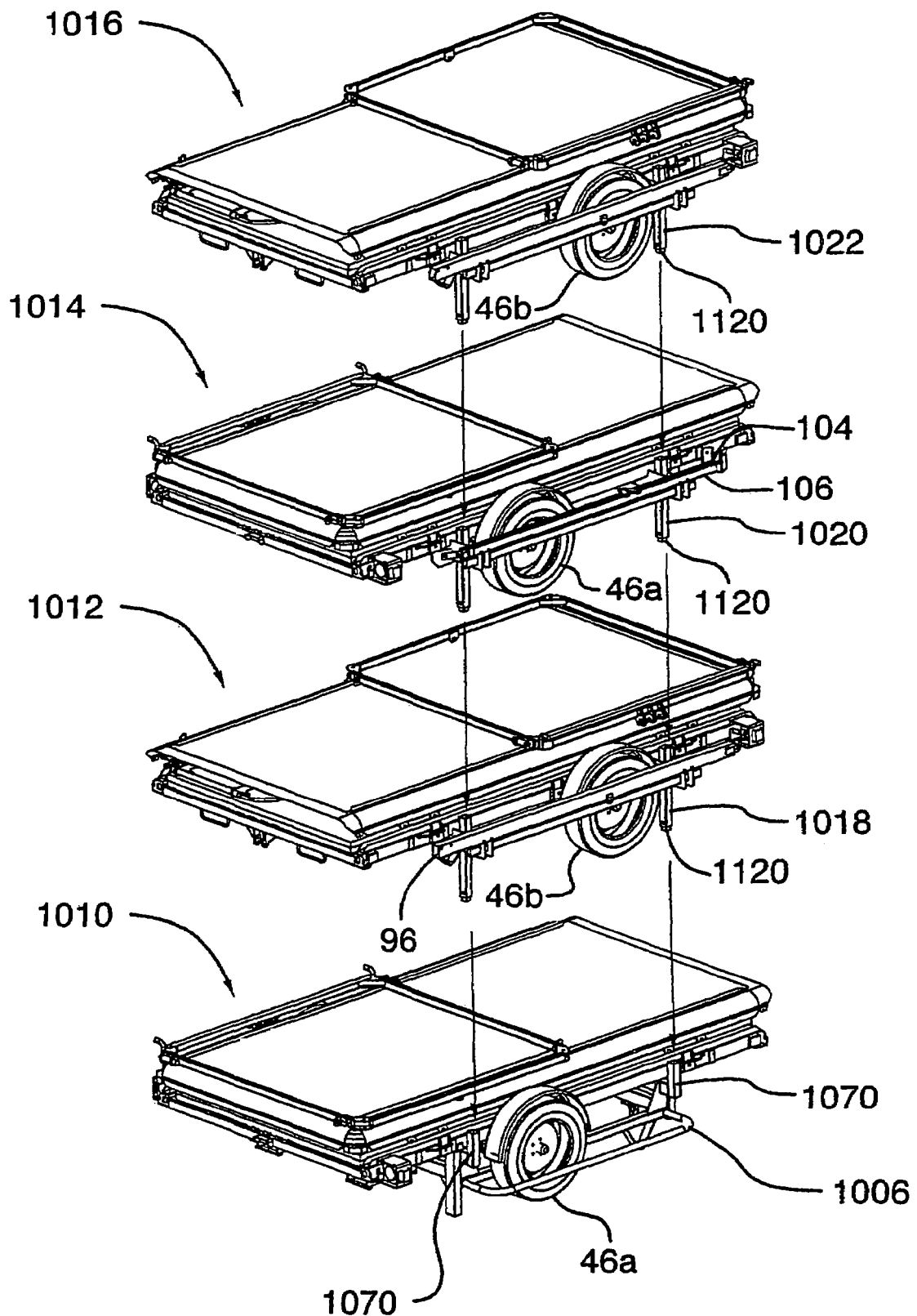
FIG. 33 is a perspective view similar to that shown in FIG. 31 showing each kit and its associated support rack, exploded from other kits and their associated support racks.
Figure 34:
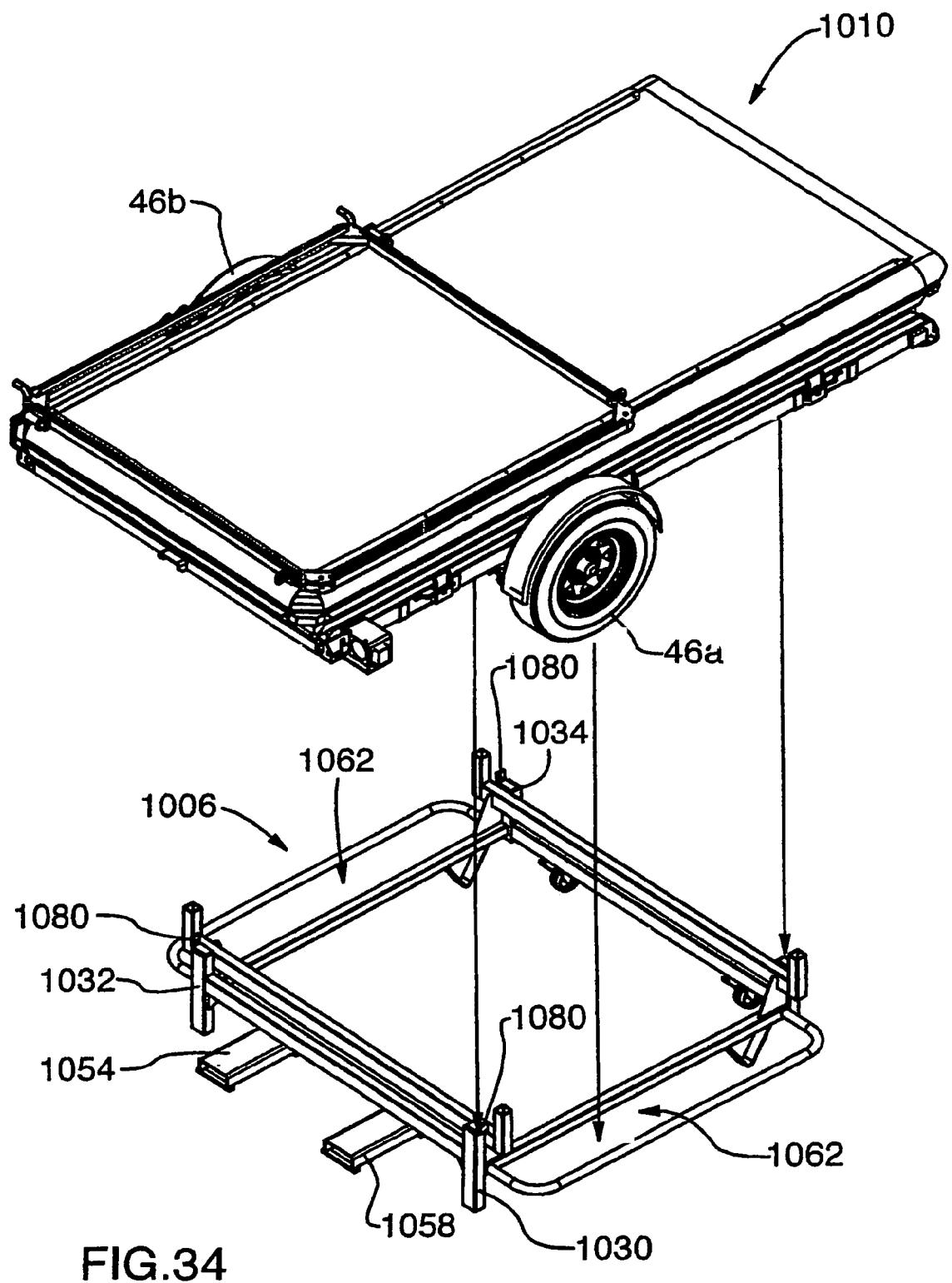
FIG. 34 is a perspective view similar to that shown in FIG. 31 showing in isolation the first kit exploded from the base support rack.
Figure 37:
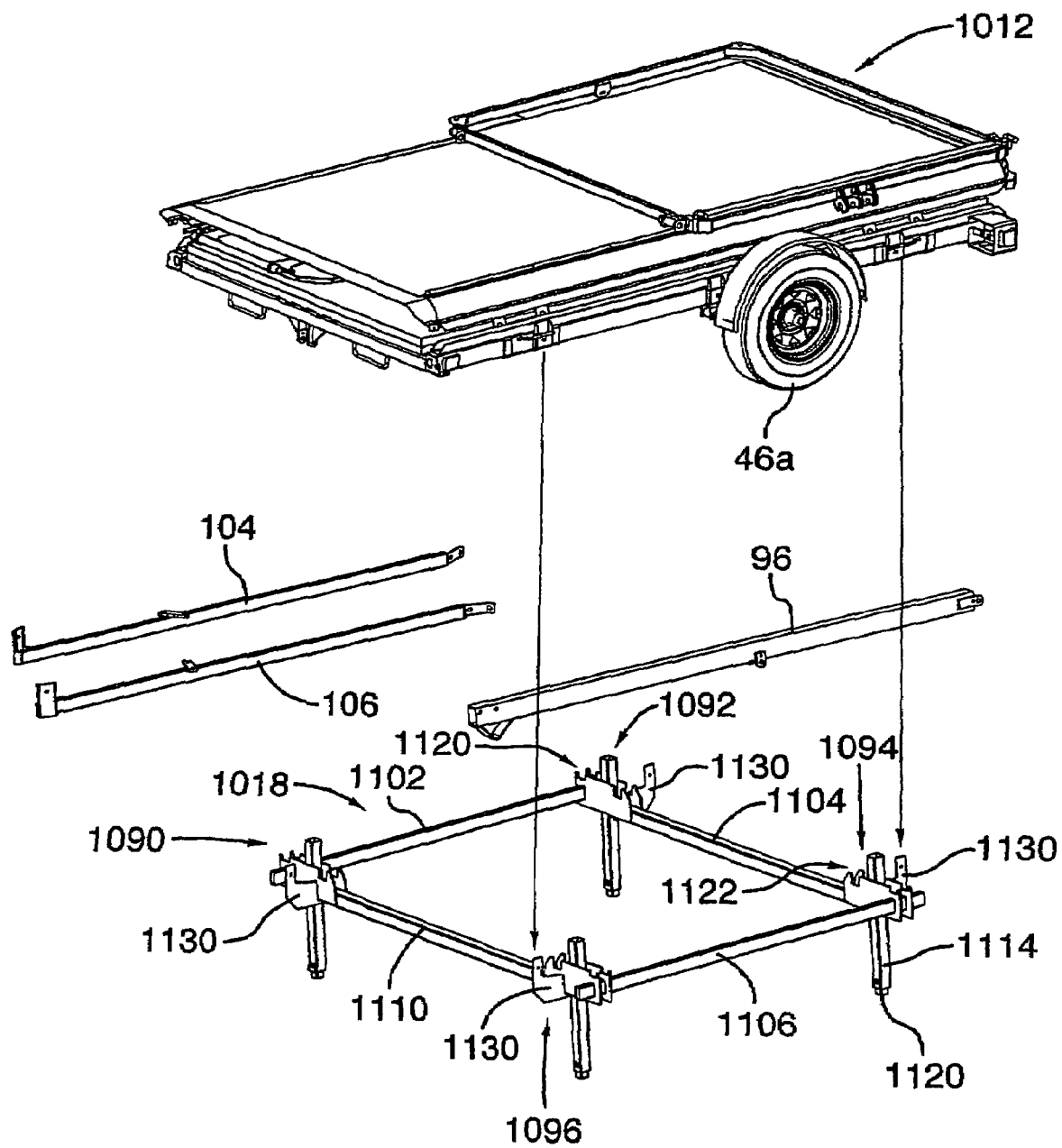
FIG. 37 is a perspective view similar to that shown in FIG. 31 showing in isolation the second kit exploded from its associated support rack.

Referring now to FIGS. 33, 34 and 37, the loading of kits 1000 onto a trailer transport rack assembly 1002 is now described in greater detail. Using a forklift or the like, the kit 1010 is lifted above the base support rack 1006 and positioned so that the longitudinal axis of the trailer bed 22 is substantially parallel to the frame members 1042 and 1044 and the trailer bed 22 is disposed between corner members 1030 and 1032, and corner members 1034 and 1036. Prior to placing the kit 1010 onto the base support rack 1006, care is taken to ensure that the kit 1010 is substantially centred relative to the base support rack 1006 (both longitudinally and transversally). The kit 1010 is then lowered onto the base support rack 1006 until the lower face of the side sills 52 and 54 of the trailer bed 22 abut the L-shaped support fittings 1080 carried on each of the corner members 1038, 1040, 1042 and 1044. In this position, each wheel 46*a* and 46*b* of the trailer is received within the space 1062 defined by each of the C-shaped members 1060 and a respective frame member 1042, 1044. By virtue of this arrangement and the support fittings 1080, lateral shifting of the kit during transport tends to be mitigated as the kit is maintained substantially aligned with the base frame member 1006.

With the kit 1012 mounted onto the base support rack 1060, loading of the next kit 1012 can now proceed. The stackable frame member 1018 is placed on top of the base support rack 1006 with care being taken to ensure that each of the fittings 120 associated with the corner connection members 1090, 1092, 1094, 1096 is mated with the corresponding corner post 1032, 1034, 1036 and 1030 of the base support member 1060. Thereafter the covered trailer kit 1012 is loaded onto the stackable support rack 1018. More specifically, using a forklift or the like, the kit 1012 is lifted above the stackable support rack 1018 and positioned so that the longitudinal axis of the trailer bed 22 is substantially parallel to the frame members 1102 and 1106 and the trailer bed 22 is disposed between corner connection members 1090 and 1096, and corner connection members 1092 and 1094. Prior to placing the kit 1012 onto the stackable support rack 1018, care is taken to ensure that the kit 1012 is substantially centred relative to the stackable support rack 1018 (both longitudinally and transversally). The kit 1012 is then lowered onto the stackable support rack 1018 ensuring that the securement flanges 130 are properly inserted within the pockets 70 formed on the side sills 52 and 54. The cutouts 1122 located proximate the corner, connection members 1090 and 1092 receive the side sill 52 while the oppositely disposed cutouts adjacent the corner connection members 1094 and 1096 receive the side sill 54. It will thus be appreciated that the kit 1112 is retained on the stackable support rack 1018 by virtue of the securement flange/pocket connection and the receipt of a portion of the side sills 52 and 54 within the cutouts 1122. Loading of the kit 1012 is completed by placing the tongue 96 within the first cutouts 1120 associated with the corner connection members 1096 and 1094 and storing the brace arms 104 and 106 within the first cutouts 1120 associated with the opposite corner connection members 1090 and 1092. The stackable support racks 1020 and 1022 and their associated kits 1014 and 1016 may be loaded onto the trailer transport rack assembly 1002 in this same manner.

As best shown in FIGS. 31 and 32, when stacked in this manner the axle 44 of kit 1010 is longitudinally offset from the axle 44 of 1012 kit stacked immediately above it. This makes for an efficient use of space and allows a tight stacking arrangement to be achieved. When stacked one on top of the other, the kits 1010, 1012, 1014 and 1016 and their associated support frames 1006, 1018, 1020 and 1020, stand at 94 inches high—only 12 inches taller than one fully assembled covered utility trailer.

While in the present embodiment the covered trailer kits 620 and 1000 include the trailer bed 22, this need not be the case in every application. In alternative embodiments, a covered trailer kit similar to kits 620 and 1000 could be provided which omits the trailer bed 22. Such a kit could be sold as a conversion kit for converting a flat trailer bed into a covered utility trailer. Similarly, the covered trailer kits 620 and 1000 include front and side tie-down rails 204 and 132, respectively, for securing cargo within the space 34. In alternate kits, these tie-down rails could be omitted altogether. Additional modifications to the kit could also be made. For instance, while in the previous embodiments, the door frame 280 and cargo access doors 282 and 284 are shipped disassembled, in an alternative embodiment, the rear cargo access door assembly could be delivered with the cargo access doors already hung on the door frame.

An exemplary assembly of covered trailer kit 620 (or kit 1000) is now described in greater detail with reference to FIGS. 17*a*, 18*a*, 19*a*, 19*b*, 20, 21, 22*a* to 22*c*, 23*a* to 23*d* and 24*a* and 24*b*. To reinforce the tongue 96, the braces 104 and 106 are fastened to the side sills 52 and 54 and to free end 98 of tongue 96.

In contrast to kit 1000, where the rail members 122 and 202, and tie-down rails 132 and 206 are pre-assembled prior to shipping, in kit 620 it is necessary to attach these components as the next step in the assembly. Accordingly, the rail members 122 and side tie-down rails 132 are fastened to the side sill 52 and 54 whereas the rail member 202 and the front tie-down rail 204 are attached to the front end sill 55, as shown in FIGS. 17*a* and 18*a*. More specifically, the side tie-down rails 132 are mounted to the side sills 52 and 54 with the arms 592*a* and 592*b* of their mounting brackets 582 and 584 bounding the top and bottom edges of the side sills 52 and 54. During assembly, care is taken to ensure the cutouts 594 in backs 590 of the C-shaped member 588 are aligned with the pockets 70 of the side sills 52 and 54, such that the latter may be received within the former. With the side tie-down rails 132 in position, the rail members 122 may now be connected to the side sills 52 and 54. This is achieved by aligning the post members 72 of rail members 122 with the corresponding pockets 70 formed on side sills 52 and 54 and inserting the terminal ends of the post members 72 into the pockets (as shown in FIG. 18*a*). As will be appreciated, the foregoing post member/pocket arrangement provides for a relatively quick connection of the rail members to the side sills.

To fasten the front rail member 202 and the front tie-down rail 204 to the front end sill 55, the tie-down rail 204 is placed on the front end sill 55 with the first portions 608 of its mounting arms 602, 604 and 606 abutting the top edge of the front end sill 55. The rail member 202 is then placed on top of the tie-down rail 204 with its apertures aligned with those of the tie-down rail 204 and the fasteners are securely attached.

Referring now to FIG. 19*a*, the next step in the assembly of the kit 620 (or 1000) involves mounting the front wall panel 200 to the trailer bed 22 and connecting the corner post members 140 and 142 to the front wall panel 220 and the trailer bed 22. The side edge of front wall panel 200 is aligned with the end of the front rail member 202 and the bottom edge of the panel 200 brought to bear against the back of channel section 204.

The corner post members 140 and 142 are then mounted, one at a time, at corners 197 and 198 of the trailer bed 22 in an upright position. More specifically, each corner post-member 140, 142 is positioned onto the trailer bed 22 with its sleeve 194 fitted over the guide pins 58 of the front end sill 55. The guide pin 58 is fully inserted into the sleeve 194 and the rail member 146, 148 (as the case may be) is urged against the side edge of the front wall panel 200 in a friction-fit therewith. With the guide pin 58 fully inserted into the sleeve 194 and the front wall panel 200 snugly retained by the rail member 146, 148, each corner post member 140, 142 is secured in place with a fastening assembly 800 (best shown in FIGS. 22*a* and 22*b* in the context of the connection of the corner post member 142 and the roof assembly 30 which employs the same fastening assembly 800). The fastening assembly 800 includes a bolt 802, a washer 804 and a nut 806. The bolt 802 is inserted into aperture 61 of the guide pin 58 and extends through the sleeve 194 whereat it is held in place by the washer 804 abutting the rim of the sleeve 194 and the nut 806.

Figure 20:
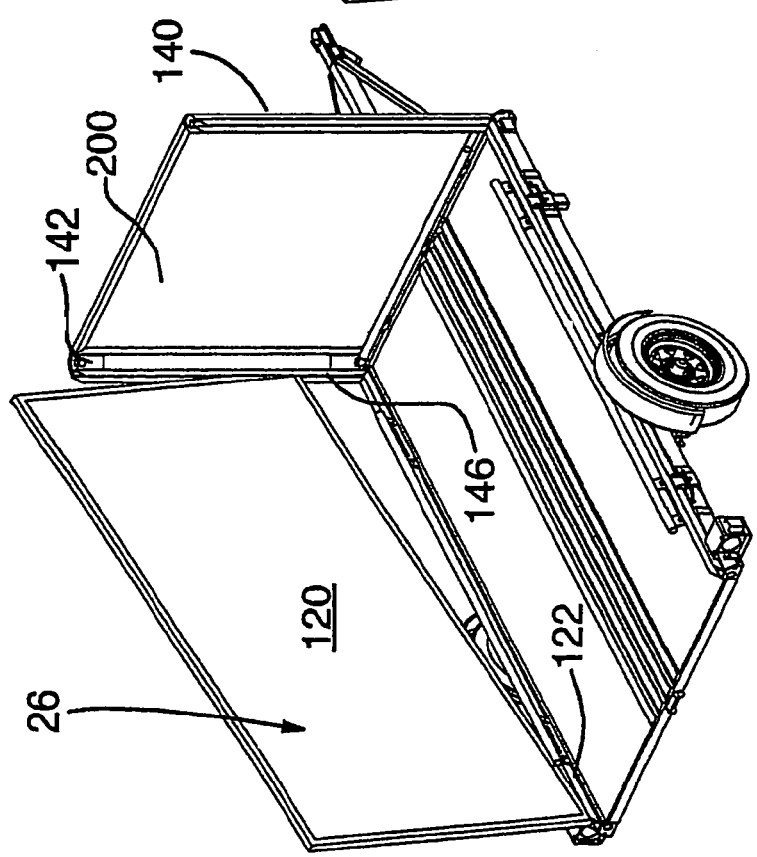
FIG. 20 is a rear right perspective view of the trailer bed similar to that illustrated in FIG. 19a with the pair of corner post members shown assembled to the trailer bed and the front wall panel, and a first sidewall panel being mounted to one of the corn post members.

Once the corner post members 140 and 142 are securely mounted, the sidewalls 24 and 26, may be attached to the trailer bed 22. In each case, the side edge of panel 120 is aligned with the rear end of the rail member 146 (or 148) and the opposite side edge of the panel is introduced into the rail member 146 (or 148) of the corner post members 140 (or 142)—more specifically, within the space defined between the arms of the channel section 154. As shown in FIGS. 20 and 21, each panel 120 is then pushed downward and slid forward until it is snugly retained by the rail member 122 and the rail member 146 (or 148).

Figure 22A:
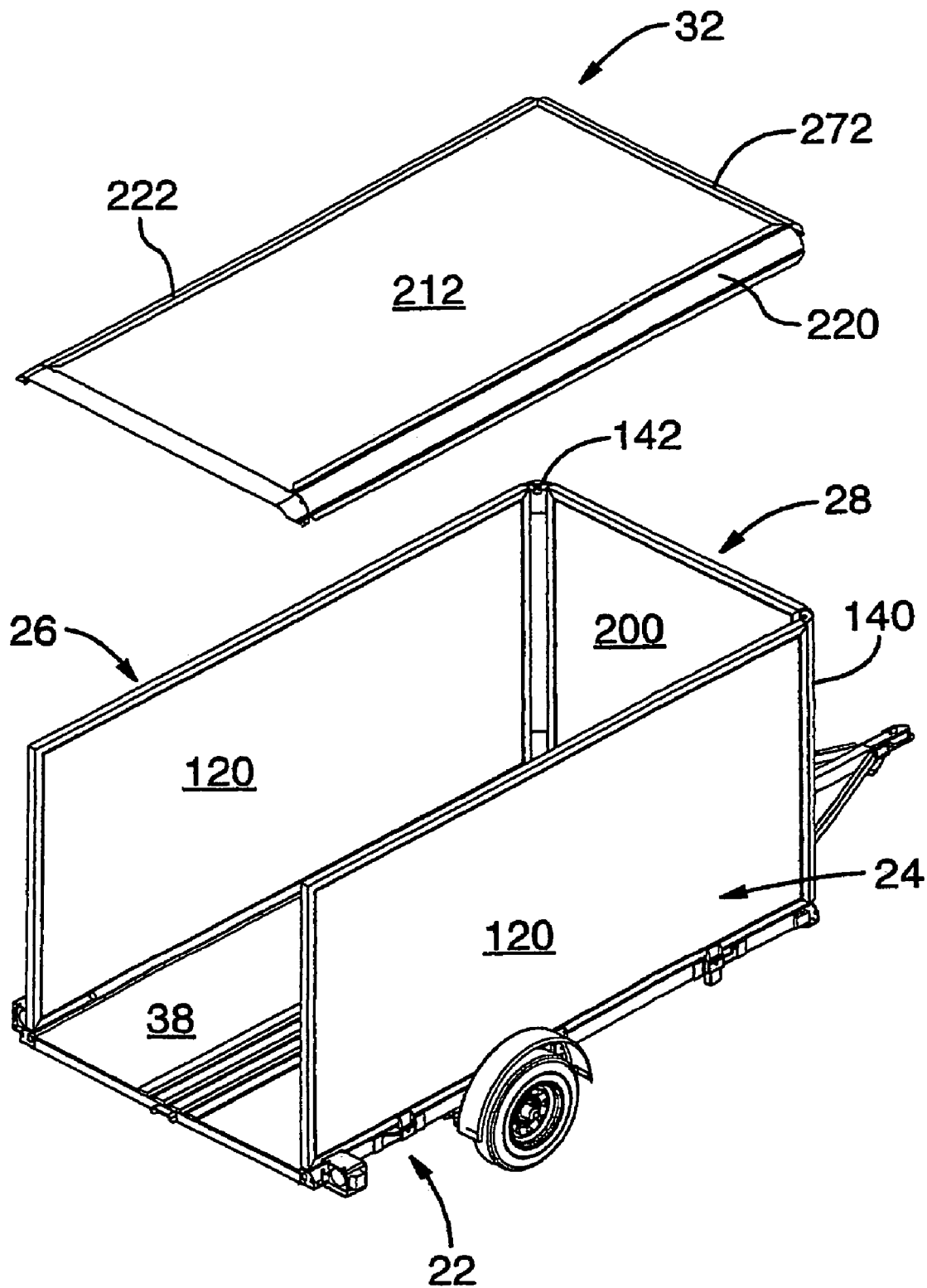
FIG. 22a is a rear right perspective view of the trailer bed similar to that shown in FIG. 21 with the sidewall panels and the front wall panel shown assembled to the trailer bed, and the roof assembly shown exploded.
Figure 22B:
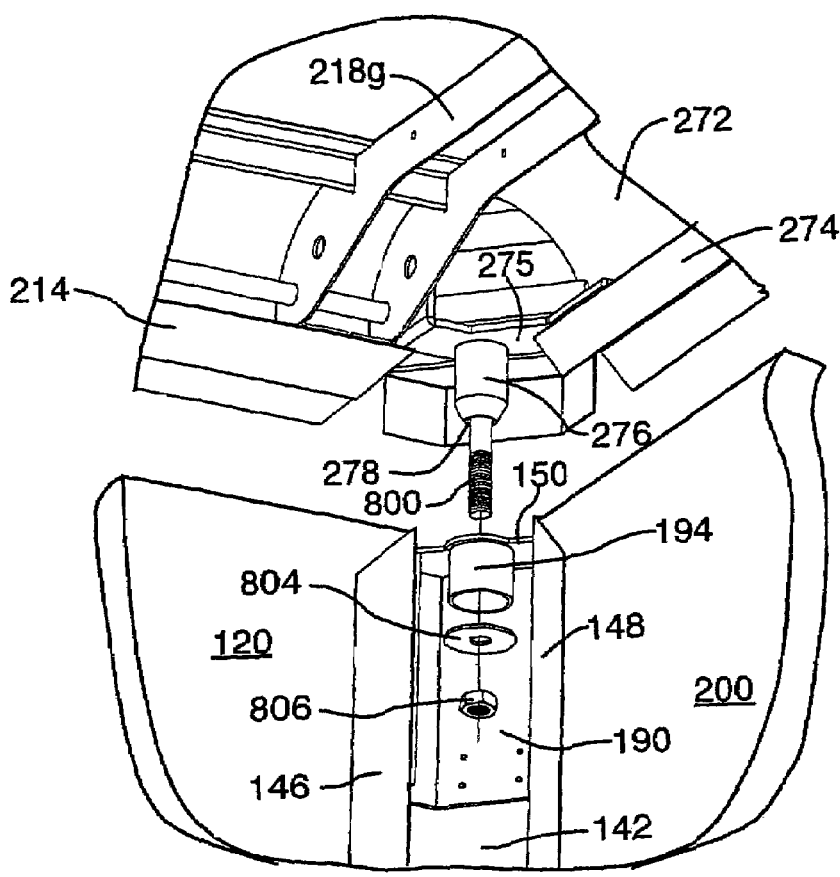
FIG. 22b is a magnified perspective view showing the top front corner of the interior of the partially assembled trailer illustrated in FIG. 22a with the roof assembly exploded.
Figure 22C:
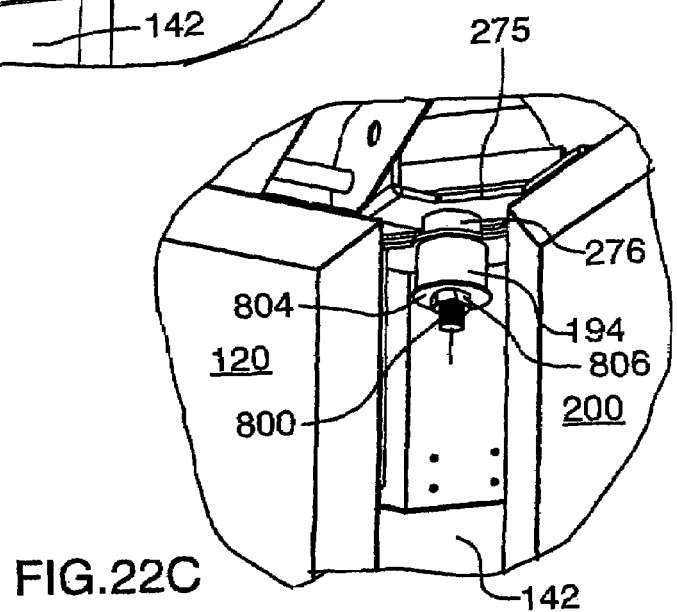
FIG. 22c is a magnified perspective view similar to that illustrated in FIG. 22b showing the roof assembly fastened to the corner post member.

As shown in FIG. 22*a*, with the walls of trailer 22 installed, the roof assembly 30 can now be mounted. The roof assembly 30 is hoisted over the walls of the trailer 22 and the channel sections 230 of rail members 214, 216, 274 are aligned with the panels 120, 120 and 200. The guide pins 276 depending from the plate members 275 of the roof assembly are aligned with the sleeves 194 carried by the upper gusset plate 150. The corners of the roof assembly 30 are then pulled downward thereby urging insertion of the guide pins 276 into the sleeves 194. The roof assembly is securely fastened to the corner post members 140 and 142, the front wall panel 200 and the sidewall panels 120 once the door frame is installed.

To connect the door frame 280, the door frame 280 is angled relative to the trailer bed 22 as shown in FIG. 23b to allow the hooks 308 to be inserted within the apertures 310 defined in the rear end sill 56. With the hooks 308 received in the apertures 310, the door frame 310 is oriented upwardly to bring the pins 302 projecting from the front face 304 of the door frame in alignment with the apertures 306 defined in the lateral edges of the sidewall panel 120. Thereafter, the upper door frame member 286 is brought to bear against the cross-member 218a of the roof assembly 30. The aperture 810 defined in the top reinforced corner 294 of the door frame 280 is aligned with the aperture 259 in the sidewall 255 of the cross-member 218a. A bolt 812 fitted with a washer 813 is then inserted through the aligned apertures 810 and 259 and extends through the tube section 258 whereat a washer 814 and a nut 816 are employed to tightly hold the bolt 812 in place (see FIGS. 23c and 23d).

Subsequently, the roof assembly 30 is fastened to the corner post members 140 and 142 by inserting bolt 802 through the aperture 278 in guiding pin tip 277 and sleeve 194. The bolt 802 is tightly held in place by the washer 804 that abuts the rim of the sleeve 194, and the nut 806.

Figure 24A:
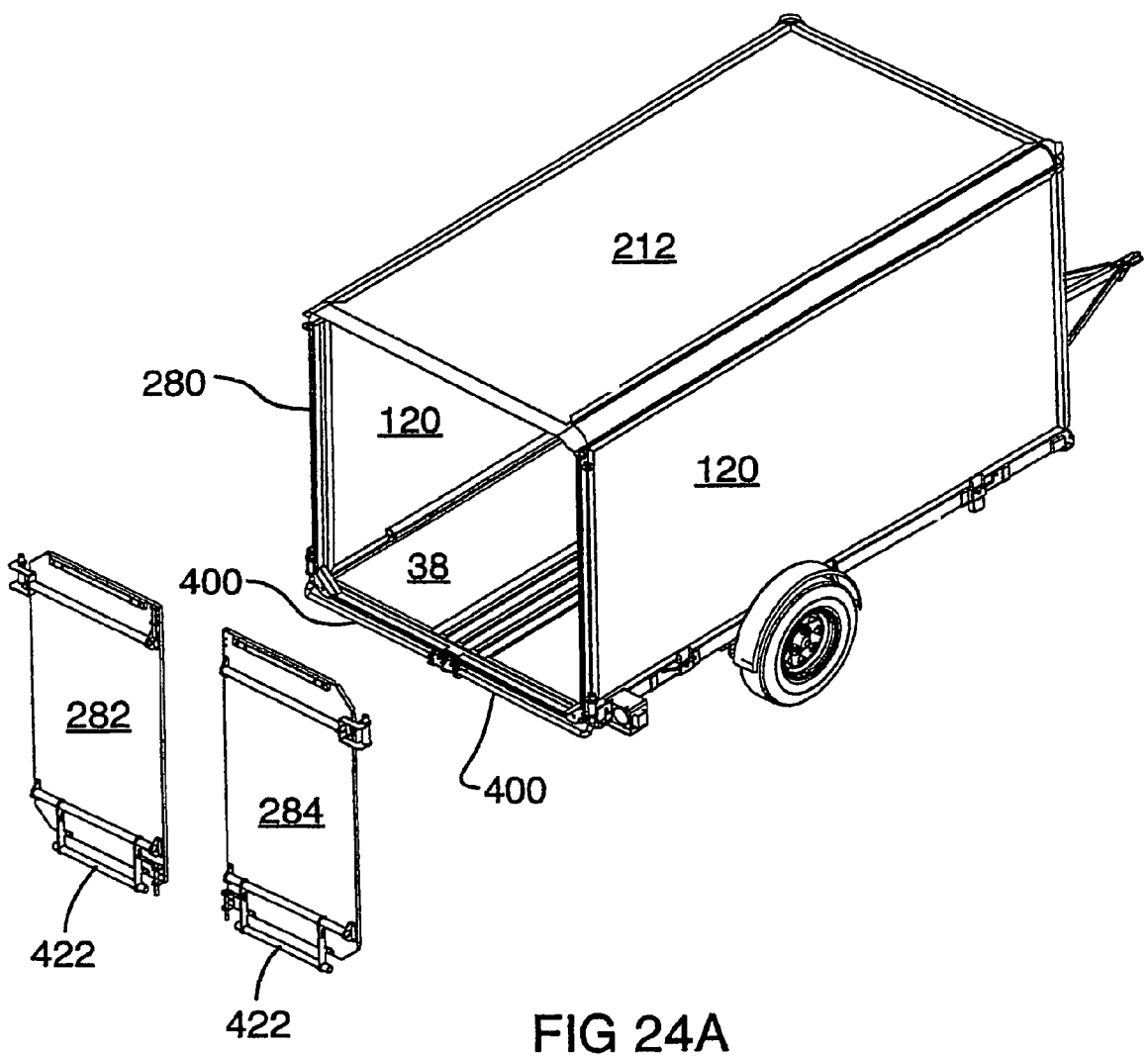
FIG. 24a is a rear right perspective view of the trailer bed similar to that illustrated in FIG. 21 with the sidewall panels, the front wall panel, the roof assembly and the door frame shown assembled to the trailer bed, and the cargo access doors shown exploded.
Figure 24B:
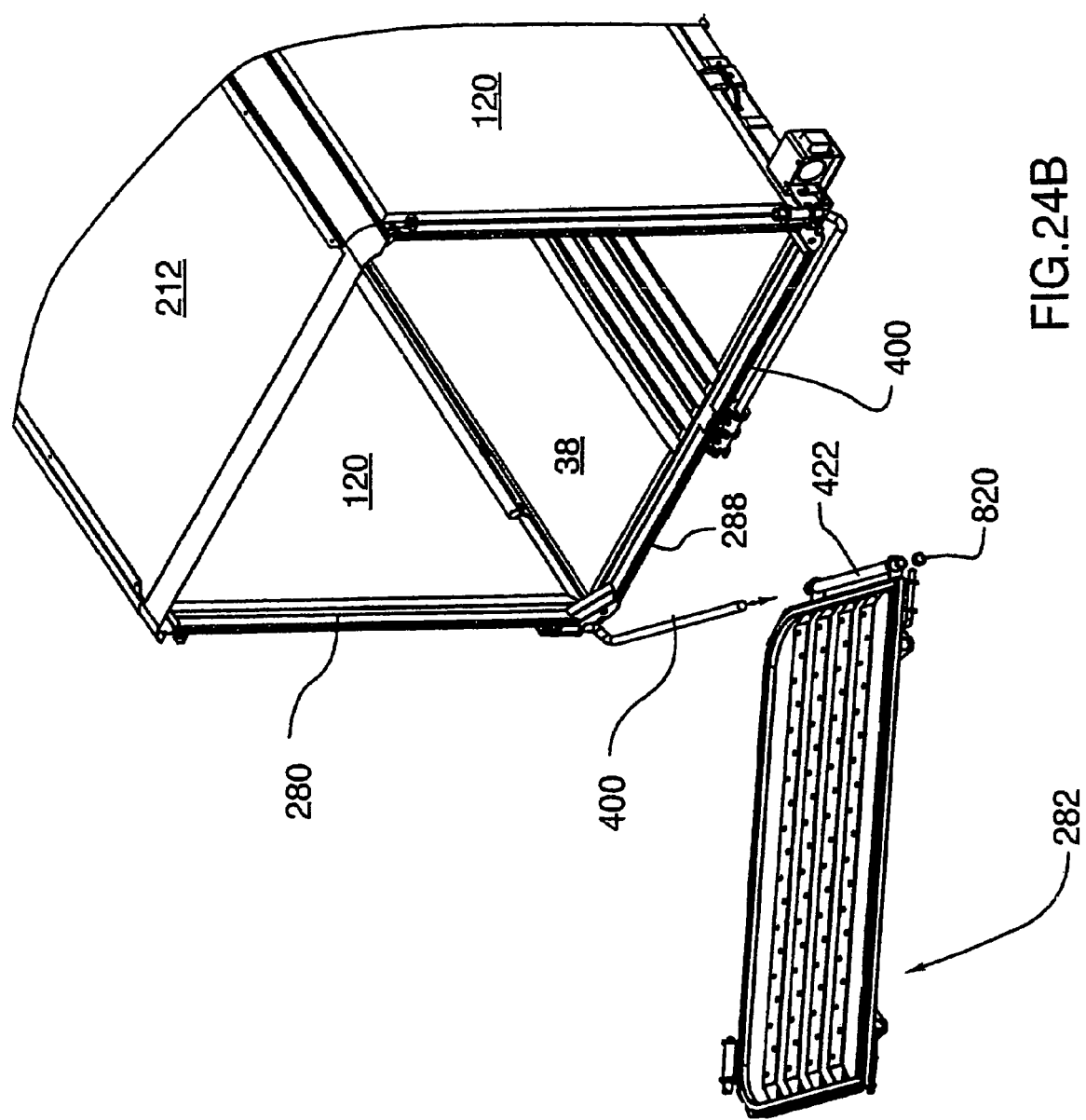
FIG. 24b is a rear right perspective view, of the trailer bed similar to that illustrated in FIG. 24a with one of the cargo access doors shown oriented for mounting onto the door frame.

Referring now to FIGS. 24a and 24b, with the door frame 280 firmly secured, the rear cargo access doors 282 and 284 may now be mounted. The hinge member 400 is swung away from the lower door frame member 288. The door 282, 284 is inclined to facilitate alignment of the tubular section 422 of the door 282, 284 with the hinge member 400. The hinge member 400 is then fully inserted through the tubular section 422 and the door 282, 284 is moved to its closed position 324. The upper hinge pin 344 is then moved to its engaged position 358 wherein it is captively retained by the upper hinge bracket 340 (as shown in FIG. 12). To prevent the tubular section 322 from accidentally becoming detached from the hinge member 400, a lock collar 820 is fastened to the terminal end of the third portion 414 of the hinge member.

As will be appreciated by a person skilled in the art, the covered trailer kits 620 and 1000 are relatively easy to put together and may be fully assembled by two people in a relatively, short period of time. Most advantageously, the assembly of covered trailer kit can be achieved without the use of special tools or the need for welding. All such tasks requiring welding or specialized manual skills or equipment would have already been carried out at the fabrication site prior to shipping of the kits. For instance, each of the trailer bed 22, the roof assembly 32 and the rear cargo access doors 284 and 286 would have already been fabricated and completely assembled prior to its inclusion in the covered trailer kit 620.

In the covered trailer kits 620 and 1000, a plurality of bolted sleeve member and guide pin arrangements are used to fasten the corner post members 140 and 142 to the trailer bed 22 and to the roof assembly 32, and to secure the door frame 280 to the roof assembly 32. It will be appreciated that this need not be the case in every application. In other embodiments, differently configured male and female fittings may be used instead. Further still, the components of an alternative covered trailer kit could be configured with mating slots and lugs using clamping members to tightly secure the components to each other. One such embodiment is shown in FIGS. 27a, 27b, 28, 29a, 29b and 30a to 30c. In this embodiment, the corner post member 140, 142 has been replaced with an alternate corner post member designated with reference numeral 850. As shown in FIGS. 27a and 27b, corner post member 850 is generally similar to corner post member 140, 142 in that it also has an elongate arcuate panel 852 not unlike arcuate panel 144 described earlier, a pair of rail members 854 and 856 welded to the longitudinal edges of the arcuate panel 852, a pair of upper and lower gusset plates 858 and 860 welded along their edges to both the panel 852 and the rail members 854 and 856 and a pair of reinforcement plates 862 and 864 (similar to plates 190 and 192) welded to the arcuate panel 852 and the rail members 854 and 856. However, the corner post member 850 differs from the corner post member 140, 142 in several respects, namely, its gusset plates 858 and 860 do not have circular apertures formed therein nor do they have sleeve members. Instead of the circular apertures, the upper and lower gusset plates 858 and 860 have slots 866 defined therein that are adapted to receive a lug. Moreover, mounted to each reinforcement plate 862, 864 is a clamp assembly 868.

The clamp assembly 868 has a generally C-shaped bracket 874 fixed to the reinforcement plate 862, 864 and a hook-type toggle clamp 870. The toggle clamp 870 includes a flanged base 872 that is fastened to the bracket 874. A lever 876 is also provided. The lever 876 has a first end 878 pivotally mounted to the flanged base 872 and a second free end 880 that defines a handle 882 for actuating the clamp 870. The handle 882 is moveable between a horizontally extending position 884 and a vertically extending position 886. Pivotally connected to the lever 876 intermediate the first and second ends 878 and 880 is a linkage arm 888. The linkage arm 888 carries at its free end a hook 890 for engaging a quick-link fastener.

Figure 29A:
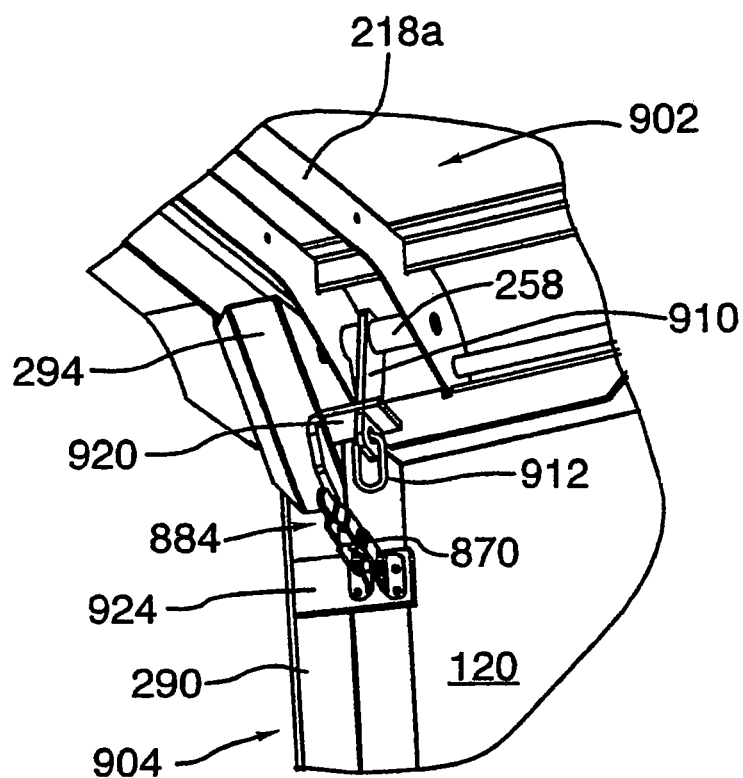
FIG. 29a is a magnified perspective view similar to that illustrated in FIG. 22c showing the top reinforced corner of a door frame and a roof assembly in accordance with an alternative embodiment of the present invention, exploded; the clamp locking means having been omitted for the sake of clarity.
Figure 29B:
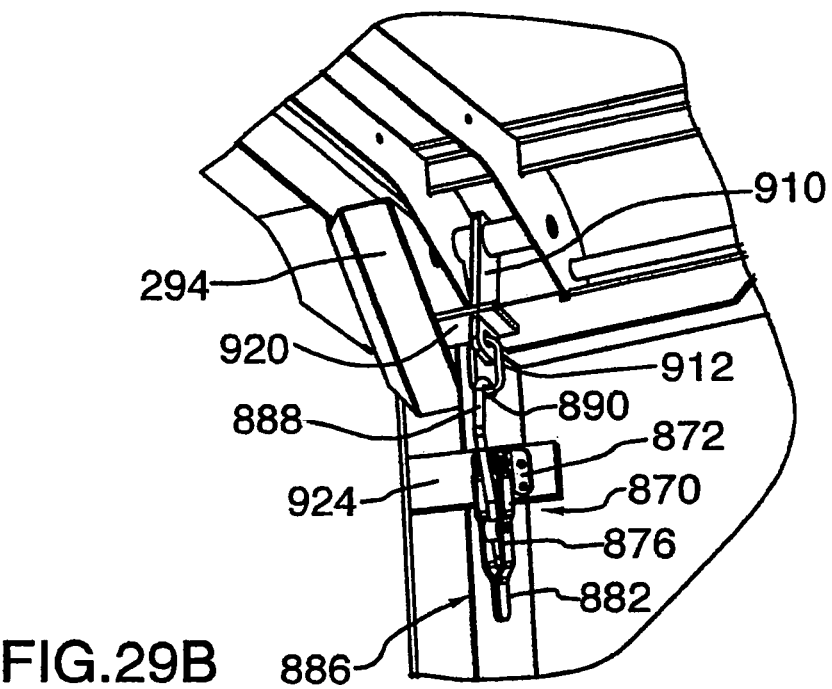
FIG. 29b is a magnified perspective view similar to that illustrated in FIG. 29a showing the clamping member in an engaged position and the door frame fastened to the roof assembly.
Figure 30A:
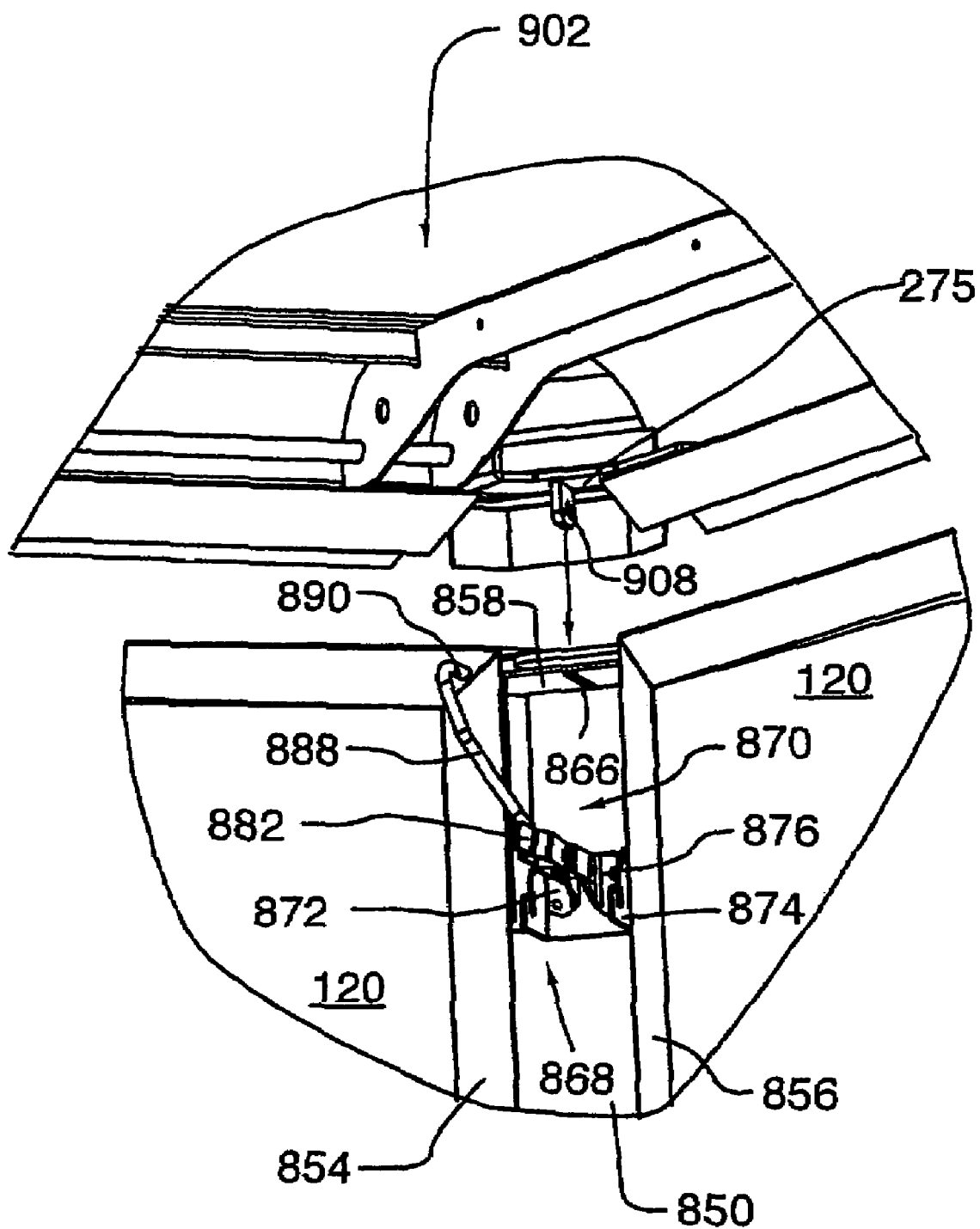
FIG. 30a is a magnified perspective view similar to that illustrated in FIG. 22b showing the top front corner of the interior of a trailer bed in accordance with an alternative embodiment of the present invention with the roof assembly exploded.
Figure 30B:
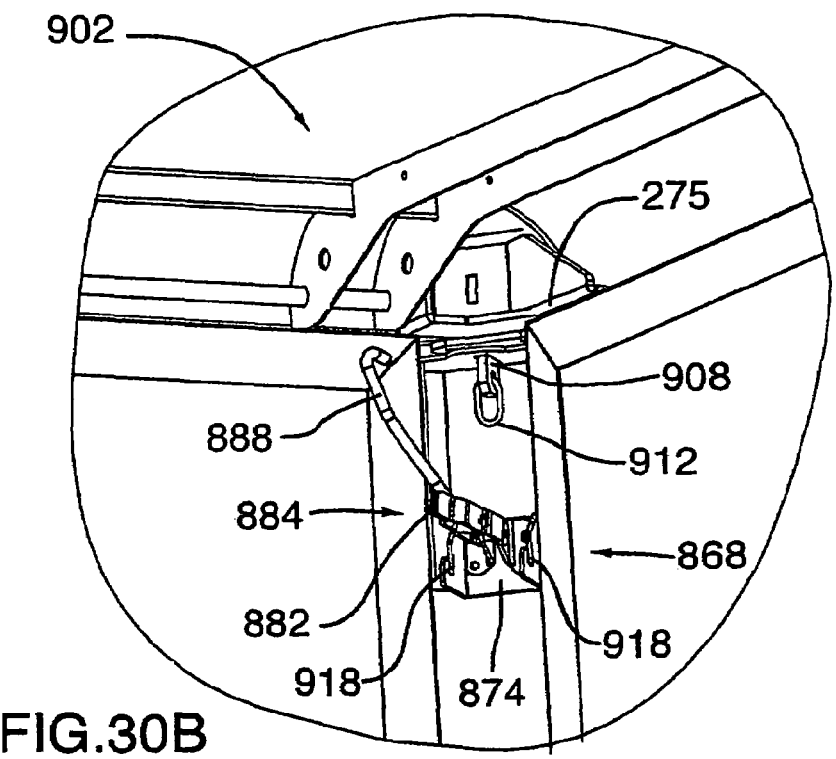
FIG. 30b is a magnified perspective view similar to that illustrated in FIG. 30a showing a clamp member operatively connected to the corner post member and roof assembly, the clamp member being in a partially disengaged position.
Figure 30C:
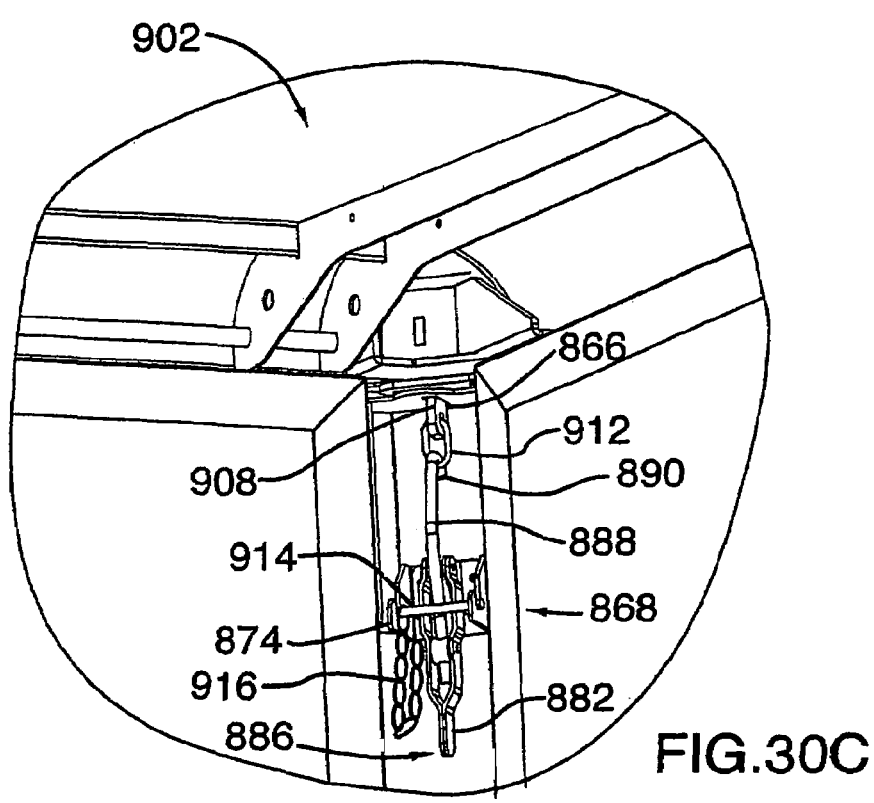
FIG. 30c is a magnified perspective view similar to that illustrated in FIG. 30b showing the clamping member in an engaged position and the roof assembly fastened to the corner post member.

Referring now specifically to FIGS. 28, 29a and 30a it will be seen that minor modifications have been made to the trailer bed 900, the roof assembly 902 and the door frame 904 of this embodiment. More specifically, trailer bed 900 differs from the trailer bed 22 in that the trailer bed 900 has replaced the guide pins 58 extending upwardly from the end sill 55 at the corners 197 and 198 in favour of an apertured lug 906. The lug 906 is sized to fit through the slot 866 defined in the lower gusset plate 860 of the corner post member 850. In all other respects the trailer bed 900 is similar to the trailer bed 22. In like fashion, at its front end the roof assembly 902 is also provided with apertured lugs 908 depending from the plate members 275 in this embodiment, the lugs 908 take the place of the guide pins 276 used in roof assembly 32. At the rear end of the roof assembly 902, elongate tabs 910 extend downwardly from the tube sections 258 of the cross-member 218a. Each elongate tab 910 has an aperture defined therein adjacent its terminal end. But for these differences, the roof assembly 902 is similar to roof assembly 32.

The door frame 904 generally resembles door frame 280 but for two additional features. First, a mounting tab 920 has been welded to each top reinforced corner 294, 296 of the door frame 904. The mounting tab 920 projects outwardly from the respective corner 294, 296 substantially perpendicular to, the plane of the door frame 904. In addition, it has a slot 922 near its terminal end sized to receive the elongate tab 910 therethrough. Second, a mounting plate 924 carrying a hook-type toggle clamp 870 has been welded to each of the vertical frame members 290 and 292.

In this embodiment, assembly of a covered trailer kit using the corner post members 850, the trailer bed 900, the roof assembly 902 and the door frame 904 proceeds generally similar to that described above in the context of kit 620. The sidewall panel 200 is first mounted to the trailer bed 902 followed by the corner post members 850. The bottom end of each corner post member 850 is positioned on the corner 197, 198 of the trailer bed 902 such that the lug 906 is inserted within the slot 866 defined in the lower gusset plate 860. A quick-link fastener 912 is introduced within the aperture in the lug 906 and its locking sleeve is tightened. The sidewall panels 120 are then mounted to the trailer bed 900 in the same fashion as previously described. Thereafter, the roof assembly 902 is placed on top of the upstanding partially assembled trailer structure. The front corners of the roof assembly 902 are pulled downwardly toward the panels 120 and 200 thereby causing the lugs 908 to engage the slots 866 defined in the upper gusset plates 858.

The next step in the assembly involves connecting the door frame 904 to the partially assembled trailer structure. This is achieved by inserting hooks 308 in the apertures 310 defined in the rear end sill 56, pivoting the door frame 904 upwardly to cause the pins 302 to be inserted into the apertures 306 defined in the lateral edges of the sidewall panel 120 and bringing the upper door frame member 286 to bear against the cross-member 218*a* of the roof assembly 902. The rear end of roof assembly 902 is then lifted above the door frame 904 to allow the elongate tabs 910 to be aligned with the slots 922 of the mounting tab 920. The roof assembly 902 is pulled downwardly to cause the tabs 910 to pass through the slots 922. With the roof assembly 902 and door frame 904 in place, these components can now be firmly secured to the partially assembled trailer structure.

One-by-one, quick-link fasteners 912 are inserted through the apertures in the lugs 908 and the tabs 910 and their locking sleeves are tightened. Each clamp 870 is then operatively connected to the quick-link fastener 912 associated therewith. More specifically, in each case, the handle 882 of the clamp 870 is moved to its horizontally extending position 884 thereby permitting the hook 890 carried on the linkage arm 888 to be inserted within the quick-link fastener 912 as (see FIG. 30*b*). To engage the clamp 870, the handle 882 is moved to its vertically extending position 886 wherein the quick-link fastener 912 is tightly held by hook 890. Clamp locking means are also provided to discourage accidental disengagement of the clamp 870 (best shown in FIGS. 30*a* and 30*b*). The clamp locking means includes a lock pin 914 tethered to a chain 916 that is attached to the bracket 874. The lock pin 914 is mountable between the arms of the C-shaped bracket 874 with each end of the pin 914 received within a notch 918 in a respective bracket arm.

To complete the assembly, the rear cargo access doors 284 and 286 are hung on the door frame 904 in the manner described above.

Although the foregoing description and accompanying drawings relate to specific preferred embodiments of the present invention as presently contemplated by the inventor, it will be understood that various changes, modifications and adaptations, may be made without departing from the spirit of the invention.

What is claimed is:

1. A door assembly for providing access to a cargo storage space within a vehicle, the door assembly comprising:
    a door frame defined by a pair of first and second, spaced apart vertically extending door jambs, and a pair of upper and lower, spaced apart, horizontally extending door frame members extending between the first and second door jambs; and
    at least one door mounted within the door frame, the at least one door being defined by a bottom edge, a top edge and a pair of spaced apart, first and second side edges;
    at least one pair of upper and lower hinge assemblies pivotally connecting the at least one door to the door frame, the at least one pair of upper and lower hinge assemblies being operable to allow the at least one door to be selectively deployed in one of a swing door configuration and a ramp-forming configuration;
    when in the swing door configuration, the at least one door is pivotally connected to the first door jamb adjacent the first side edge thereof for rotation about a vertical axis and is moveable between a closed position and an open position;
    when in the ramp-forming configuration, the at least one door is pivotally connected to the lower door frame member adjacent the bottom edge thereof for rotation about a horizontal axis and is moveable between the closed position and a ramp-deployed position;
    the lower hinge assembly including:
        a hinge member having a generally vertically extending portion, a generally horizontally extending portion and a transition portion joining the vertically extending portion to the horizontally extending portion;
        at least one lower hinge bracket fixed to the first door jamb, the at least one lower hinge bracket receiving therein the vertically extending portion of the hinge member, the vertically extending portion of the hinge member being rotatable about the vertical axis when the at least one door is deployed in the swing door configuration;
    a generally horizontally extending tubular member carried by the at least one door below the bottom edge thereof, the tubular member having a passageway defined therein, the passageway receiving the horizontally extending portion of the hinge member therein, the tubular section being rotatable about the horizontal axis when the at least one door is deployed in the ramp-forming configuration; and
    at least one retaining member attached to the lower door frame member for supporting a part of the horizontally extending portion of the hinge member.

2. The door assembly of claim 1 wherein the upper hinge assembly includes:
    an upper hinge bracket fixed to the first door jamb proximate the upper door frame member,
    a tubular hinge knuckle attached to the first side edge of the at least one door proximate to the top edge thereof, and
    a hinge pin housed within the hinge knuckle and rotatable relative thereto, the hinge pin being operatively engageable with the upper hinge bracket to hingedly connect the at least one door to the first door jamb.

3. The door assembly of claim 2 wherein:
    the hinge pin is moveable relative to the upper hinge bracket between a first position and a second position;
    in the first position, the hinge pin operatively engages the upper hinge bracket to thereby permit the at least one door to be deployed in the swing door configuration;
    in the second position, the hinge pin is operatively disengaged from the upper hinge bracket to thereby permit the at least one door to be deployed in the ramp-forming configuration.

4. The door assembly of claim 3 wherein the upper hinge assembly further includes means for locking the hinge pin in the first position.

5. The door assembly of claim 3 wherein the hinge pin is retractable within the hinge knuckle.

6. The door assembly of claim 5 wherein the hinge pin is spring loaded.

7. The door assembly of claim 6 wherein the hinge pin is resiliently biased toward the first position.

8. The door assembly of claim 1 wherein the at least one retaining member is substantially C-shaped and has an opening defined therein sized to permit the horizontally extending portion of the hinge member to swing clear of the at least one retaining member when the at least one door is deployed in the swing door configuration and is moved between the closed position and the open position.

9. The door assembly of claim 8 wherein:
the at least one retaining member includes first and second, spaced apart retaining members; and
the lower hinge assembly further includes a cylindrical member extending between, and captively retained by, the first and second retaining members, the cylindrical member having a longitudinal cutout defined therein to receive the terminal end of the horizontally extending hinge member portion, the cylindrical member being rotatable about the horizontal axis to permit rotational displacement of the cutout.

10. The door assembly of claim 9 wherein:
the cylindrical member is moveable between a blocking position and a clearance position relative to the terminal end of the horizontally extending hinge member portion;
in the blocking position, the cylindrical member is oriented with the cutout lying out of alignment with the openings defined in the retaining members thereby causing the terminal end of the horizontally extending hinge member portion to be captively retained within the cutout, and impeding deployment of the at least one door in the swing door configuration;
in the clearance position, the cylindrical member is oriented with the cutout lying in alignment with the openings defined in the retaining members thereby allowing the horizontally extending hinge member portion to swing clear of the cutout when the at least one door is deployed in the swing door configuration and is moved between the closed position and the open position.

11. The door assembly of claim 10 further comprising at least one door locking assembly for maintaining the at least one door in the closed position.

12. The door assembly of claim 11 wherein the at least one door locking assembly includes a first door locking assembly disposed adjacent the bottom edge of the at least one door and a second door locking assembly disposed adjacent the top edge of the at least one door.

13. The door assembly of claim 12 wherein the first door locking assembly is operable to maintain the cylindrical member in the blocking position.

14. The door assembly of claim 13 wherein the first door locking assembly is defined by:
a first latch mounting bracket mounted to the at least one door near the bottom edge thereof;
a locking pin slideably moveable relative to the first latch mounting bracket between a first locked position and a first unlocked position; and
the cylindrical member of the lower hinge assembly, the cylindrical member having a bore defined therein for receiving a portion of the locking pin therein;
when moved to the first locked position, a portion of the locking pin engages the bore of the cylindrical member to thereby maintain the cylindrical member in the blocking position.

15. The door assembly of claim 14 wherein the second door locking assembly includes:
a second latch mounting bracket mounted to the at least one door near the top edge thereof;
a vertically oriented, locking bar slideably moveable relative to the second latch mounting bracket between a second locked position and a second unlocked position; and
an apertured latch plate mounted to the upper door frame member, the apertured latch plate being adapted to receive a portion of the locking bar therein;
when moved to the second locked position, a portion of the locking bar engages the apertured latch plate thereby impeding deployment of the at least one door.

16. The door assembly of claim 15 wherein the at least one door is moveable to the open position when the locking pin of the first door locking assembly is moved to the first unlocked position and the locking bar of the second door locking assembly is moved to the second unlocked position.

17. The door assembly of claim 15 wherein the at least one door is moveable to the ramp-deployed position when the hinge pin of the upper hinge assembly is moved to the second position and the locking bar of the second door locking assembly is moved to the second unlocked position.

18. The door assembly of claim 1 wherein:
the at least one door includes first and second doors; each door is defined by a bottom edge, a top edge and a pair of spaced apart, first and second side edges;
the first and second doors are mounted within the door frame in a double door arrangement.

19. The door assembly of claim 18 wherein the at least one pair of upper and lower hinge assemblies includes a first pair of upper and lower hinge assemblies pivotally connecting the first door to the door frame and a second pair of upper and lower hinge assemblies pivotally connecting the second door to the door frame.

20. The door assembly of claim 19 wherein the upper hinge assembly of each pair includes:
an upper hinge bracket fixed to one of the first and second door jambs proximate the upper door frame member;
a tubular hinge knuckle attached to the first side edge of one of the first and second doors proximate the top edge thereof; and
a hinge pin housed within the hinge knuckle and rotatable relative thereto, the hinge pin being operatively engageable with the upper hinge bracket to hingedly connect one of the first and second doors to one of the first and second door jambs.

21. The door assembly of claim 20 wherein:
the hinge pin is moveable relative to the upper hinge bracket between a first position and a second position;
in the first position, the hinge pin operatively engages the upper hinge bracket to thereby permit one of the first and second doors to be deployed in the swing door configuration;
in the second position, the hinge pin is operatively disengaged from the upper hinge bracket to thereby permit one of the first and second doors to be deployed in the ramp-forming configuration.

22. The door assembly of claim 19 wherein the at least one retaining member is substantially C-shaped and has an opening defined therein sized to permit the horizontally extending portion of the hinge member to swing clear of the at least one retaining member when one of the first and second door is deployed in the swing door configuration and is moved between the closed position and the open position.

23. The door assembly of claim 22 wherein:
the horizontally extending portion has a proximal end adjacent the transition portion and a terminal end opposed from the proximal end;
the at least one retaining member includes first and second, spaced apart retaining members; and
the lower hinge assembly further includes a cylindrical member extending between, and captively retained by, the first and second retaining members; the cylindrical member having a longitudinal cutout defined therein to receive the terminal end of the horizontally extending hinge member portion, the cylindrical member being rotatable about the horizontal axis to permit rotational displacement of the cutout.

24. The door assembly of claim 23 wherein:
the cylindrical member is moveable between a blocking position and a clearance position relative to the terminal end of the horizontally extending hinge member portion;
in the blocking position, the cylindrical member is oriented with the cutout lying out of alignment with the openings defined in the retaining members thereby causing the terminal end of the horizontally extending hinge member portion to be captively retained within the cutout, and impeding deployment of one of the first and second doors in the swing door configuration;
in the clearance position, the cylindrical member is oriented with the cutout lying in alignment with the openings defined in the retaining members thereby allowing the horizontally extending hinge member portion to swing clear of the cutout when the one of the first and second doors is deployed in the swing door configuration and is moved between the closed position and the open position.

25. The door assembly of claim 24 further comprising at least one door locking assembly for maintaining the first and second doors in their respective closed positions.

26. The door assembly of claim 25 wherein the at least one door locking assembly includes a first door locking assembly disposed adjacent the bottom edge of the at least one door and a second door locking assembly disposed adjacent the top edge of the at least one door.

27. A door assembly for providing access to a cargo storage space within a vehicle, the door assembly comprising:
a door frame defined by a pair of first and second, spaced apart vertical doorjambs, and a pair of upper and lower, spaced apart, horizontal door frame members extending between the first and second door jambs; and
first and second doors mounted within the door frame in a double door arrangement;
a first pair of upper and lower hinge assemblies for hingedly connecting the first door to the door frame and a second pair of upper and lower hinge assemblies for hingedly connecting the second door to the door frame, the upper and lower hinge assemblies being operable to allow each door to be selectively deployed in one of a swing door configuration and a ramp-forming configuration, each lower hinge assembly including:
a hinge member having a generally vertically extending portion, a generally horizontally extending portion and a transition portion joining the vertically extending portion to the horizontally extending portion;
at least one lower hinge bracket fixed to the first door jamb, the at least one lower hinge bracket receiving therein the vertically extending portion of the hinge member, the vertically extending portion of the hinge member being rotatable about the vertical axis when the at least one door is deployed in the swing door configuration;
a generally horizontally extending tubular member carried by the at least one door below the bottom edge thereof, the tubular member having a passageway defined therein, the passageway receiving the horizontally extending portion of the hinge member therein, the tubular section being rotatable about the horizontal axis when the at least one door is deployed in the ramp-forming configuration; and
at least one retaining member attached to the lower door frame member for supporting a part of the horizontally extending portion of the hinge member;
when in the swing door configuration, each door is hingedly connected to one of the door jambs for rotation about a vertical axis and is moveable between a closed position and an open position;
when in the ramp-forming configuration, each door is hingedly connected to the lower door frame member for rotation about a horizontal axis and is moveable between the closed position and a ramp-deployed position.

28. A utility trailer comprising:
a trailer bed for supporting cargo, the trailer bed having a leading edge; an opposed trailing edge spaced apart from the leading edge and a pair of first and second, spaced apart, side edges joining the leading edge to the trailing edge;
a pair of first and second, spaced apart, sidewalls; each sidewall extending upright from a respective side edge of the trailer bed;
a leading wall mounted between the first and second sidewalls and extending upright from the leading edge of the trailer bed;
a rear cargo access door assembly disposed opposite the leading wall and between the first and second sidewalls, the rear cargo access door assembly extending upright from the trailing edge of the trailer bed, the rear cargo access door assembly including a door frame, a pair of first and second cargo access doors hingedly mounted to the door frame in a double door arrangement, a first pair of upper and lower hinge assemblies for hingedly connecting the first cargo access door to the door frame and a second pair of upper and lower hinge assemblies for hingedly connecting the second cargo access door to the door frame, the upper and lower hinge assemblies being operable to allow each cargo access door to be selectively deployed in one of a swing door configuration and a ramp-forming configuration, each lower hinge assembly including:
a hinge member having a generally vertically extending portion, a generally horizontally extending portion and a transition portion joining the vertically extending portion to the horizontally extending portion;
at least one lower hinge bracket fixed to the first door jamb, the at least one lower hinge bracket receiving therein the vertically extending portion of the hinge member, the vertically extending portion of the hinge member being rotatable about the vertical axis when the at least one door is deployed in the swing door configuration;

a generally horizontally extending tubular member carried by the at least one door below the bottom edge thereof, the tubular member having a passageway defined therein, the passageway receiving the horizontally extending portion of the hinge member therein, the tubular section being rotatable about the horizontal axis when the at least one door is deployed in the ramp-forming configuration; and at least one retaining member attached to the lower door frame member for supporting a part of the horizontally extending portion of the hinge member; and a roof assembly carried above the trailer bed, the roof assembly being supported by the leading wall and the first and second sidewalls and connected to the door frame;

the trailer bed, the first and second sidewalls, the leading wall, the rear cargo access door assembly and the roof assembly co-operating with each other to define a box-like structure having an interior cargo storage space.

29. A kit for assembling a utility trailer comprising:

a trailer bed for supporting cargo, the trailer bed having a leading edge; an opposed trailing edge spaced apart from the leading edge and a pair of first and second, spaced apart, side edges joining the leading edge to the trailing edge;

a pair of first and second, spaced apart, sidewalls; each sidewall being mountable to extend upright from a respective side edge of the trailer bed;

a leading wall for placement between the first and second sidewalls, the leading wall being mountable to extend upright from the leading edge of the trailer bed;

a rear cargo access door assembly for placement opposite the leading wail and between the first and second sidewalls, the rear cargo access door assembly being mountable to extend upright from the trailing edge of the trailer bed, the rear cargo access door assembly including a door frame, a pair of first and second cargo access doors hingedly mounted to the door frame in a double door arrangement, a first pair of upper and lower hinge assemblies for hingedly connecting the first cargo access door to the door frame and a second pair of upper and lower hinge assemblies for hingedly connecting the second cargo access door to the door frame; when the kit is fully assembled, the upper and lower hinge assemblies being operable to allow each cargo access door to be selectively deployed in one of a swing door configuration and a ramp-forming configuration, each lower hinge assembly including:

a hinge member having a generally vertically extending portion, a generally horizontally extending portion and a transition portion joining the vertically extending portion to the horizontally extending portion;

at least one lower hinge bracket fixed to the first door jamb, the at least one lower hinge bracket receiving therein the vertically extending portion of the hinge member, the vertically extending portion of the hinge member being rotatable about the vertical axis when the at least one door is deployed in the swing door configuration;

a generally horizontally extending tubular member carried by the at least one door below the bottom edge thereof, the tubular member having a passageway defined therein, the passageway receiving the horizontally extending portion of the hinge member therein, the tubular section being rotatable about the horizontal axis when the at least one door is deployed in the ramp-forming configuration; and at least one retaining member attached to the lower door frame member for supporting a part of the horizontally extending portion of the hinge member; and a roof assembly for placement above the trailer bed, the roof assembly being connectable to the leading wall, the first and second sidewalls and the door frame;

the trailer bed, the first and second sidewalls, the leading wall, the rear cargo access door assembly and the roof assembly connectable to each other to define a box-like structure having an interior cargo storage space.

30. A kit for converting a flat bed trailer into a covered utility trailer, the kit comprising:

a pair of first and second, spaced apart, sidewalls; each sidewall being mountable to extend upright from the floor of the flat bed trailer;

a roof assembly for placement above the floor of the flat bed trailer, the roof assembly being connectable to the leading wall, the first and second sidewalls and the door frame;

the first and second sidewalls, the leading wall, the rear cargo access door assembly, the roof assembly and the floor being connectable to each other to define a box-like structure having an interior cargo storage space.

* * * * *

UNITED STATES PATENT AND TRADEMARK OFFICE
CERTIFICATE OF CORRECTION

PATENT NO.        : 7,380,873 B2
APPLICATION NO. : 11/433558
DATED              : June 3, 2008
INVENTOR(S)      : Craig Shoemaker It is certified that error appears in the above-identified patent and that said Letters Patent is hereby corrected as shown below:

Column 36, line 34, cancel the text beginning with "30. A kit for converting" to and ending "an interior cargo storage space." and insert the following claim:

-- 30.   A kit for converting a flat bed trailer into a covered utility trailer, the kit comprising:

a pair of first and second, spaced apart, sidewalls; each sidewall being mountable to extend upright from the floor of the flat bed trailer;

a leading wall for placement between the first and second sidewalls, the leading wall being mountable to extend upright from the floor of the flat bed trailer;

a rear cargo access door assembly for placement opposite the leading wall and between the first and second sidewalls, the rear cargo access door assembly being mountable to extend upright from the floor of the flat bed trailer, the rear cargo access door assembly including a door frame, a pair of first and second cargo access doors hingedly mounted to the door frame in a double door arrangement, a first pair of upper and lower hinge assemblies for hingedly connecting the first cargo access door to the door frame and a second pair of upper and lower hinge assemblies for hingedly connecting the second cargo access door to the door frame; when the kit is fully assembled, the upper and lower hinge assemblies being operable to allow each cargo access door to be selectively deployed in one of a swing door configuration and a ramp-forming configuration, each lower hinge assembly including:

a hinge member having a generally vertically extending portion, a generally horizontally extending portion and a transition portion joining the vertically extending portion to the horizontally extending portion;

at least one lower hinge bracket fixed to the first door jamb, the at least one lower hinge bracket receiving therein the vertically extending portion of the hinge member, the vertically extending portion of the hinge member being rotatable about the vertical axis when the at least one door is deployed in the swing door configuration;

a generally horizontally extending tubular member carried by the at least one door below the bottom edge thereof, the tubular member having a passageway defined therein, the passageway receiving the horizontally extending portion of the hinge member therein, the tubular section being rotatable about the horizontally axis when the at least one door is deployed in the ramp-forming configuration; and

UNITED STATES PATENT AND TRADEMARK OFFICE
CERTIFICATE OF CORRECTION

PATENT NO. : 7,380,873 B2
APPLICATION NO. : 11/433558
DATED : June 3, 2008
INVENTOR(S) : Craig Shoemaker It is certified that error appears in the above-identified patent and that said Letters Patent is hereby corrected as shown below:

at least one retaining member attached to the lower door frame member for supporting a part of the horizontally extending portion of the hinge member; and a roof assembly for placement above the floor of the flat bed trailer, the roof assembly being connectable to the leading wall, the first and second sidewalls and the door frame;

the first and second sidewalls, the leading wall, the rear cargo access door assembly, the roof assembly and the floor being connectable to each other to define a box-like structure having an interior cargo storage space. --

Signed and Sealed this

Fifth Day of August, 2008

JON W. DUDAS
*Director of the United States Patent and Trademark Office*